(12) United States Patent
Shultz et al.

(10) Patent No.: US 12,325,592 B2
(45) Date of Patent: *Jun. 10, 2025

(54) AUTOMATED SMART STORAGE OF PRODUCTS

(71) Applicant: TruMed Systems, Inc., San Diego, CA (US)

(72) Inventors: Scott Edward Shultz, San Diego, CA (US); Kenneth A. Regas, Poway, CA (US); Javier Escobedo, San Diego, CA (US); Brian Mikael Andersen, San Diego, CA (US)

(73) Assignee: TruMed Systems, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/439,422

(22) Filed: Feb. 12, 2024

(65) Prior Publication Data

US 2024/0343489 A1    Oct. 17, 2024

Related U.S. Application Data

(63) Continuation of application No. 16/839,552, filed on Apr. 3, 2020, now Pat. No. 11,945,652.

(Continued)

(51) Int. Cl.
*B65G 1/137* (2006.01)
*B25J 9/02* (2006.01)
(Continued)

(52) U.S. Cl.
CPC ............ *B65G 1/1371* (2013.01); *B25J 9/026* (2013.01); *G05B 19/042* (2013.01);
(Continued)

(58) Field of Classification Search
CPC ..... B65G 1/1371; B25J 9/026; G06Q 10/087; G06Q 10/0832; G06Q 20/18;
(Continued)

(56) References Cited

U.S. PATENT DOCUMENTS

| 5,233,844 A | 8/1993 | Knippscheer et al. |
| 5,502,944 A | 4/1996 | Kraf et al. |

(Continued)

FOREIGN PATENT DOCUMENTS

| EP | 1757882 A2 | 2/2007 |
| EP | 2888544 A1 | 7/2015 |

(Continued)

OTHER PUBLICATIONS

Biel, What is CRM?, 2022, NetSuite, Inc. ASP hosted services, CRM, doi.: http://www.netsuite.com/portal/resource/articles/crm/what-is-crm.shtml (9 pages).

(Continued)

*Primary Examiner* — Michael Collins
(74) *Attorney, Agent, or Firm* — Suzan Potuznik

(57) ABSTRACT

Automated, environmentally monitored and controlled storage units and systems for storing, monitoring, and maintaining a supply of products, particularly temperature sensitive pharmaceutical and/or other high-value products, be they temperature sensitive or not. Such automated storage units contain an array of independently addressable holding locations for containers with product in one or more environmentally monitored (e.g., for temperature, humidity, etc.) and controlled zones fitted with appropriate environmental sensors. In preferred embodiments, the automated storage units also include a reader to track product information and status. Product loading, retrieval, and movement within such automated storage units is performed by a computer-controlled robot. A user interface device, preferably in commu- (Continued)

nication with an application service provider to provide remotely managed inventory management and other services, provides users with inventory- and product-specific information.

15 Claims, 41 Drawing Sheets

Related U.S. Application Data

(60) Provisional application No. 62/828,955, filed on Apr. 3, 2019.

(51) Int. Cl.

| | | |
|---|---|---|
| G05B 19/042 | (2006.01) | |
| G06K 7/14 | (2006.01) | |
| G06Q 10/0832 | (2023.01) | |
| G06Q 10/087 | (2023.01) | |
| G06Q 20/18 | (2012.01) | |
| G06Q 30/014 | (2023.01) | |
| G06Q 30/018 | (2023.01) | |
| G06Q 30/04 | (2012.01) | |
| G06Q 30/0601 | (2023.01) | |
| G07C 9/37 | (2020.01) | |

(52) U.S. Cl.
CPC ....... *G06K 7/1413* (2013.01); *G06Q 10/0832* (2013.01); *G06Q 10/087* (2013.01); *G06Q 20/18* (2013.01); *G06Q 30/014* (2013.01); *G06Q 30/0185* (2013.01); *G06Q 30/04* (2013.01); *G06Q 30/0633* (2013.01); *G07C 9/37* (2020.01); *G05B 2219/2614* (2013.01)

(58) Field of Classification Search
CPC .. G06Q 30/0185; G06Q 30/014; G06Q 30/04; G06Q 30/0633; G05B 2219/2614; G05B 19/042; G06K 7/1413; G07C 9/37
See application file for complete search history.

(56) References Cited

U.S. PATENT DOCUMENTS

| | | |
|---|---|---|
| 6,003,006 A | 12/1999 | Colella et al. |
| 6,490,502 B2 | 12/2002 | Fellows et al. |
| 6,658,322 B1 | 12/2003 | Frederick et al. |
| 6,735,497 B2 | 5/2004 | Wallace et al. |
| 6,874,684 B1 | 4/2005 | Denenberg et al. |
| 6,941,762 B2 | 9/2005 | Felder et al. |
| 7,155,306 B2 | 12/2006 | Haitin et al. |
| 7,228,198 B2 | 6/2007 | Vollm et al. |
| 7,689,317 B2 | 3/2010 | McGrady et al. |
| 7,844,362 B2 | 11/2010 | Handfield et al. |
| 7,861,540 B2 | 1/2011 | Cloutier et al. |
| 7,865,263 B2 | 1/2011 | Spano, Jr. et al. |
| 8,145,353 B1 | 3/2012 | Cotner |
| 8,176,747 B2 | 5/2012 | Howard et al. |
| 8,180,485 B2 | 5/2012 | Reckelhoff |
| 8,210,548 B1 | 7/2012 | Agyemang |
| 8,281,553 B2 | 10/2012 | Kim |
| 8,318,499 B2 | 11/2012 | Fritichie et al. |
| 8,407,068 B2 | 3/2013 | Ohmura et al. |
| 8,483,867 B2 | 7/2013 | Braun et al. |
| 8,875,843 B2 | 11/2014 | Cihak |
| 9,731,895 B2 * | 8/2017 | Manning ................ B65G 1/045 |
| 9,733,012 B2 | 8/2017 | Manning et al. |
| 9,909,802 B2 | 3/2018 | Manning et al. |
| 10,012,661 B2 * | 7/2018 | Pollack .................... B01L 9/06 |
| 10,134,099 B2 | 11/2018 | Lowenstein et al. |
| 10,823,499 B2 | 11/2020 | Manning et al. |
| 10,836,578 B2 * | 11/2020 | Bokelman .............. B65G 1/133 |
| 11,629,910 B2 | 4/2023 | Manning et al. |
| 11,945,652 B2 * | 4/2024 | Shultz ................ G06Q 10/0832 |
| 2002/0023444 A1 * | 2/2002 | Felder ................... F25D 29/001 |
| | | 62/177 |
| 2004/0115101 A1 | 6/2004 | Malin et al. |
| 2004/0207303 A1 | 10/2004 | Melching et al. |
| 2004/0213651 A1 | 10/2004 | Malin |
| 2005/0060063 A1 | 3/2005 | Reichelt et al. |
| 2006/0272351 A1 | 12/2006 | Murray et al. |
| 2008/0044266 A1 | 2/2008 | Neeper et al. |
| 2008/0184719 A1 | 8/2008 | Lowenstein et al. |
| 2008/0231152 A1 | 9/2008 | Malin |
| 2009/0090734 A1 | 4/2009 | Wittern, Jr. et al. |
| 2009/0188272 A1 | 7/2009 | Cloutier et al. |
| 2009/0231132 A1 | 9/2009 | Shoenfeld et al. |
| 2010/0086440 A1 | 4/2010 | Fattinger et al. |
| 2010/0294046 A1 | 11/2010 | Boeke et al. |
| 2010/0300130 A1 | 12/2010 | Shoenfeld et al. |
| 2010/0303590 A1 | 12/2010 | Pedrazzini |
| 2011/0304466 A1 | 12/2011 | Bair, III |
| 2013/0199232 A1 | 8/2013 | Natarajan et al. |
| 2016/0327583 A1 * | 11/2016 | Pollack .................... B01L 9/06 |

FOREIGN PATENT DOCUMENTS

| | | |
|---|---|---|
| EP | 3077738 A1 | 10/2016 |
| EP | 3948116 A1 | 2/2022 |
| EP | 42734862 A2 | 11/2023 |
| EP | 4296202 A1 | 12/2023 |
| WO | WO-2007087546 A2 | 8/2007 |
| WO | WO-2014031976 A1 | 2/2014 |
| WO | WO-2015085287 A1 | 6/2015 |
| WO | WO-2020206263 A1 | 10/2020 |

OTHER PUBLICATIONS

Centers for Disease Control and Prevention (CDC), Guidelines for Maintaining and Managing the Vaccine Cold Chain, MMWR, 2003, 1023-1025, 52(42) doi: www.cdc.gov/mmwr/preview/m.

Mccue, 2022, Netsuite, Inc. ASP hosted services, What is ERP?, doi.: http://www.netsuite.com/portal/resource/articles/erp/what-is-erp.shtml (2 pages).

Oracle Retail Trade Management (RTM), doi.: https://www.oracle.com/industries/retail/products/merchandise-management/trade-management (3 pages).

Sample Access Manager, "SAM", 2014, by Hamilton Company USA, 4970 Energy Way Reno, Nevada 89502. doi.: www.hamilton-storage.com/autornated-samplestorage/20c-80c-biobanking/low.

International Search Report, PCT/US2020/026591, dated Jul. 22, 2020 (4 pages).

* cited by examiner

FIG. 17B

Continued from FIG. 17A

EER WITH 2 EMPTY CARRIERS IS POSITIONED AND ALIGNED IN FRONT OF TWO EMPTY SLOTS IN TRAY AND EMPTY CARRIERS ARE PLACED INTO TRAY SLOTS WITHOUT CARRIERS
1710

EER IS POSITIONED BY NEXT TWO TRAY SLOTS WITH CARRIERS HOLDING PRODUCTS
1711

STEPS 1702-1711 ARE REPEATED 3 TIMES
1712

5TH TIME EER RETURNS TO LOADING TRAY
STEPS 1702-1710 ARE REPEATED
FILLING OF LOADING TRAY WITH EMPTY CARRIERS IS COMPLETE
1713

TRAY FILLED WITH EMPTY CARRIERS IS LOADED, BY USER, WITH 2ND GROUP OF 10 PRODUCTS FOLLOWING FIG. 13, STEPS 1302-1315, PROTOCOL
1714

STEPS 1701-1713 ARE REPEATED (STEPS 1715 & 1716) TO PLACE 2ND SET OF 10 PRODUCTS IN STORAGE BAYS AND FILL LOADING TRAY WITH EMPTY CARRIERS
1717

AUTOMATED SMART STORAGE OF PRODUCTS

RELATED APPLICATION(S)

This non-provisional patent application is a continuation of U.S. non-provisional patent application Ser. No. 16/839,552, filed 3 Apr. 2020, which claims the benefit of and priority to U.S. provisional patent application Ser. No. 60/828,955, filed 3 Apr. 2019. Each of the foregoing patent applications (and, if applicable, patents) is incorporated by reference in its entirety for any and all purposes.

FIELD OF THE INVENTION

The present invention relates generally to automated storage and inventory management of temperature or non-temperature sensitive products, including pharmaceuticals (including small molecule and biologic drugs, drug candidates, vaccines, etc.), veterinary medicines, research reagents, and the like.

BACKGROUND OF THE INVENTION

Introduction

The following description includes information that may be useful in understanding the present invention. It is not an admission that any such information is prior art, or relevant, to the presently claimed inventions, or that any publication specifically or implicitly referenced is prior art.

BACKGROUND

The manufacture, quality, sales, marketing, distribution, financing, and insurance of many high value temperature or non-temperature sensitive products (e.g., pharmaceuticals, vaccines, computer chips, jewels, precious metals, etc.) depend on proper storage and inventory management. In the context of temperature sensitive products such as pharmaceuticals and vaccines, storage under controlled conditions is important, with temperature being one of the key parameters that determines if a product is suitable for use or must be discarded as spoiled. Some pharmaceutical and other temperature sensitive product formulations require a storage temperature of about 5° C. and lose effectiveness and potency when stored at temperatures below freezing, while others require subzero storage. Generally, effectiveness and potency decrease with every freeze-thaw cycle. This is especially true for cell-based therapies and immunobiologics such as vaccines.

Concern over the proper storage of vaccines and awareness that exposure of vaccines to temperatures outside the recommended ranges can have adverse effect on potency, thereby reducing protection from vaccine-preventable diseases, prompted the Centers for Disease Control and Prevention (CDC) to establish, "Guidelines for Maintaining and Managing the Vaccine Cold Chain" (www.cdc.gov/mmwr/preview/mmwrhtml/mm5242a6.htm). The CDC emphasizes that administration of potent immunobiologics is not only dependent on an effective cold storage unit, it also requires maintaining accurate temperature logs while the vaccine is in storage prior to use. Due to significant variability of temperatures within a compartment of a conventional vaccine refrigerator or other storage device, it is recommended that temperatures be recorded near the actual container of the pharmaceutical several times per day. Vaccines whose storage conditions experience one or more temperature excursions outside of the recommended temperature range should be immediately separated from the stock of effective vaccines so to avoid dispensing a potentially ineffective product.

The high cost of biologic pharmaceuticals further highlights the need for storage units, preferably automated storage units, having accurately maintained temperature zones, sensors for the recordation of temperatures surrounding the units of stored product, and an inventory management and alert system that assure adequate supplies of desired product types are on hand when needed and that in emergency situations allows for transfer of product to an alternate location in case of, for example, a unit malfunction or power failure that results in an unacceptable temperature excursion in the storage unit's product storage compartment. It is also important to allow for removal of units of expired and/or ineffective products stored in the machine, products subject to regulatory recalls, or products that need to be removed for other commercial or regulatory reasons. A further need arises to simplify the management of storage units and their contents, simplify the ease of access to product content kept in the storage unit, and to maintain optimal product inventory This invention addresses these and other needs.

SUMMARY OF THE INVENTION

This invention provides automated product storage units for the storage of one or more different types of non-temperature or temperature sensitive products, for example, pharmaceuticals, vaccines, and research reagents, as well as inventory management systems to manage the storage, stocking, and dispensing of products stored in such automated units (preferably by single dose and in compliance with regulatory requirements applicable to such products, if any), and the data associated with such storage, stocking, and dispensing. Thus, objects of the invention include providing smart (i.e., automated, computer-controlled) temperature controlled and/or monitored storage units, systems, and methods that provide proper storage of pharmaceuticals and other products, particularly temperature sensitive products, and simplify associated inventory and data management protocols. The design of the cold storage unit further takes human factors into consideration, optimizing and reducing the time required for loading and dispensing of product, providing a user interface that is user friendly and easy to view and use, and providing an exterior structure that makes all elements required for the loading and dispensing of products readily accessible.

Furthermore, the associated data and information generated in the use of the automated storage units and systems of the invention allow for the more efficient, optimized product stocking and inventory management, in addition to enabling billing and marketing efficiencies for users (e.g., healthcare providers, pharmacists, scientists, etc.) and sellers (e.g., drug companies, research reagent suppliers, etc.) of products, e.g., temperature sensitive products, stocked and stored in such units and systems.

The automated product storage unit described below in the exemplary embodiment is a cold storage unit designed with refrigeration components but may also be implemented as an ambient temperature storage unit for non-temperature sensitive products without the refrigeration components.

Thus, a first aspect of the invention concerns automated product storage units. Such automated storage units comprise a housing (single or multi-piece) that includes at least one product access panel to facilitate loading and/or retrieving products stored therein. Inside the housing, at least one storage area framework is disposed, which framework comprises a plurality (i.e., two or more) of independently addressable storage bays each configured to store one or more product containers and/or empty and/or loaded product carriers. The storage area framework can be modular, in that it does not have any requirement for a particular configuration. As such, the independently addressable storage bays can be any desired shape, size (e.g., height, width, and/or depth), etc. A particular storage unit can have storage bays of the same or different shape, size, or other design for example, to accommodate product containers and/or product carriers of different sizes, shapes, etc. For example, some storage bays in a storage unit of the invention may be configured to accommodate carriers adapted to hold prefilled, single-use syringes, while other storage bays in the same unit are designed to accommodate carriers that hold 1, 2, or more vaccine-containing vials, while still other storage bays in the unit are designed to receive product carriers adapted to accommodate large, multi-dose vaccine vials. The automated product storage units of the invention can include one or more storage area frameworks configured for the desired application.

Inside the housing, at least one accessible storage zone bounds a volume that encloses at least a portion of the plurality of independently addressable storage bays in the storage area framework(s). In some embodiments, the storage unit includes two or more (i.e., first, second, etc.) accessible storage zones, each of which bounds physically distinct volumes that each include a portion of the plurality of independently addressable storage bays in the storage area framework(s) inside the housing. Preferably, each storage zone includes at least one environmental parameter sensor, for example a temperature sensor, a relative humidity sensor, a light sensor, a motion sensor (e.g., an accelerometer). Sensors may be positioned individually or in arrays of two or more like or different sensors. Sensing of environmental parameters using one or more such sensors allows real-time periodic or continuous monitoring and recording of the environment (particularly temperature) in which products are stored in the particular accessible storage zone of the storage unit. Analysis of data from such sensors allows correlations to be drawn about, for example, the temperature (or temperature range) of a particular product at a particular time at a given position inside the automated product storage unit. In some embodiments having the capability of controlling one or more environmental parameters in one or more of accessible storage zone(s) inside the unit, data gathered from environmental parameter sensor(s) is used to control operation of corresponding systems, for example, a climate control system (e.g., a refrigeration system, a heating system, or a combination of refrigeration and heating systems) to maintain a desired temperature (or temperature range) within one or more particular accessible storage zones, a humidification system to maintain a desired humidity level (or humidity range), alighting system to maintain a desired lighting level (or lighting range), etc. within one or more corresponding accessible storage zone(s).

In some preferred embodiments, an automated product storage unit according to the invention further includes at least one drawer. The housing includes an opening for each drawer. In those embodiments where the automated product storage unit is a cold storage unit designed to store temperature-sensitive products such as pharmaceuticals (e.g., biologics such as vaccines, cell-based therapies, etc.), at least one drawer is temperature controlled, for example, by forced air cooling or by thermal communication with a temperature-controlled cold storage zone and can be accessed by a user. When a drawer is opened, a user can access its contents. As will be appreciated, any suitable temperature control system, e.g., forced air refrigeration, can be adapted for use in the context of the invention.

The particular number, size, configuration, etc. of storage zones, the particular number, size, configuration, etc. of the storage area framework(s), the particular size, configuration, etc. of the corresponding independently addressable storage bays, the particular size, configuration, etc. of the loading zone, the particular size, configuration, etc. of the computer, the particular size, configuration, etc. of the robot and end effector, and, if present, the particular size, configuration, etc. of the air management system (e.g., a forced air refrigeration system) may vary and will be determined based on the intended use of the particular automated product storage unit.

In some embodiments, in the automated storage unit, preferably an automated cold storage unit, a product loaded into the unit from the loading zone can be stored in an independently addressable storage bay proximate to the loading zone before being moved to an independently addressable storage bay further from the loading zone.

In some embodiments, the automated storage unit, preferably an automated cold storage unit, the independently addressable storage bays of the storage area framework(s) can be filled to capacity with product container(s) and/or loaded product carriers, where the position of a given unit of product at any time can be identified by bay location. In some of these embodiments, a unit of product stored in a first independently addressable storage bay can be relocated to a different independently addressable storage bay in order to optimize product loading and/or dispensing.

In some embodiments, the automated storage unit, preferably an automated cold storage unit, can include one or more of the following independently selected features, articles, structures, and or functionalities: (a) a reader, for example, a barcode reader, to identify products (e.g., temperature sensitive products) loaded into or removed from the cold storage unit via the loading zone; (b) a plurality of product carriers disposed in a plurality independently addressable storage bays, wherein each storage bay may include at least one empty or loaded product carrier; (c) each sensed loading slot of the movable loading tray is associated with a sensor, optionally a capacitive sensor, configured to sense whether the slot contains a product container or product carrier, wherein the movable loading tray can preferably move between a first position in the loading zone to a second position in an adjacent accessible storage zone (preferably a temperature-controlled cold storage zone), wherein when in the second position the robot's end effector can operably interact with at least one of the loading tray's loading slots to move one or more product containers or product carriers between the loading tray and end effector; (d) each storage area framework is a modular array, which array may have a plurality of differently sized or shaped storage bays (this providing accommodation for, e.g., product containers and/or product carriers of different sizes, shapes, etc.). In some embodiments, the storage array may comprise columns and rows of independently addressable storage bays of the same or different sizes each operably accessible to the end effector. Optionally, each modular array may comprise a series of substantially parallel vertical members, and optionally substantially parallel horizontal members, spaced to produce the plurality of independently addressable storage bays of the same or different sizes, each of which is configured to accommodate a product container or empty or loaded product carrier. Storage bays of two or more different sizes may thus be present in the storage area framework(s), in which event a plurality of differently sized product carriers are preferably used, where each of differently sized product carriers is configured to be positioned in at least one storage bay in the storage area framework(s). In preferred embodiments, a product carrier will include one or more features or elements to facilitate secure placement in a storage bay, typically through the inclusion of complementary structures (e.g., rails and ledges or flanges) on product carriers and in storage bay interiors; (e) each of the plurality of independently addressable storage bays may define a chamber, optionally a rectangular chamber, having an open end that is accessible to the end effector for insertion and removal of a (temperature sensitive) product container or empty or loaded product carrier. Preferably, each storage bay optionally comprises a series of spaced, substantially parallel vertical members, and optionally substantially parallel horizontal members, wherein the vertical members may contain one or more flanges to engage and suspend one or more (temperature sensitive) product containers or empty or loaded product carriers, which flanges may optionally include one or more detents to engage a corresponding structure on a product carrier; (f) the robot is a multi-axis robot configured to move the end effector vertically and horizontally in order to allow the end effector to place or remove one or more (temperature sensitive) product containers or empty or loaded product carriers in or from the independently addressable storage bays in the storage area framework(s); (g) each independently addressable storage bay is configured to receive a product carrier adapted to (A) hold a (temperature sensitive) product container and (B) be engaged by the end effector for movement inside the automated (cold) storage unit; (h) a primary power supply and, optionally, a backup power supply, optionally comprising one or more batteries; (i) a security interface to control internal access to the automated (cold) storage unit, wherein such access control optionally comprises a login code verification and/or a biometric sensor scan; ( ) the product access panel comprises a door positioned above the loading zone, wherein the door optionally can open partially or completely to expose one or more of the sensed loading slots in the loading tray in the loading zone; (k) product carriers to carry (temperature sensitive) product containers stored in the automated (cold) storage unit, wherein each product carrier includes a latch configured to be releasably but connectedly engaged by an adaptor of the end effector; (l) the temperature of each cold storage zone is monitored by one or more temperature sensors and temperature data from the temperature sensors is stored in a memory associated with at least one of the cold storage unit's one or more computers; (m) in embodiments that include temperature monitoring and/control, the storage zone temperature(s) is(are) displayed on a display panel visible to a user of the automated (cold) storage unit; (n) a touchscreen interface to provide user access to the automated (cold) storage unit and information regarding its operation and/or stored product inventory.

In many embodiments, the automated (cold) storage unit of the invention further comprises a plurality of (temperature sensitive) product containers stored in a plurality of independently addressable storage bays, at least some of which are stored in product carriers. In some of these preferred embodiments, the product containers contain a pharmaceutical product, for example, a biologic drug, vaccine, or cell composition. In some of these embodiments, the plurality of (temperature sensitive) product containers are for the same type of (temperature sensitive) product type, while in others, the plurality of (temperature sensitive) product containers contain two or more different types of (temperature sensitive) products. In many embodiments, an automated (cold) storage unit of the invention can store between 2 to about 10,000 or more units of (temperature sensitive) product, preferably about 10 to about 2,000 units of (temperature sensitive) product.

A related aspect of the invention relates to automated (temperature sensitive) product management systems. Such systems include at least one automated (temperature sensitive) product storage unit of the invention, and preferably 2-1,000 or more such storage units, in electronic communication with a network-based, optionally a cloud-based, inventory management system. The inventory management system preferably provides one or more of the following functionalities or services: (a) tracking of (temperature sensitive) product inventory stored in the system's automated (cold) storage unit(s); (b) tracking of (temperature sensitive) product dispensing and stocking transactions in the system's automated (cold) storage unit(s); (c) tracking expiration dates of individual (temperature sensitive) product containers stored in the system's automated (cold) storage unit(s); (d) generating inventory alerts and/or re-ordering of (temperature sensitive) products when inventory becomes depleted in one or more of the system's automated (cold) storage unit(s); (e) expired (temperature sensitive) product and/or about-to-expire messaging; (f) (temperature sensitive) product recall messaging; (g) (temperature sensitive) product billing messaging.

In some preferred embodiments of this aspect, the systems further comprise network-based, optionally cloud-based, system administration. Such system administration can include one or more of the following functionalities or services: (a) monitoring automated (cold) storage unit location information; (b) monitoring information related to the physical status of the automated (cold) storage unit(s) administered by the system, which information includes unit function, power, temperature, and/or environmental parameter, optionally temperature, sensor data; (c) maintaining and monitoring communication to and from the system's automated (cold) storage unit(s); (d) monitoring automated (cold) storage unit access; (e) facilitating automated (cold) storage unit maintenance; (f) monitoring automated (cold) storage unit contents; (g) maintaining user access control to the contents of the system's automated (cold) storage unit(s); (h) capability to electronically communicate with one or more third parties, optionally vendors of (temperature sensitive) products stored in the system's automated (cold) storage unit(s), regulatory authorities, and health insurance companies.

Another aspect of the invention concerns methods of managing a (temperature sensitive) product inventory. Such methods generally include storing a (temperature sensitive) product inventory in an automated (temperature sensitive) product storage unit of the invention that is in electronic communication with a network-based, optionally cloud-based, inventory management system, and using the inventory management system to manage the (temperature sensitive) product inventory.

Other objects, aspects, embodiments, features, and advantages of the invention will be apparent from the following description, drawings, and claims.

BRIEF DESCRIPTION OF THE DRAWINGS

These and other aspects will now be described in detail with reference to the following drawings. Unless otherwise indicated, it is understood that the drawings are not to scale, as they are intended merely to facilitate understanding of the invention as opposed to specific dimensions, etc. In the drawings, like numbers in two or more drawings represent like elements. In the figures, similar symbols typically identify similar components, unless context dictates otherwise. The illustrative embodiments described herein are not meant to be limiting. Other embodiments may be utilized, and other changes may be made, without departing from the spirit or scope of the subject matter presented here.

FIGS. 17A-17B contain a flow diagram overview of product placement from loading tray into the storage array by gantry and end-effector robots. The protocol is for the storage of exemplary 20 products in carriers in storage bays when adjacent bay positions are not available.

Figure 1A:
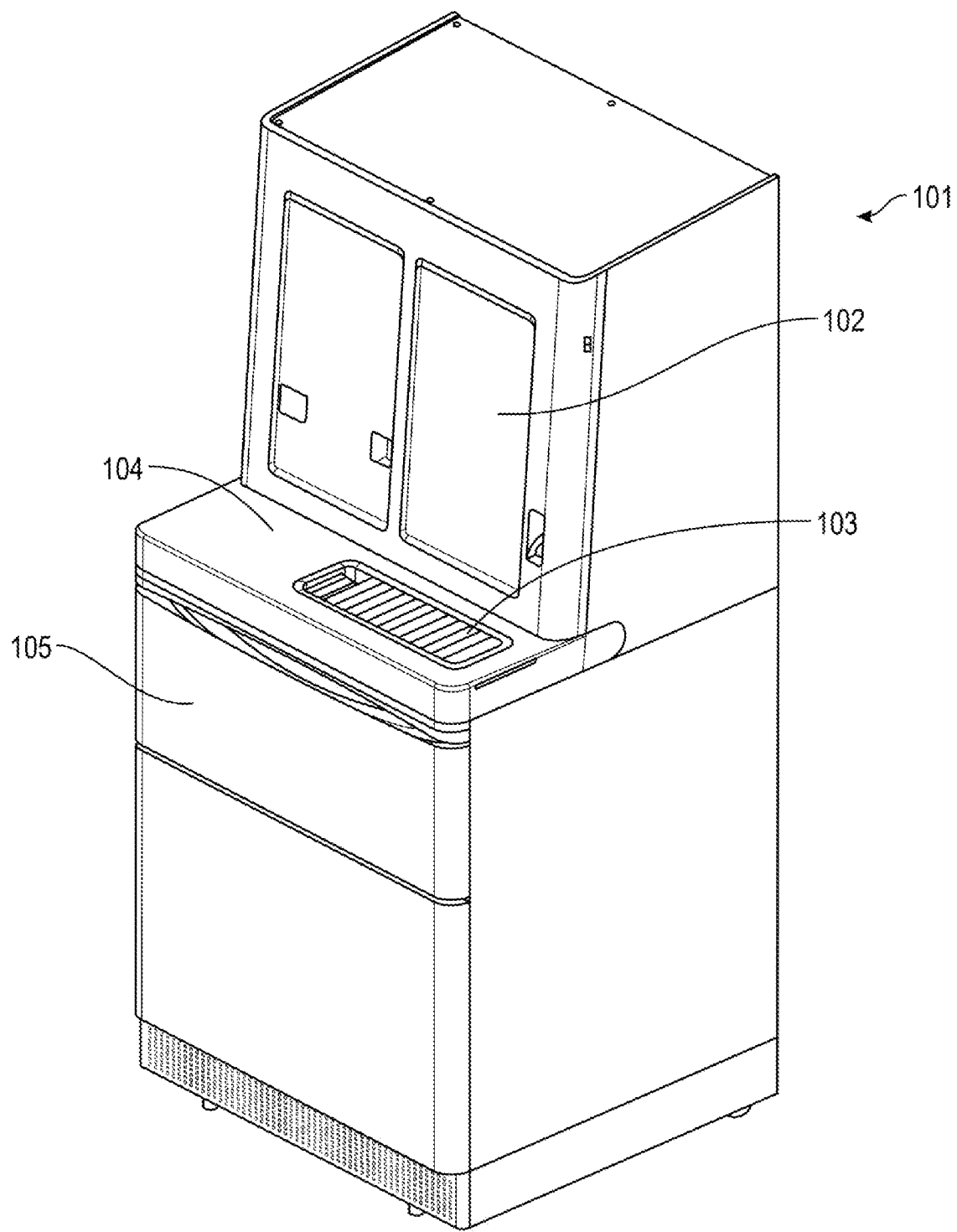
FIG. 1A is a perspective view of the exterior of the automated cold storage unit.

As those in the art will appreciate, the following detailed description describes certain preferred embodiments of the invention in detail, and is thus only representative and does not depict the actual scope of the invention. Before describing the present invention in detail, it is understood that the invention is not limited to the particular aspects and embodiments described, as these may vary. It is also to be understood that the terminology used herein is for the purpose of describing particular embodiments only, and is not intended to limit the scope of the invention defined by the appended claims.

DETAILED DESCRIPTION OF THE INVENTION

The contents of this Detailed Description are organized, for clarity and not by way of limitation, under the following headings: Definitions; Overview; Representative Embodiments: Storage Unit; User Interface device (UID); Reader; Application Service Provider (ASP); Alerts; and Inventory Management.

Definitions

Unless defined otherwise, all technical and scientific terms used herein have the same meaning as is commonly understood by one of skill in the art to which this invention belongs. All patents and publications referred to herein are, unless noted otherwise, incorporated by reference in their entirety. In the event a definition in this section is not consistent with definitions elsewhere, the definition set forth in this section will control.

As used herein, "cold storage unit" refers to an appliance that cools the interior compartments to temperatures below the ambient temperature of the room, is designed for the storage of temperature sensitive products, including pharmaceutical products, in compliance with regulatory requirements, and is fitted with sensors, devices and a computer as described hereinafter. The cold storage unit contains compartments above zero degrees Celsius (0° C.) and may or may not provide a freezer compartment with temperatures below 0° C. The refrigeration components are optimized to maintain a selected temperature with minimal fluctuations. The unit is a low humidity, frost free, cold storage unit with calibrated temperature monitoring sensors located at a point or points within the compartments which most accurately represents the temperature profile of the pharmaceutical product. is equipped with alarms to indicate temperature excursions and/or refrigeration failure, and has lockable doors meeting the guidelines of the World Health Organization (WHO), as described in "WHO Expert Committee on Specifications for Pharmaceutical Preparations", WHO technical Report Series 961, 2011 (Report found on www.who.int/en/) and Centers for Disease Control and Prevention (CDC) "Guidelines for Maintaining and Managing the Vaccine Cold Chain" (www.cdc.gov/mmwr/preview/mmwrhtml/mm5242a6.htm).

As used herein, "automated smart cold storage" refers to a cold storage unit which provides automatic handling of the products stored within, a computer in communication with an Application Service Provider (ASP; and is designed for storing, monitoring, and maintaining a supply of temperature sensitive products, including pharmaceutical products, as described herein.

As used herein, "automated cold storage" refers to a cold storage unit which provides automatic handling of the products stored within, a computer(s) to manage the automation and inventory, and is designed for storing, monitoring, and maintaining a supply of temperature sensitive products, including pharmaceutical products, as described herein.

As used herein, "automated smart storage" refers to a storage unit which provides automatic handling of the products stored within, a computer in communication with an Application Service Provider (ASP) and is designed for securely storing and monitoring a supply of products, including products that do not require refrigeration, are light sensitive and/or require temperature of storage monitoring, as described herein.

As used herein, "automated storage" refers to a storage unit which provides automatic handling of the products stored within, a computer(s) to manage the automation and inventory, and is designed for securely storing and monitoring a supply of products, including products that do not require refrigeration, are light sensitive and/or require temperature of storage monitoring, as described herein.

As used herein, "gantry robot" refers to a framework, circuit boards, software, and the individual members, e.g. motors, pullies, rails, belts and rollers, that control the motion of an X-axis arm up and down along the Z-axis of the unit and the motion of an end effector a carriage along the X-axis, as described herein.

As used herein, "end effector robot" refers to a robot that typically has at least one, and preferably two or more, arms used to interact with a product and or product carrier. The degrees of freedom of the end-effector will depend on many factors, including whether it is intended to grasp or hold a carrier or temperature sensitive product. A gantry robot moves the end effector robot along the Z and X axis and the end effector robot moves a product and or product carrier along the Y axis. The end-effector robotic arm(s) moves along a Y axis direction to place or retrieve products, or carriers, to and from the end effector robot slip(s).

As used herein, "carrier" refers to a product-holding container designed to be moved by a gantry and/or other robot, for example an end effector robot, and to securely but removably fit into a storage bay in a storage unit. Preferably, a carrier is designed to hold one product type that may come, for example, in the form of a vial, two vials, a syringe, a tube, or a package. When multiple product types are to be stored in a particular cold storage unit, carriers designed to hold the different products types are utilized. Unlike a carrier, a "retainer" is not meant to be moved by a robot. Instead, it is affixed at particular location in the cold storage unit, for example in a storage bay, the loading zone, etc., and is designed to securely hold or retain a product in a particular location until a robot moves it to another location, e.g., to another retainer or to a carrier.

As used herein, "cleanable surface" of a cold storage unit is made of materials that are acceptable in a medical environment and can be cleaned and/or wiped with sterilization and/or cleaning chemicals and cloths as required by WHO regulation or best practice methods. The material is a durable, corrosion free material such as stainless steel, hard plastic or resin, and the surface is smooth with minimal number of seams.

As used herein, "Automatic Identification and Data Capture" (AIDC) refers to methods of automatically identifying objects using a device that collects data about the object and transfers the data directly into computer systems. Technologies typically considered as part of AIDC include bar code readers, Radio Frequency Identification (RFID), biometric scanners, magnetic strip reader, Optical Character Recognition (OCR), smart cards, and voice recognition.

As used herein, "reader" is a device used to obtain the identity of, and information related to, a specific product, using a method referred to as Automatic Identification and Data Capture (AIDC), by scanning, detecting, or capturing an image of a product in order to identify embedded information on the product. AIDC technologies include bar codes, Radio Frequency Identification (RFID), biometrics recognition, magnetic stripes, Optical character recognition (OCR), smart cards, and voice recognition.

As used herein, a "camera" may be used as a reader device to capture an image of a product with the portion displaying a barcode. The camera transfers the data to the UID for analysis by barcode recognition software (see, e.g. Barcode Xpress available from m-Surf Lab at http://www.msurflab.com/).

As used herein, "barcode" refers to an optical symbol, machine readable, containing information about the product on which it is displayed. The barcode may be one dimensional, a collection of bars of various widths representing the descriptive characters, two dimensional collection of symbols for example known as a Quick Response Code (QR), or three dimensional, where for example a 2D image includes color and further expands the amount of information captured.

As used herein, "barcode reader" refers to an electronic device specifically designed for reading printed barcodes. The reader may use ambient light and light sensors to capture the image of the barcode or it may consist of a light source, a lens and a light sensor translating optical impulses into electrical ones. Additionally, nearly all barcode readers contain decoder circuitry analyzing the barcode's image data provided by the sensor and sending the barcode's content to the scanner's output port (see, e.g., The LS3008 rugged handheld scanner by Motorola designed for the healthcare industry or the Motorola SE330X which can be integrated into a device, on the Motorola web site at www.motorola.com).

As used herein, "Radio-frequency identification" (RFID) refers to a reader that uses radio-frequency electromagnetic fields to transfer data from a tag attached to a product for the purposes of automatic identification and tracking. The tag does not require a battery as it is powered by the electromagnetic fields used to read them. The tag contains electronically stored information which can be read from up to several meters away. Unlike a bar code, the tag does not need to be within line of sight of the reader and may be embedded in the tracked object (see, e.g. UHF Mobile RFID Reader for Smartphones and Tablets, by IDBLUE at www.idblue.com).

As used herein, "magnetic strip reader" or "magnetic card reader" refers to a device with a guide for swiping and reading a magnetic card for example containing an access identification code of the designated user. Exemplary devices include MagTek Mini Swipe Magnetic Strip Reader, available from MAGTEK® (see, e.g. magtek.com) where data is sent to the UID via a USB port and may be viewed in applications such as Windows® Notepad without requiring additional drivers or application programming.

As used herein, "biometric reader" refers to a reader that uses for example a fingerprint or a retinal or facial recognition scan as a security measure to identify an authorized user of a cold storage unit. For example a finger print recognition controlled access implements a finger print scanner, embedded in the user interface device, and software to analyze the scan. Scanners and software are readily available (see e.g. Mercury™ Series OEM Module from Lumidigm at www.lumidigm.com).

As used herein, "cellular modem" refers to a device that adds wireless connectivity to a laptop or desktop computer. Typically available as an external USB module, the modem may also be on a PCI or PCI Express (PCIe) card that plugs into an empty slot on the motherboard. Cellular modem are available and known to those of skill in the art.

As used herein, "user interface device" (UID) is a computer in communication with the industrial PC main board, cold storage unit components, and an ASP. The UID is docked, or mounted, in a docking station connected to or embedded in the unit. The UID contains wired and wireless network adapter cards and remains fully functional when docked or undocked maintaining communications with the unit via a short range wireless communication device embedded in the unit. The UID, preferably a touch screen computer with a virtual onscreen keyboard, can access the internet via a wireless link to a local wireless network, a wireless communication through a cell phone transceiver embedded in the unit, or a cable connection through a docking station. The UID contains an operating system and software required to capture data from sensors and readers on or within the cold storage unit, send and receive data from an ASP, capture manually entered data, and display information.

As used herein, an "industrial PC main board" refers to a computer intended for industrial purposes with a form factor between a nettop and a server rack. The industrial PCs has higher dependability and precision standards than consumer electronics and uses more complex instruction sets, such as x86.

As used herein, "tablet" refers to a self-contained computer with a wireless or wired internet connectivity that uses a touch screen with virtual keyboard capabilities for data access and entry.

As used herein, "wireless" refers to a type of communication in which power and/or data is transferred over a distance without the use of electrical conductors or wires. For example, electromagnetic waves, light waves, or acoustic waves can be used to carry power and/or data over a distance without using electrical conductors or wires.

As used herein, "cloud-based host" refers to a third party provider server farm located in a centralized location, away from the individual cold storage units, implemented as a service, maintaining communications with individual computers and users via the web. The data, software and programming are centralized on the server farm.

As used herein, "Application Service Provider" ("ASP") refers to a cloud-based hosted environment business that provides computer-based services to customers over a network. A user requires only a browser and an internet/intranet connection on their desktop, laptop, or other network access appliance to obtain substantially complete secure access to that system. Software offered using an ASP model is also sometimes called on-demand software or software as a service (SaaS) and may be accessed using standard protocol such as Hypertext Transfer Protocol (HTTP), foundation of data communication for the World Wide Web (see, e.g., ASP hosted services provided by NetSuite, Inc. of San Mateo, Calif. such as NetSuite™ Oracle® Small Business Suite, NetCRM™, and NetERP™, descriptions of which can be found at www.netsuite.com).

The ASP utilizes one or more software application programs, routines or modules configured to be executed by a general purpose microprocessor, in one or more hardware devices, such as a programmable logic controller (PLC). The user benefits from having access to highly specialized software without the cost of purchasing, servicing and upgrading the software as well as access to ASP provided information and resources related to the products.

A used herein, "service provider" refers to a business that oversees and maintains the automated cold storage system in all its functions as described herein.

As used herein a "product descriptor", refers to product information generated by the ASP provided software that combines data received from the UID and information available from product manufacturer. Product descriptor information includes for example: product name and dosage, lot numbers and associated expiration date, recommended temperature for storage, and compartment location.

As used herein, "HL7" refers to a data format adapted by the healthcare industry for sharing information within the health care field. The document format is developed by Health Level Seven (HL7), a non-profit organization involved in the development of international healthcare informatics interoperability standards.

As used herein, "Electronic data interchange" or "EDI" refers to a data format adapted for communication between a healthcare provider and a vendor for example. EDI is the structured transmission of data between organizations by electronic means and without human intervention as defined by the National Institute of Standards and Technology.

As used herein, a "HIPPA" refers to "The Health Insurance Portability and Accountability Act of 1996" wherein it protects the privacy of individually identifiable health information; the HIPAA Security Rule, which sets national standards for the security of electronic protected health information.

As used herein, "regulatory requirements" refers to the regulations related to a cold storage unit for storage of temperature sensitive pharmaceutical products as defined by the World Health Organization (WHO) qualification requirements for cold storage of Time and Temperature Sensitive Pharmaceutical Products (TTSPP) (see, "WHO Expert Committee on Specifications for Pharmaceutical Preparations", WHO technical Report Series 961, 2011, available at www.who.int/) and Centers for Disease Control and Prevention (CDC) "Guidelines for Maintaining and Managing the Vaccine Cold Chain" (www.cdc.gov/mmwr/preview/mmwrhtml/mm5242a6.htm).

As used herein, a "web site" is a set of related web pages containing content such as application software, text, images, video, audio, etc. A website is hosted on at least one web server, accessible via a network such as the Internet or a private local area network through an Internet address known as a Uniform Resource Locator. All publicly accessible websites collectively constitute the World Wide Web.

As used herein, "par level" is a predetermined inventory level of a specific product. When ordering or re-ordering product the goal is to increase inventory to the predetermined par level. The predetermined par level takes into consideration the physical maximum quantity of the specific product that can be physically accommodated by the storage unit, the shelf life of the product, and historical product dispense records.

As used herein, "re-order point" is the inventory level at which a re-order message is generated. The re-order point takes into account lead time for dispense rate, order processing, and product delivery in order to avoid stocking out of the product. The re-order point quantity of product to be ordered is determined by the difference between current inventory and the predetermined par level.

As used herein, "critical low" is an inventory level whereby a re-order would not arrive in time to avoid a zero count of stock, "stock-out", based on expected dispense rate, and manual intervention such as placing an overnight shipping order may be required.

As used herein, "biologic" is a pharmaceutical product manufactured in, extracted from, or semi synthesized from biological sources. A biologic is composed of sugars, lipids, peptides, proteins, nucleic acids or combinations of these substances and may be a vaccine, blood or a blood component, allergenic, somatic cell, gene therapeutic product, recombinant therapeutic protein or nucleic acid, or living cells that are used as therapeutics to treat diseases.

As used herein, "potency" is a measure of the pharmaceutical product activity expressed in terms of the amount required to produce an effect of given intensity. Exposure to improper storage temperatures may decrease potency of a pharmaceutical product due to decomposition and/or denaturation of the product and/or by destabilizing the formulation of the product.

As used herein, "effectiveness" refers to the ability of a pharmaceutical to produce a beneficial effect.

The "Centers for Disease Control and Prevention" (CDC), a division of Department of Health and Human Services, which among its many roles also provides guidelines for proper handling and storage of vaccines. The guidelines may be found at www.cdc.gov/mmwr/preview/mmwrhtml/mm5242a6.htm.

As used herein, "point of care" is a location at or near the location where the pharmaceutical product is administered to a patient. Locations may include a physician's office, a physicians practice group suite, a clinic, a pharmacy, and a hospital.

As used herein, "business hours" refer to a time period of the day when pharmaceuticals are administered to patients and the cold storage unit is likely to be opened frequently.

A "plurality" means more than one.

A "patentable" method, machine, or article of manufacture according to the invention means that the subject matter satisfies all statutory requirements for patentability at the time the analysis is performed. For example, with regard to novelty, non-obviousness, or the like, if later investigation reveals that one or more claims encompass one or more embodiments that would negate novelty, non-obviousness, etc., the claim(s), being limited by definition to "patentable" embodiments, specifically exclude the unpatentable embodiment(s). Also, the claims appended hereto are to be interpreted both to provide the broadest reasonable scope, as well as to preserve their validity. Furthermore, if one or more of the statutory requirements for patentability are amended or if the legal standards change for assessing whether a particular statutory requirement for patentability is satisfied between the time this application is filed or issues as a patent to a time the validity of one or more of the appended claims is considered in a post-issuance proceeding, the claims are to be interpreted in a way that (1) maximally seeks to preserves their validity and (2) provides the broadest reasonable interpretation under the circumstances.

Overview

As described above, the invention provides for smart, automated, product storage units capable of monitoring and preferably controlling environmental conditions inside the unit (particularly preferred are automated cold storage units for the storage and management of temperature-sensitive products such as pharmaceutical products, vaccine products, and the like), networked systems that utilize such automated storage units, and methods of using such automated storage units and systems. One aspect of the invention concerns the automated storage units themselves. Such units include a housing having at least one product access panel for accessing a loading zone to load and/or retrieve temperature sensitive products stored in the cold storage unit, although in some embodiments, the automated storage unit can include a loading zone for loading products and different loading zone for unloading products. In such embodiments, the loading and unloading zones may be accessed through the same or different access panels, depending on the design configuration of the particular automated storage unit.

Inside the housing, a user accesses a loading zone through an access panel, which may comprise one or more doors. Access panels may be a sliding door, a sliding paneled door (e.g. Tambour door) or may be a pair of sliding doors positioned above the loading area wherein the doors separate from a central point above the associated loading zone.

In the invention, an access panel is configured to allow passage of temperature sensitive or insensitive products (by loading or unloading) between the environment outside the automated storage unit and the housing interior. When an access panel is opened, the resulting opening or access port allows user access to a loading zone associated therewith (permanently or temporarily) in the automated storage unit's interior. Through the access port a user can directly load or unload products into or from the associated loading zone. In preferred embodiments, a user loads or unloads a product from a carrier in the loading zone that facilitates robot-mediated movement of the product inside the storage unit.

The automated storage units of the invention optionally include at least one reader (e.g., a barcode reader, a camera, an RFID detector, magnetic strip reader, etc.) to read information on the product, typically on the product's label. In preferred embodiments, a reader is positioned inside the housing near the access panel and associated loading zone in order to read information from products being loaded into and being withdrawn from a cold storage unit. In some embodiments, a reader is positioned outside or on the exterior of the cold storage unit's housing. Product information about a product to be loaded into, or dispensed from, the automated storage unit may also be captured, without the use of a reader, from an electronically provided product listing via the computer, entered manually via the UID, or when dispensing product selected from unit content listing.

A carrier carries and holds temperature sensitive products to be loaded into, stored, and removed from in the cold storage unit. Each carrier is preferably designed not only to hold a temperature sensitive product, which may be configured as, for example, a syringe or vial containing a liquid pharmaceutical product, two vials, a first vial that contains a lyophilized pharmaceutical product and a second vial that contains a diluent for the product, a tube containing a temperature sensitive research reagent composition (e.g., a restriction enzyme), but also to be picked up or otherwise engaged by a robot for transport within the cold storage unit. Examples of a structure useful for engaging the robotic arm, or pawl, of an end-effector robot is a latch or catch configured to be releasably but connectedly engaged by a complementary adaptor positioned at the end of the arm.

Empty carriers may be preloaded in the machine so that they appear in the loading zone ready for a temperature sensitive product to be loaded therein, or they may be added to an empty space in the loading zone prior to or after a product is placed therein, for example, by a user after the access panel is opened.

In some embodiments, particularly those that provide for refrigerated product storage, a loading zone is disposed on a loading tray that moves in relation to the access panel, and transitions between the loading zone and the storage zone though an internal partition that forms a seal between the climatically controlled storage zone and the loading zone. In many such embodiments, not all of the product holding locations (e.g., carriers or retainers) on the loading tray are accessible to a user when the associated access panel is open. Depending on the design of the particular automated storage unit, the access panel may vary in size and span a loading zone that for example includes an entire frontal section, or shelf, of a storage unit or a portion of a frontal section, or shelf, providing access to loading tray that varies in number of products holding positions, or slips. The loading tray may hold for example from 1 to 100 products. The number of loading trays may also vary allowing for the rotation of 1 or more loading trays between the loading zone and the storage zone docking station. For example an automated storage unit loading zone shelf can accommodate two trays where a second tray without product remains in the loading zone and either moves under the access panel for the uploading of product into the unit or moves to the docking station inside the storage zone for pick-up of additional dispensed product once first tray with product to be dispensed moves to the loading zone and under the access panel.

Optionally each holding position within the access zone of the loading tray is fitted with a sensor to detect the presence of a product within a carrier or a retainer. Exemplary sensors may include capacitive sensor, a light sensor, a weight sensor, a magnetic sensor, or other technologies that detect the presence of an object within a selected area of the loading tray. In a preferred embodiment the sensor is a capacitive sensing sensor that is positioned beneath or within the loading tray.

In the invention one or more industrial robots transport a temperature sensitive (or insensitive) product, either carried in a carrier or carried directly, when product packaging can function as a carrier, to different locations inside the cold storage unit, for example, from a loading zone to a location for temporary or long term storage in the automated storage unit. Any suitable industrial robot may be employed, including those that are electrically, hydraulically, or pneumatically driven.

Typically, a robot used in the invention includes a gantry robot that positions an end effector robot in the vertical and horizontal position to align the end effector with a selected location within a storage array or on the loading tray. The end effector robot typically has at least one, and preferably two or more, arms. Each arm preferably a pawl mechanism or a gripper to grasp, engage or hold a carrier or temperature sensitive product. The degrees of freedom of the end-effector will depend on many factors, including whether it is intended to grasp or hold a carrier or temperature sensitive product. Similarly, a robot's accuracy, repeatability, resolution, cycle time, speed, working envelope, and other operating parameters will depend on the particular application and cold storage design, and are well within the skill of those in the art.

In preferred embodiments, the gantry robot is centrally disposed in a hollow core of a storage area framework having multiple levels and multiple storage bays on each level. Such a robot preferably has an end effector robot that can move vertically along a central shaft that defines a Z axis of the gantry robot and horizontally that defines the X axis of the gantry robot. The end-effector robotic arm(s) moves along a Y axis direction to place or retrieve temperature sensitive products, or carriers therefore (be they empty or loaded with a temperature sensitive product), to and from the end effector robot slip(s) and to and from the loading zone and/or a different storage bay. In particularly preferred embodiments, the end effector robot has two slips, each slip can hold a carrier and/or product, and the robotic arms, pulling/pushing carriers and/or products in and out of the slips, can operate simultaneously or independently. Each slip has a pawl mechanism that is moved forward and backward along the Y axis and lowered and raised to engage the pawl mechanism with a carrier and pull/push the carrier in and out of the end effector robot slip. Optionally, each slip is fitted with a sensor to detect the presence and location of a carrier or retainer within the slip. In some embodiment the end effector robot has 1 slip or 3 or more slips and the slips may vary in size to accommodate carriers and or products of various sizes. In yet another embodiment multiple end effector robots may be implemented on the same or multiple gantry robot.

A storage area framework is a structure designed to have a number of independently addressable locations, i.e., storage bays, on at least one, and preferably 2 or more, levels such that each location can be readily accessed by the robot. Products, e.g., temperature sensitive products, are stored within storage bays in one or more storage area frameworks in cold storage units of the invention. Each storage bay is accessible to a robot in the automated storage unit intended to transport carriers and/or products within its working envelope. In this way, a particular unit of a temperature sensitive product can be stored and later retrieved, be it to make the product available to a user at a loading zone or to otherwise move a product from one location to another in the cold storage unit, for example, from a storage bay in one temperature-controlled cold storage zone to another (e.g., to provide for a faster product retrieval time in response to a user request, to move an expired product to a different location in the cold storage unit, etc.). Storage bays can also be designed to accommodate one carrier or more than one carrier. Those designed to store more than one carrier, typically placed in nose-to-tail fashion such that the end of each carrier designed to be engaged by the arm or pawl mechanism of an end-effector robot faces the storage bay opening that faces the robot. In such embodiments, the automated (preferably refrigerated) storage unit may include at least one, and preferably a number of storage bays or other storage locations designed for only transient carrier or product storage and thus generally unoccupied, or one of multiple end effector robot slips may remain empty to temporarily hold a carrier and/or product. Alternatively, one or more multi-carrier/product storage bays may contain fewer than the maximum number of carriers/products it is designed to accommodate. In this way, the robot can access a carrier (or product) stored behind another product or carrier in a particular storage bay by first moving the (those) carrier(s) nearest the robot to another location before returning to retrieve the targeted carrier or temperature sensitive product.

Generally, an automated storage unit of the invention has one storage area framework. In those embodiments that have two or more product storage zones, for example, an automated storage unit having two temperature-controlled (e.g., cold or refrigerated) product storage zones or an automated storage unit having one for temperature-controlled storage zone for refrigerated products and another product storage zone for unrefrigerated products, the framework includes an insulating layer between each cold storage zones, whereas in embodiments having two or more frameworks, they may each be disposed in the corresponding cold storage zone.

The storage area framework(s) can have any suitable configuration, which will be dictated by design considerations such as unit size, energy efficiency, and cost, the type of products (e.g., temperature sensitive products) to be stored (e.g., pharmaceuticals, research reagents, etc.), number of maximum number of products to be stored, the number of temperature-controlled storage zones that are to be included in the automated storage unit, whether one or more of the temperature-controlled cold storage zones will provide for subzero storage, the type and number of robot(s) to be used, etc.

A number of presently preferred embodiments concern storage area frameworks constructed of modular storage bays arranged on opposing walls of the storage area framework. Such a design works efficiently with a gantry robot positioned between the two opposing walls, as the robot can freely position the end effector robot by any selected storage bay. In such arrays, the storage bays may be arrayed vertically, or they may be offset. Arraying the storage bays vertically allows the framework to be comprised of a series of substantially parallel vertical members spaced horizontally to accommodate the width of the carriers used. The modular storage bays may vary in module size to accommodate the needs of the user and for example include modules with 1 to 100 rows and 1 to 100 columns and preferably include modules with 1 to 20 rows and 1 to 30 columns or more preferably include modules with 1 to 8 rows and 1 to 15 columns. Horizontal supporting members can be placed at fewer than every level in order to stabilize the vertical members or modular units with fewer, for example 4 rows, may be used that do not require addition horizontal support. For example, horizontal members may be placed at every second, third, fourth, fifth, sixth seventh, eighth, ninth, or tenth level, or even less frequently, although placing them at every level is also within the scope of the invention, as is omitting them, for example, from every third, fourth, fifth, sixth seventh, eighth, ninth, or tenth level, or even less frequently.

Arraying storage bays vertically also allows each of the plurality of storage bays to define a rectangular box open at least at the end that faces the robot capable of inserting and removing a temperature sensitive product or carrier therefor into or from the storage bay, as the case may be. Each such storage bay may optionally comprise a series of spaced, substantially parallel vertical members that contain ridges to engage and suspend carriers for temperature sensitive products.

In other embodiments, the storage bays have floors that a carrier can rest on after it is inserted into a storage bay by a robot.

Automated storage units of the invention preferably include at least one accessible, insulated, temperature-controlled cold storage zone that includes at least one temperature sensor, and often, 2, 3, 4, 5, or more such sensors. The cold storage zone(s) preferably provide storage temperatures between about VC to about 12° C., about 2° C. to about 8° C., about −100° C. to about 0° C., about −80° C. to about −5° C., and/or between about −50° C. to about −15° C. The temperature within each temperature zone can be pre-set to a temperature within the recommended storage temperature range for the products stored within and maintained within several degrees of that point. In some embodiments, a cold storage unit according to the invention includes two or more accessible, insulated, temperature-controlled cold storage zones, each of which bounds a different volume within the cold storage unit and encloses a portion of the plurality of storage bays in the storage area framework separate from the other cold storage zone(s).

Cold storage units according to the invention further include one or more refrigeration units to provide the desired temperatures in the cold storage zone(s) of the machine. Any suitable refrigeration unit(s) may be selected, and selection will depend on various factors known in the art, including the cold temperatures to be attained, the size of the cold storage unit and its cold storage zone(s), component configuration, installation location for the cold storage unit, etc. Cold storage zones thermally communicate with a refrigeration unit through ductwork.

In particularly preferred embodiments, a cold storage unit includes a plurality of stacked, accessible, insulated, temperature-controlled cold storage zones each having at least one temperature sensor and bounding a volume that encloses a portion of the plurality of storage bays in the storage area framework separate from the other cold storage zone(s). In these embodiments, any two adjacent cold storage zones are connected by a suitable resealable structure that prevents temperature variations in the adjacent, connected cold storage zones. In this way, 2, 3, 4, or more different cold storage zones can be connected such that accurate temperature control can be maintained in each zone.

One example of such a structure suitable for allowing a single robot to traverse two or more cold storage zones utilizes a sliding door to physically and thermally separate, and provide access between, two adjacent cold storage zones. The sliding door is designed to form a seal with an insulation layer between the two adjacent cold storage zones.

Automated storage units according to the invention also preferably include a backup power supply, preferably one powered by one or more batteries, preferably rechargeable batteries. The unit's computer preferably monitors the status (e.g., charge level) of back-up power supply to ensure it will function in the event of a power failure.

Automated storage units of the invention may also include an optionally activated security interface to control internal access to the cold storage unit. Such access control preferably requires a login code verification and/or a biometric sensor scan, in which event an interface is provided for entry of a login code and/or a biometric reader is provided to acquire biometric data from a user for subsequent verification.

The automated storage units of the invention employ one or more computers to control operation of the storage unit and its various components, to monitor and record data and information about the performance of the storage unit and its various components and products (e.g., temperature sensitive products) stored therein, and to display such data and information, or selected portions thereof, to users of the cold storage device and other interested parties. In preferred embodiments, such data and information is collected from multiple cold storage units according to the invention that comprise a network. Such network can be a local or wide area network. Connection between the various network elements (e.g., automated storage units, servers, and the like) are typically over an Internet network and may include other telecommunications network routes of communications.

In an automated storage unit of the invention, computing power is provided by one or several different but linked computers. In some embodiments, the computer is housed within the storage unit housing. In others, it is located in a UID that is docked to or otherwise in electronic communication with the automated storage unit such that it can control the storage unit's operation and receive, process, and store data and information from the storage unit's components, including its various sensors and readers. Any suitable computer, or combination of computing devices, including any necessary circuitry and other components (e.g., communication buses, memory, etc.). Thus, in the context of the invention, a "computing device," "computer," and analogous expressions refer to one or more devices including at least a tangible computing element. Examples of a tangible computing elements include a microprocessor, application specific integrated circuit, programmable gate array, and the like. Examples of a computing device include, without limitation, a mobile computing device such as a smart phone or tablet computer, a wearable computing device (e.g., Google® Glass), a laptop computer, a desktop computer, an industrial PC, a server, a client that communicates with a server, a smart television, a game console, a part of a cloud computing system, or any other form of computing device. The computing device preferably includes or accesses storage for instructions used to perform steps to control components of a cold storage unit, for example, the access panel(s), robot(s), refrigeration unit(s), temperature sensors, light source(s) and detector(s), etc., to collect and process data from various sensors, and, in preferred embodiments, to operate in a networked environment that operates under an ASP model.

The computer of a cold storage system may be implemented as a special purpose data processor, a general-purpose computer, an industrial PC, a computer system, or a group of networked computers or computer systems configured to perform the steps of the methods described in this document. In preferred embodiments, the computers of two or more cold storage units are interconnected by a network. Typically, a computer of a cold storage system includes a processor, read only memory (ROM), random access memory (RAM), network interface, a mass storage device, and a database that is used to store and organize data about the storage unit's operation and products stored therein. The database may be a physically separate system coupled to the processor. In alternative embodiments, the processor and the mass storage device may be configured to perform the functions of the database. The computer's components are coupled together by a bus.

The processor may be a microprocessor, and the mass storage device may be a magnetic disk drive. The mass storage device and each of the memory modules are connected to the processor to allow the processor to write data into and read data from these storage and memory devices. For networking, a network interface couples the processor to the network, for example, the Internet. The nature of the network and of the devices that may be interposed between a cold storage unit's computing system and the network determine the kind of network interface to be used. In some embodiments, for example, the network interface may be an Ethernet interface that connects the system to a local area network, which, in turn, connects to the Internet to form a wide area network that may, in fact, include a collection of smaller networks. In some embodiments, a cold storage unit's internet connection uses a local internet router, hardwired or wireless, or a cell phone card embedded in the cold storage unit.

The processor reads and executes program code instructions stored in the ROM module, the RAM module, and/or a storage device. Under control of the program code, the processor configures the system to control the cold storage unit's operation and, in networked embodiments, to communicate with a service provider to send and receive data and information over the network to which the storage unit is connected. In addition to the ROM/RAM modules and storage device, the program code instructions may be stored in other machine-readable storage media, such as additional hard drives, flash memories, legacy media such as floppy diskettes, CD-ROMs, and DVDs, and other machine-readable storage media and/or devices. The program code can also be transmitted over a transmission medium, for example, over electrical wiring or cabling, through optical fiber, wirelessly, or by any other form of transmission. The transmission can take place over a dedicated link between telecommunication devices, or through a wide area or a local area network, such as the Internet, an intranet, an extranet, a cloud computing environment or portion thereof, or any other kind of public or private network. The program code can also be downloaded into the system through a network interface.

In preferred embodiments, a computer is implemented as a user interface device (UID), preferably a tablet computing device either docked on the cold storage unit or wirelessly connected thereto. In networked systems that comprise a plurality of cold storage systems connected via an internet network, a UID communicates with an application service provider (ASP). A UID typically includes a touch screen or keypad or keyboard and display to display and access information stored in the computer, as well as to allow a user to enter information into the computer. In some embodiments, a computer drives a UID such as a touchscreen display, as well as controls the other functions of the automated, temperature-monitored and -controlled storage unit.

In some embodiments that employ a UID as an automated storage unit's computer, a part thereof, the UID is configured to display a home screen that shows information about the automated storage unit and its contents. Such information may include, for example, the names, dosages, quantities, and/or expiration dates of temperature sensitive products stored in the cold storage unit; the current temperature and/or a temperature history of the cold storage zone(s); alerts; and/or the order status of additional temperature sensitive products ordered for storage in the cold storage unit. Displayed information may also include information about the temperature sensitive products stored in the storage unit. Such information can include, for example, the location of individual unit(s) of such temperature sensitive product by storage bay, cold storage zone, and/or temperature zone; temperature history; lot number(s); expiration date(s); and/or internet links to additional information (e.g., package inserts, dosing information, recall information, etc.) about a particular temperature sensitive product.

As described, another object of the invention concerns automated management systems for valuable products, for example, temperature sensitive products. Such systems include an automated temperature sensitive product cold storage unit according to the invention in communication with an ASP, preferably a cloud-based hosted ASP environment that provides inventory management, system administration, alerting, and/or reporting services, wherein the storage unit includes a computer, for example, a UID, to provide user access to the cold storage unit and information regarding its contents and/or operation, a data collection system wherein the cold storage unit's computer (e.g., UID) and/or the ASP capture and store data related to the cold storage unit and temperature sensitive products stored therein.

In the context of inventory management, the systems of the invention allow, for example, one or more of the real-time tracking of the inventories of temperature sensitive products stored in each automated storage unit in the system, tracking of product dispensing and stocking transactions in each automated storage unit, tracking of expiration dates of individual temperature sensitive (and/or temperature) insensitive products, automated transmission of re-order messages when temperature sensitive product inventories become depleted in a particular cold storage unit, automated transmission of expired product and/or about-to-expire messages, and/or providing product and/or regulatory information about, for example, temperature sensitive products stored or to be stored in a particular cold storage unit. Other inventory management information that may be generated by such systems includes billing information about particular temperature sensitive products dispensed from a cold storage unit within such a system.

System administration services may include, for example, monitoring automated storage unit location information, monitoring information related to the physical status of one or more automated storage units in the system, including function, power, temperature, access panel operation, and/or temperature sensor data from each storage unit, maintaining communication between a given cold storage unit's computer, UID, ASP, and cell phone card applications, maintaining secure access between cold storage units and the ASP, facilitating cold storage unit maintenance, and updating software stored in a memory of one or more cold storage units within the system.

A system according to the invention can also be configured to provide alert information, typically by providing an alerting message to one or more pre-selected recipients and/or a UID upon the occurrence of an event intended to trigger an alert. With respect to a particular automated storage unit within the system, such events may include, for example, a cold storage zone temperature excursion that exceeds a preset threshold, inventory of a particular type of temperature sensitive product stock becoming depleted or reaching a preset lower limit, a temperature sensitive product having expired or that will expire within a preset number of days, and a power disruption to the cold storage unit.

A system according to the invention can also be configured to provide various types of reports, typically to authorized automated storage unit users, system administrators, maintenance personnel, sales representatives, billing agents, and the like. Reports can be standardized across the system, or they can be customized for particular users.

Related aspect of the invention concerns various methods of making and using the automated storage units and systems according to the invention. Among these are methods for managing a temperature sensitive product inventory. Such methods involve storing a plurality of temperature sensitive products in one or more cold storage units according to the invention, using the cold storage unit's computer (e.g., UID) to collect and store data related to the cold storage unit and the temperature sensitive products stored therein, and providing services via an ASP that uses software and servers in an Internet or cloud-based hosted environment to provide inventory management, system administration, alerting, and/or reporting services, as described above, plus such other services as are now known or may later be developed that can assist in the management of cold storage units according to the invention and temperature sensitive products. In presently preferred embodiments, such methods involve collecting data that includes some or all of the following data: descriptor data for temperature sensitive products; temperature sensitive product type and storage location in the cold storage unit; dispense and refill transaction data; reader acquired data; information entered manually or remotely by a user using a user interface on the computer, a UID, or other data entry device communicating with the computer; temperature sensor data for one or more cold storage zones; system security data; and/or cold storage unit and/or component function status.

Representative Embodiments

The following detailed description illustrates an embodiment of the invention by way of example, not by way of limitation of the principles of the invention. Various embodiments of the invention will be described by way of illustration with reference to various software tools, but it should be understood that other software tools that have comparable capabilities of the mentioned tools may be used.

Provided herein is an automated, smart cold storage unit and systems for preferably secure storage of temperature sensitive products (e.g., pharmaceuticals, research reagents, etc.) at preset temperatures. Such cold storage units and systems are preferably used to identify, track, and maintain inventories of temperature sensitive products at optimal levels and potency for compliance with regulatory requirements, if and where applicable. Below the inventors describe a particularly preferred embodiment of the invention where the cold storage unit provides one access point for the rapid loading and unloading of product to and from the unit minimizing product exposure to ambient temperatures and reducing time required by unit user to locate and obtain product from the unit. An array of storage bays functions as the storage area framework within the cold storage compartments, and is designed to hold a plurality of carriers, each carrying one product, moved from a loading tray to a storage location by a gantry and end effector robots. Products may be uploaded to the storage array up to 10 at a time with upload time range from approximately several seconds (e.g., about 5-30 seconds) per product filling and exemplary array with over 700 products in less than one hour. The unit operating system tracks the location of each product and the temperature near the product with multiple temperature sensors in each temperature zone. The cold storage unit devices such as temperature sensors, readers, locking mechanism, and security features communicate with a user interface device (UID), docked on the unit, via a direct hard wire link or a wireless connection. The UID controls access to the unit, collects data related to the status of the cold storage and its inventory content, and communicates with an ASP provided software in a cloud based hosted environment for inventory and information management.

Cold storage Unit

An automated smart cold storage unit in one exemplary embodiment is a smaller unit, designed for a point of care facility such as a physician's office, a clinic, or an onsite pharmacy. The unit 101, as shown in FIG. 1A in a three-point external perspective, has a load capacity of 720 product carriers, is approximately 65 inches tall with a footprint of about 30 inches wide by 28 inches deep. A user interface device (UID) 102 provides a user access to the unit, the products stored within the unit, and information related to the products. The UID, with an easy to view 21.5 in screen, can be accommodated above a frontal shelf of the unit providing the user with convenient access to the information at the unit. A loading area 103 is positioned on the right side of frontal shelf of the unit providing a convenient workspace 104 for the user on the left side of the shelf. A storage drawer 105 provides a climate-controlled storage space for products to be loaded or unloaded from the unit and/or can accommodate products of various sizes not stored in the robotics controlled internal storage array.

The exemplary unit contains two temperature zones that can be set to the commonly recommended temperatures for the storage of biologic pharmaceuticals. A first cold temperature zone is maintained between 2° C. and 8° C., and a second frozen temperature zone maintained between minus 15° C. and minus 50° C. The first temperature zone is maintained preferably between 3° C. and 7° C. and more preferably between 4° C. and 6° C. The second temperature zone is maintained preferably between minus 15° C. and minus 30° C., and more preferably between minus 15° C. and minus 25° C.

Figure 1B:
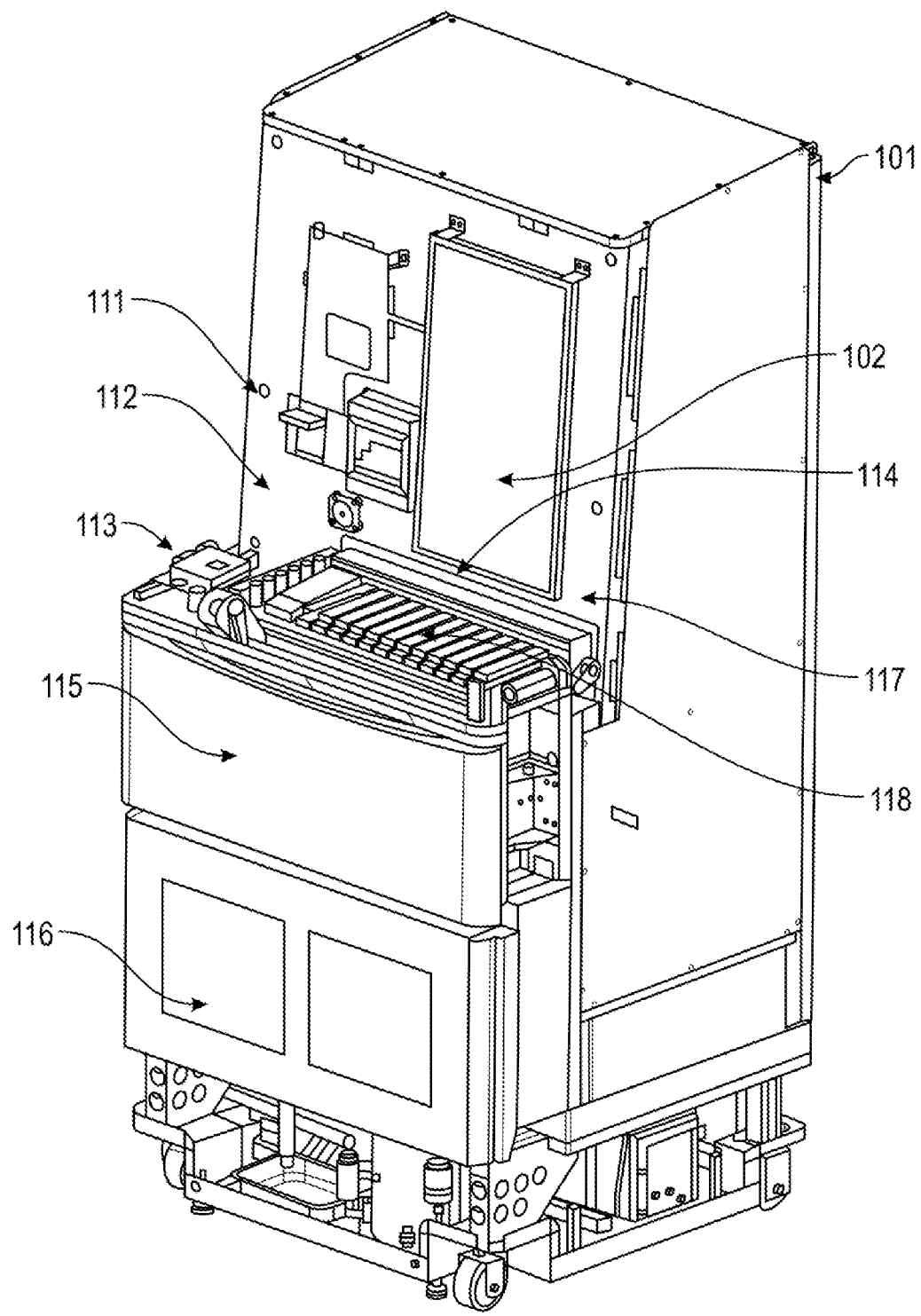
FIG. 1B is a perspective view of the automated cold storage unit with outer shell removed, the loading area tray members removed, and storage drawer opened.

A frontal perspective view of the unit without the outer shell covering, FIG. 1B, provides a view of an exemplary location of several components of the unit including: UID 102; cellular modem 111 as an alternative mode of communication; industrial PC 113, to manage robotics, refrigeration components and communications, via the UID, with users and ASP and the inventory of the unit; loading area 114; storage drawer 115 in the open position located above insulated panel 116 covering refrigeration components; and a fingerprint reader 117 and a panel 118 over the loading tray.

Figure 2A:
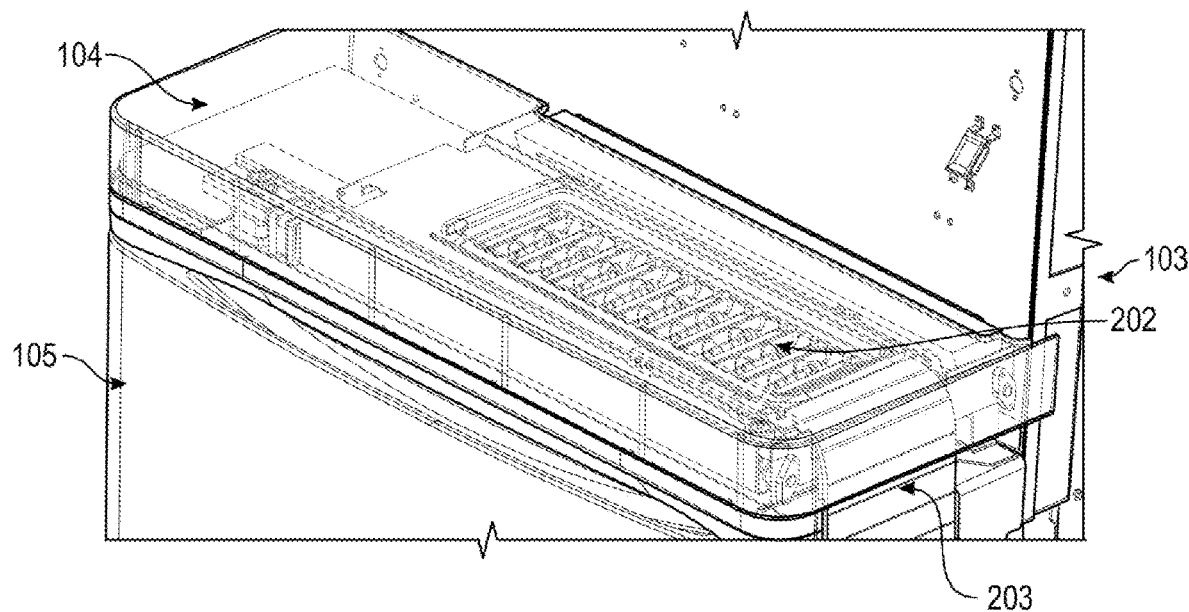
FIG. 2A is a perspective view of the loading area of the unit with access panel above tray opened and exemplary products in tray.
Figure 2B:
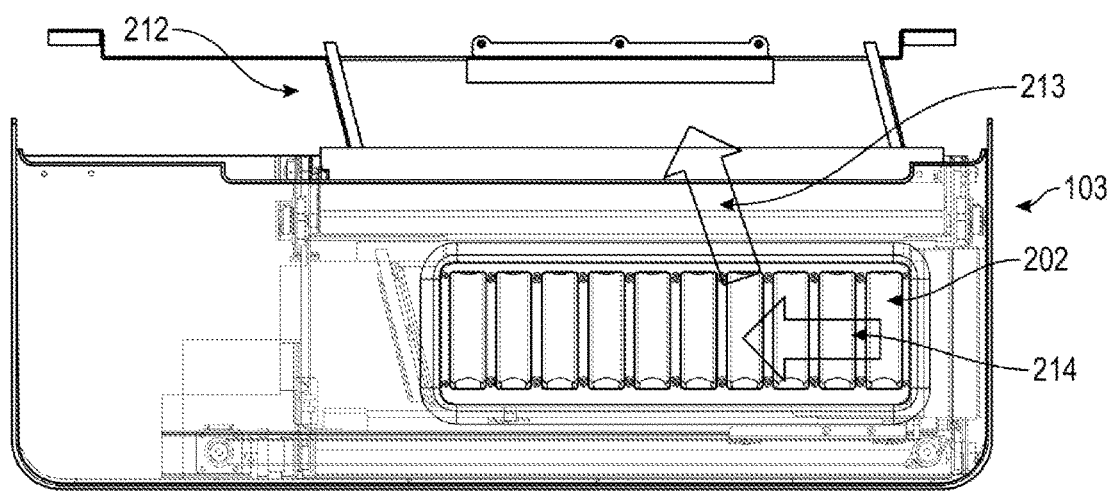
FIG. 2B is a top schematic view of the loading area tray and platform for movement of tray into the unit, with load tray positioned outside the unit, access panel above tray opened.
Figure 2C:
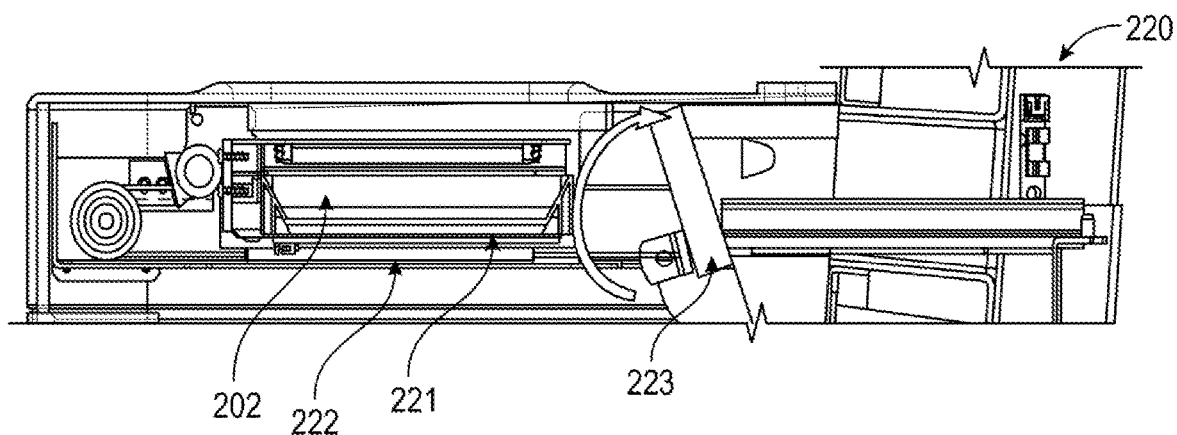
FIG. 2C is a cross sectional schematic side view of the load area, tray and internal partition for tray entry into unit, with tray outside of unit in loading area above capacitive sensing board and the internal partition to unit is closed.

The loading area 201 design and the movement of products to-from loading area and in-out of the storage area are exemplified in FIGS. 2A-2D. A loading tray 202 is accessed by the opening of an access panel 203, exemplified as a Tambour paneled door mechanism, which provides access to ten slots for holding product and/or carriers within the loading tray, see FIG. 2A. The tray slides in-out of the storage array on rollers that move in a track 212, preferably a u-channel, in a diagonal direction (arrow 213 shows direction of movement of the loading tray into the unit), see FIG. 2B, to position the tray 202 on the right side of the shelf of the unit providing greater shelf workspace area to the left side of the shelf. The access panel in FIG. 2B is opened (arrow 214 shows direction of movement when closing) revealing the 10 slots of carriers within the loading tray. FIG. 2C illustrates a cross sectional schematic side view of the load area, loading tray and internal partition providing the entry point of the tray into the unit. The load area, side view 220, shows the load tray 202 on a platform 221 above the capacitive sensing board 222. The load tray 202 will move past an internal partition 223 that allows the passage of the tray over the partition, and serves as a bridge when lowered, and as an insulation panel between the loading area and the interior of the climate controlled zone when raised, separating the inside of the climate-controlled unit and internal docking station and the ambient air loading area. The insulated internal partition 223 remains closed during loading and unloading of product into the tray positioned outside of the climate-controlled zones of the unit as shown in FIG. 2C. The load tray 202 is fitted with rollers and connected to a rod that serves as a guide moving the tray along a track between loading area and the internal docking station. The rod constrains the tray from going off-angle while the tray rolls along the tracks. Blocks attached to the end of the rod are connected to the belt drives, not shown, such that the rod travels straight toward the front of the machine and the tray, secured to the rod by the bushings, glides along the tracks, pushed or pulled by the rod, as it moves diagonally into/out of the storage array zone and to the loading area on right side of the shelf. In this exemplary embodiment the tray moves to a loading area on the right portion of the shelf and provides a working surface for the user on the left portion of the shelf.

A capacitive sensing board is highlighted in FIG. 2D which illustrates a view of the load tray 202 with 8 of the 10 slots filled with product 233 in carriers 231, each slot separated by a divider 232 which serves as a rail for the carriers, and 2 slips without the carriers reveal the capacitive sensing board 230 below the loading tray.

Figure 2D:
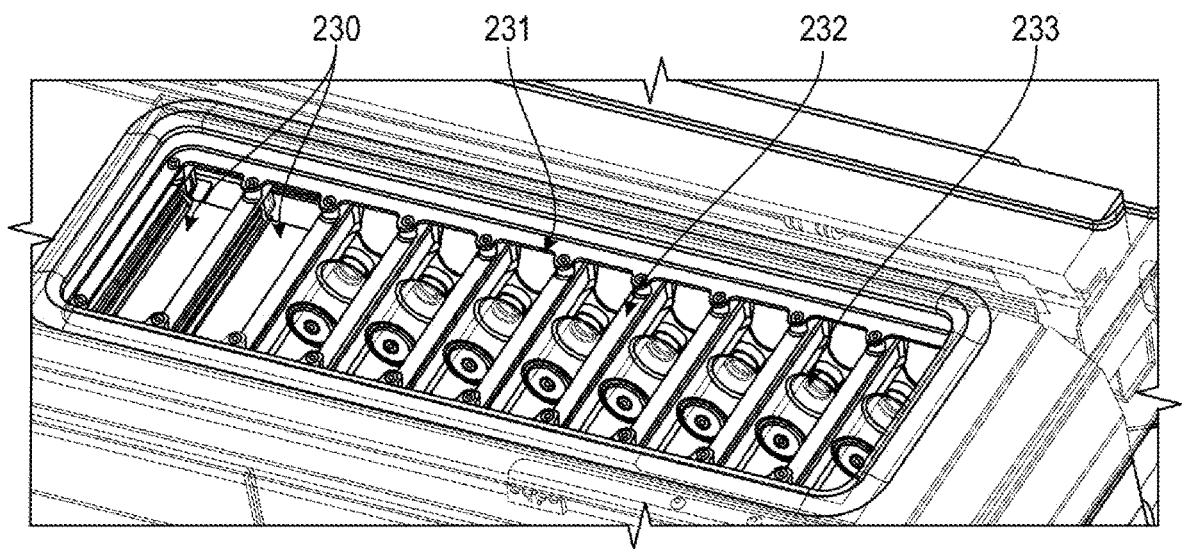
FIG. 2D is a perspective view of the loading area with a tray positioned outside the temperature-controlled zone of the unit, access panel above tray opened, and two empty slips reveal a capacitive sensing board beneath the tray filled with eight carriers and products.
Figure 2E:
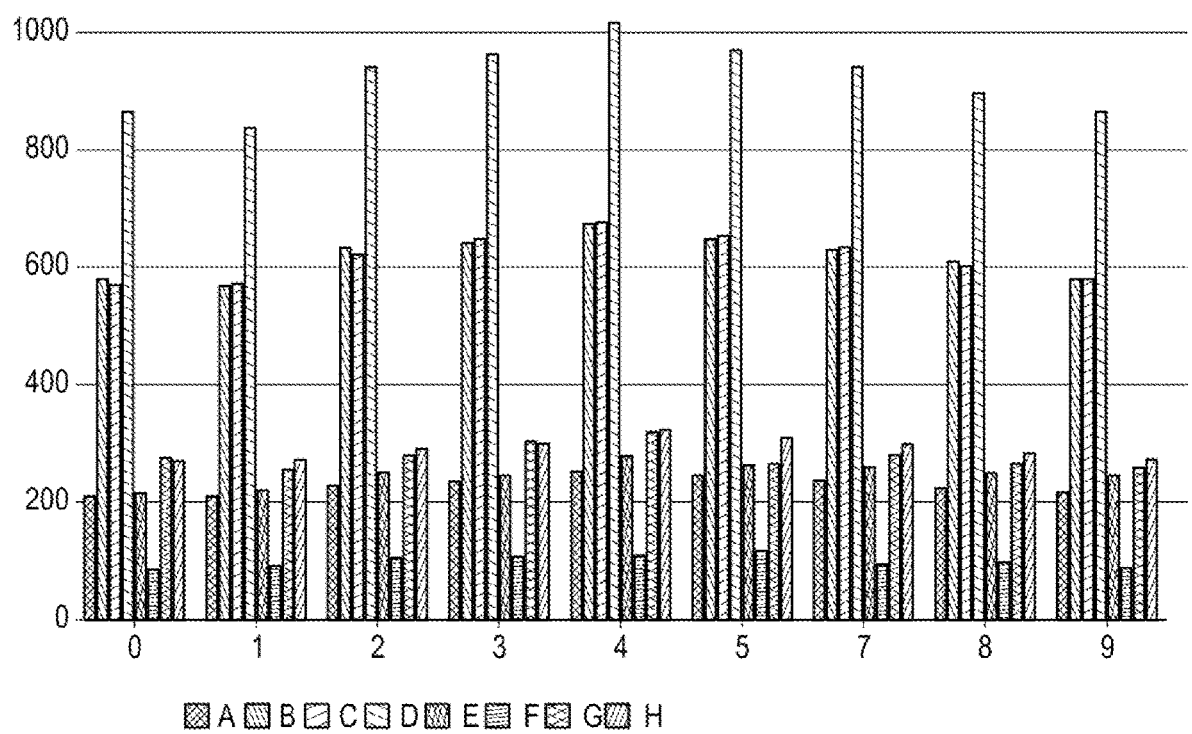
FIG. 2E is a graph illustrating capacitive sensing signal levels associated with carriers, within a tray above a capacitive sensing board, filled with products, A-H. Products A-H are representative of different product containers varying in size, product container material and container content.

The capacitive sensing board, whose location is shown in FIGS. 2C and 2D, is designed from capacitive sensing programmable system-on-chip (PSoC) boards manufactured by Cypress Semiconductor (San Jose, California USA). The capacitive sensing board detects the presence of an object within a carrier above the sensing board. The detectable objects include empty or filled vials and syringes made of materials that include glass, metal, and plastics. The capacitive sensing board signal intensity, relative to no product in carrier, for various product types in nine slots of the loading tray with carrier is shown in a graph of signal intensity vs carrier position, FIG. 2E. The graph shows a peak intensity obtained below a slip with product in a carrier relative to a background signal of carrier without product. The products corresponding to peaks A-D and H were various glass vials with metal or rubber caps filled with fluid, peak D corresponding to the largest vial. Peaks E correspond to a plastic syringe and peaks F and G correspond to a plastic tube empty or filled with liquid, respectively. The graph as shown in FIG. 2E illustrates that the presence of any product type within a carrier is detectable.

Figure 3A:
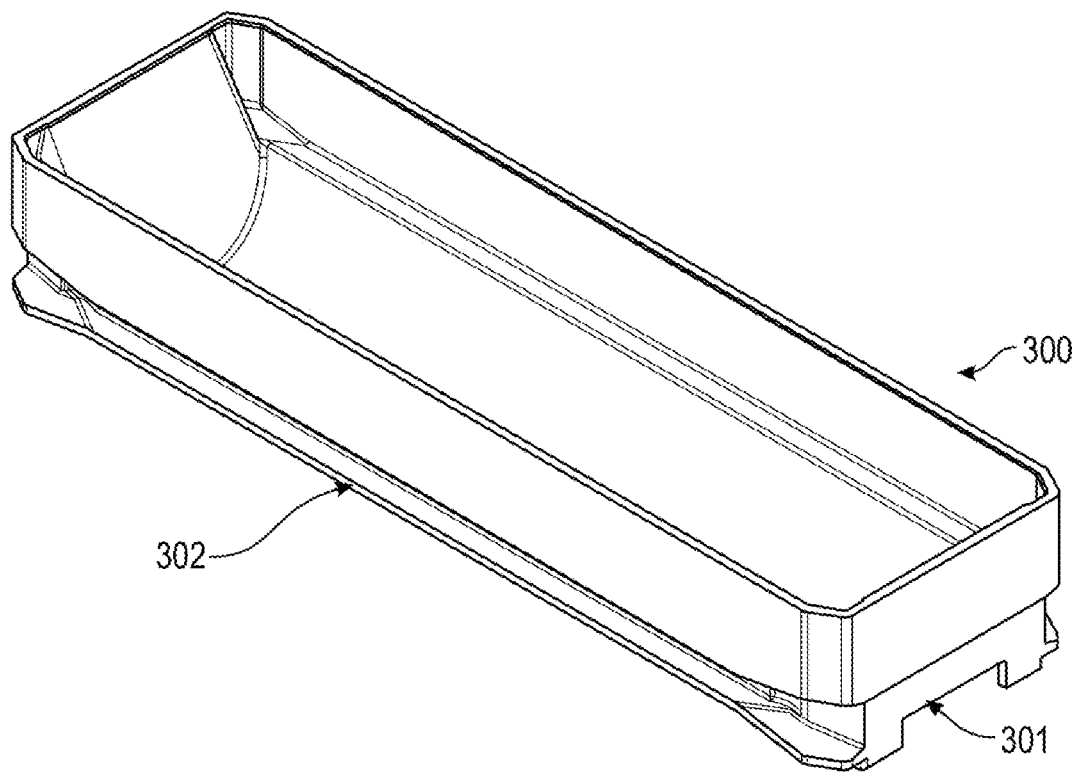
FIG. 3A illustrates a three-point perspective of a carrier, top/side view, for holding and transporting product within the automated storage unit.
Figure 3B:
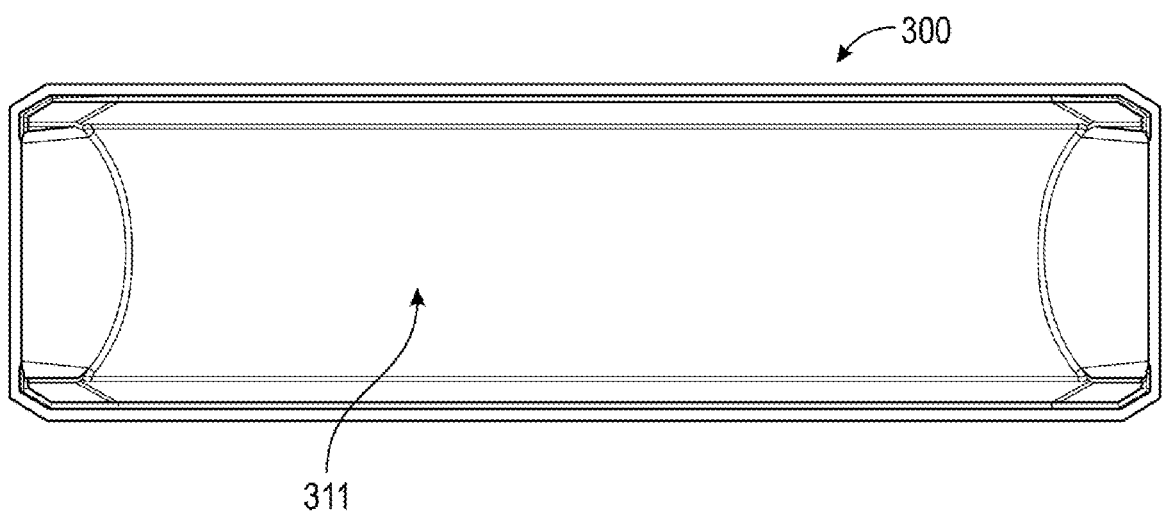
FIG. 3B illustrates a top view of carrier.
Figure 3C:
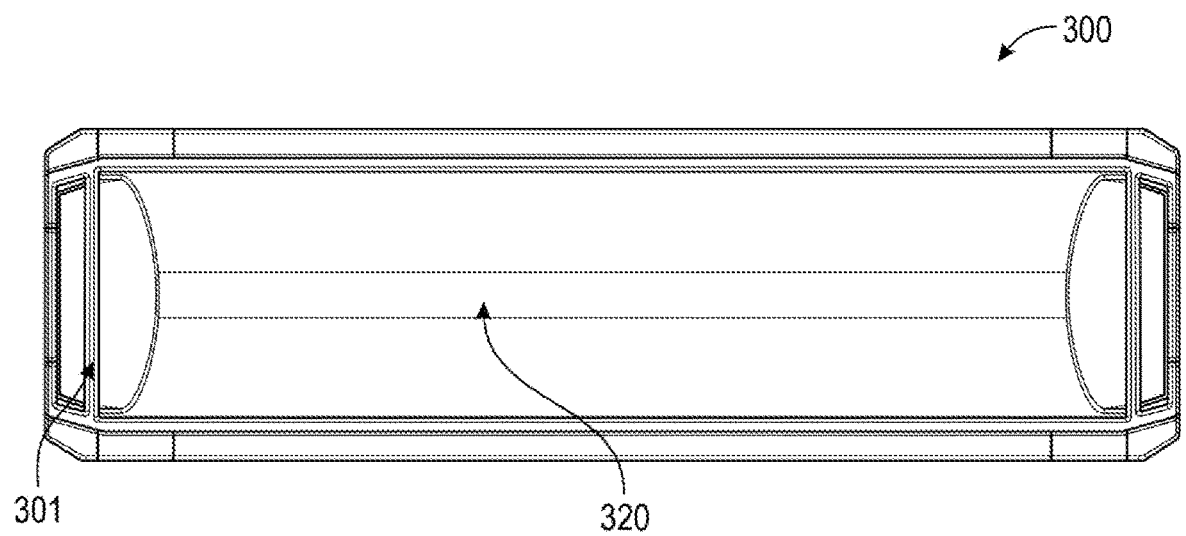
FIG. 3C illustrates a bottom view of a carrier.
Figure 3D:
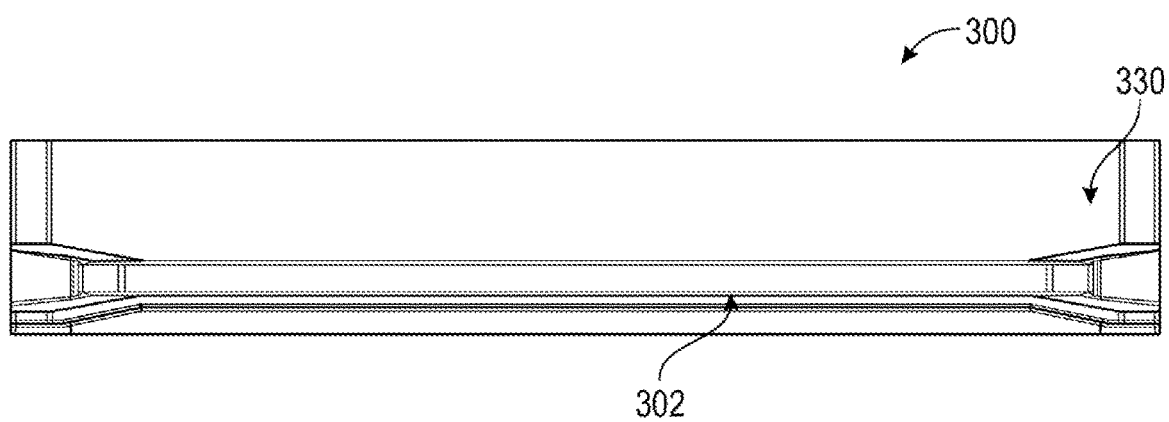
FIG. 3D illustrates a long side view of the carrier.
Figure 3E:
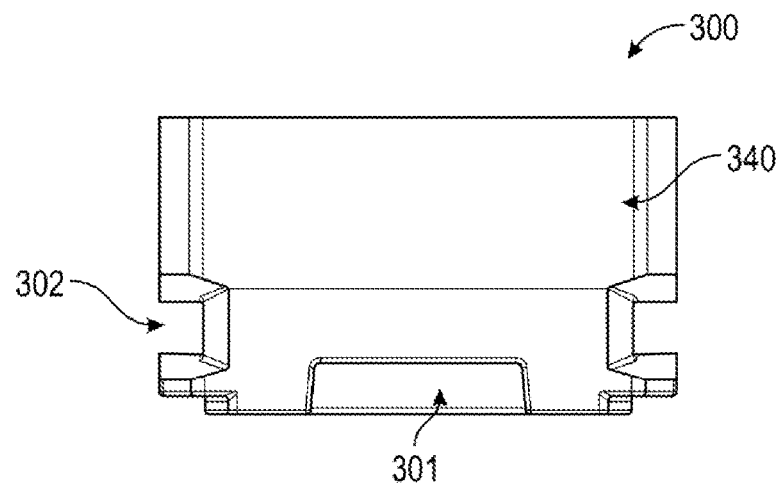
FIG. 3E, illustrates a short end view of the carrier.
Figure 3F:
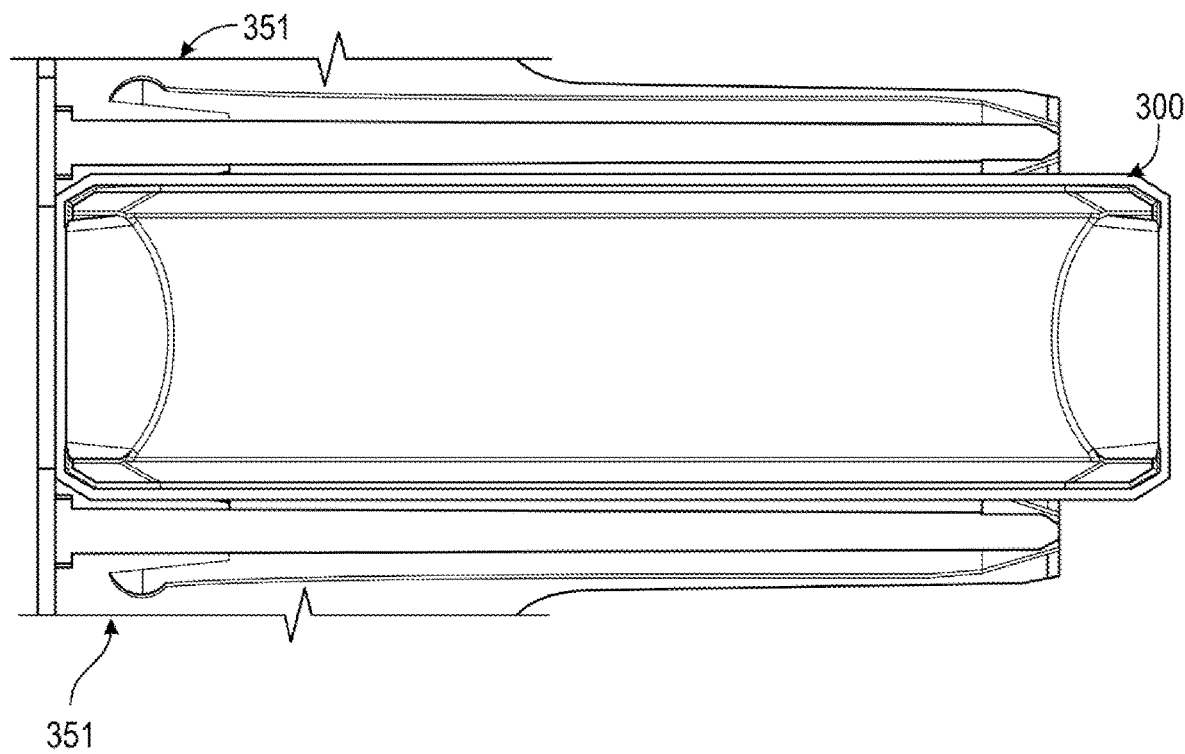
FIG. 3F provides a cross section of a top view of the carrier with detents holding the carrier within a storage bay.

A product to be stored within the unit's storage array is placed within a carrier such as the exemplary carrier 300, whose various perspectives are shown in FIGS. 3A to 3E. A product is placed in the carrier 300 for intake into the cold storage unit and remains in the carrier until it is removed from the unit. An exemplary carrier 300 with dimensions of approximately 10.2 cm×3.0 cm×1.8 cm holds a single product. The carrier provides sufficient space to accommodate a single product that may consist of one or more parts, for example two vials of a vaccine that require mixing prior to use. The carrier 300 is adapted with a latch member 301, as shown in FIG. 3A, that is hooked by a pawl on an end effector robot used to pull-in and push-out the carrier in and out of an end effector robot slip. A groove 302 along the bottom sides of the carrier forms a fit with an end effector or the storage array ridges to pick up and hold the carrier in place. FIGS. 3B-3E provide a top view (inside surface 311 of carrier), bottom view (bottom surface 320 of carrier), side view (side wall 330 and groove 302), and end view of the carrier (end outer wall 340, groove 302 and pawl latch 301), respectively. FIG. 3C provides an underside view of the latch member 301 which function as a latch for the pawl mechanism. FIGS. 3D-3E further illustrates the groove 302 within the carrier used to carry and suspend the carrier within the storage array or end effector slip on rails and/or ridges. The applied force of a snap detent is used to hold the carrier in place within the storage array. FIG. 3F illustrates the fit of detents 351 of the storage array within the grooves 302 of a carrier, a top view. The detent, which also acts a rail that suspends a carrier, flares out toward the back of a storage bay to form a secure fit with the carrier.

Figure 4A:
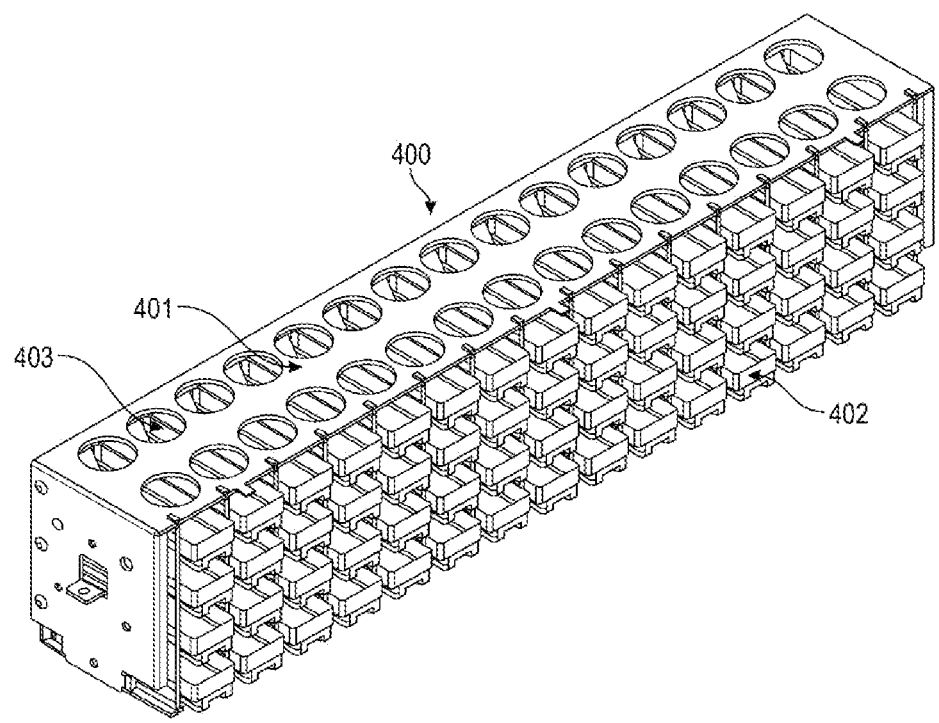
FIG. 4A illustrates a 3-point frontal perspective of a storage bay module that provides 60 bays for the storage of carriers.
Figure 4B:
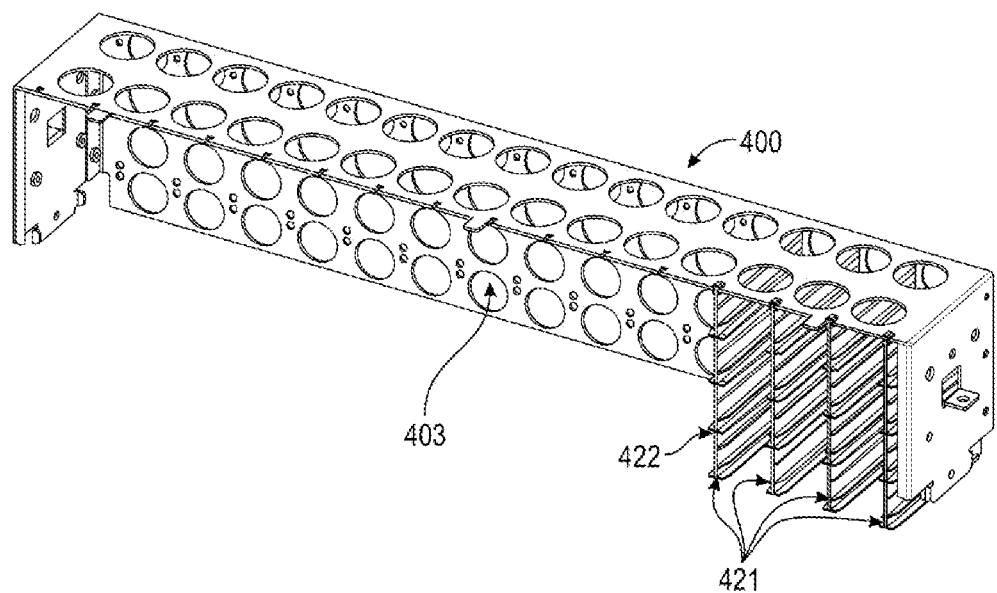
FIG. 4B illustrates a partial structure of a storage bay module with four rows of holding bays with four of the vertical panels in place, with bottom panel and additional wall members removed providing an internal perspective of the module.

The carriers, with or without product, are stored within storage bay of an array assembled from individual storage bay modules. Exemplary storage bay module perspective is shown in FIG. 4A. The four row, fifteen column, storage bay module 400 can hold up to 60 carries as shown in FIG. 4A. The storage bay module is made of a sheet metal outer wall structure 401 with injection molded parallel walls, not visible, used to form columns within the storage bay module and to suspend carrier carries 402 as shown in FIG. 4A. The walls of the storage bay modules contain circular openings 403 allowing free flow of air thorough the storage bays. An exemplary storage bay array can be assembled from four and eight-row, providing 60 and 120 storage bays, respectively. Across sectional perspective of a four-row module 400 is shown in FIG. 4B where four injectable molding walls 421 are presented to provide a view of the inside of the storage bay module. The injection-molded walls include a rail members, exemplary rail 422, used to suspend carriers within the storage bays, FIG. 4B. The rails 422 used to suspend the carrier within a storage bay narrow in toward the back of the storage bay to form a snap/detente fit with the carrier, as discussed for in FIG. 3F above.

Figure 5A:
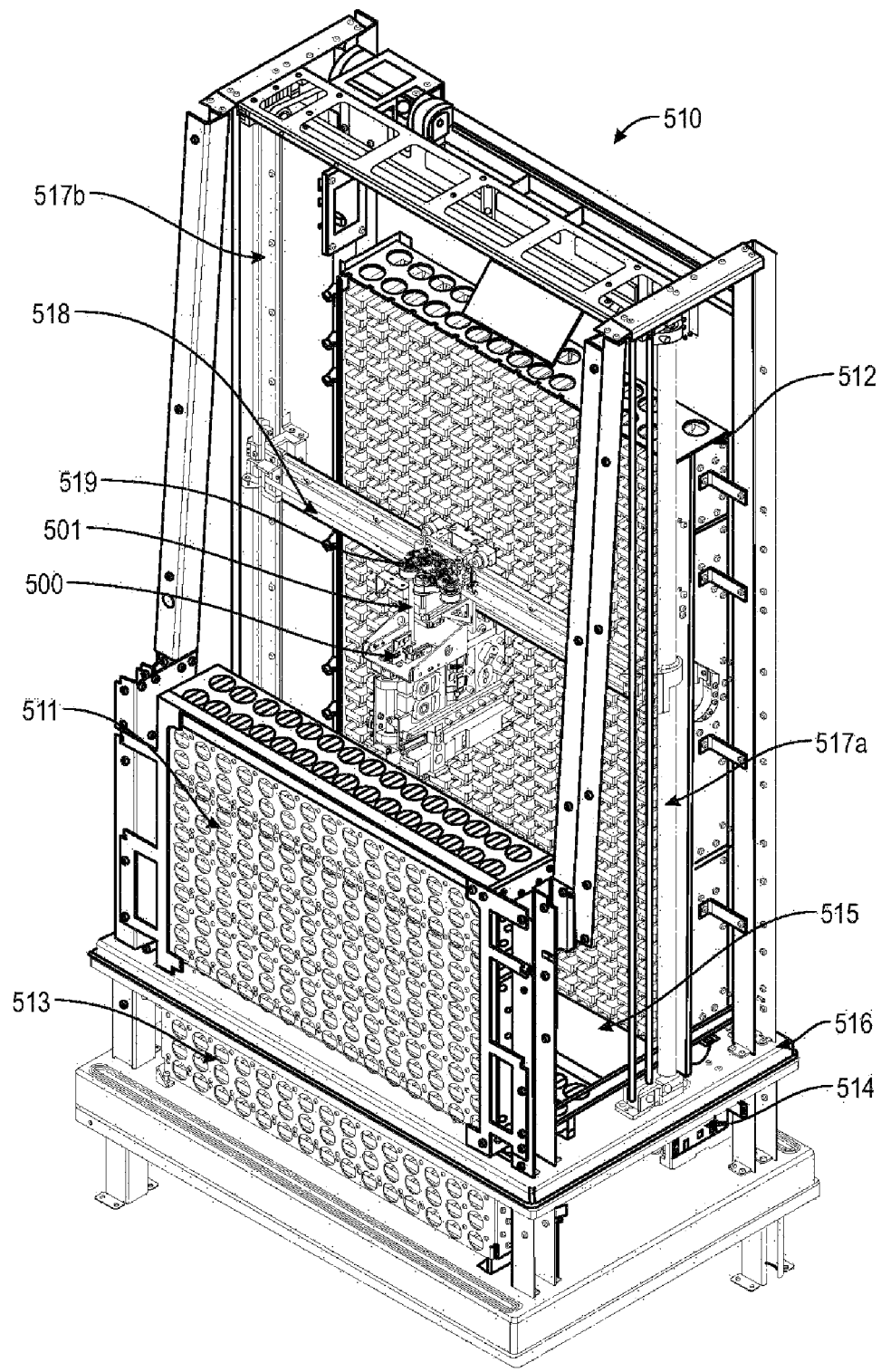
FIG. 5A illustrates a three-point perspective view of an exemplary internal storage array structure fitted with end effector robot and a gantry robot system positioned between the opposing walls of storage bays.
Figure 5B:
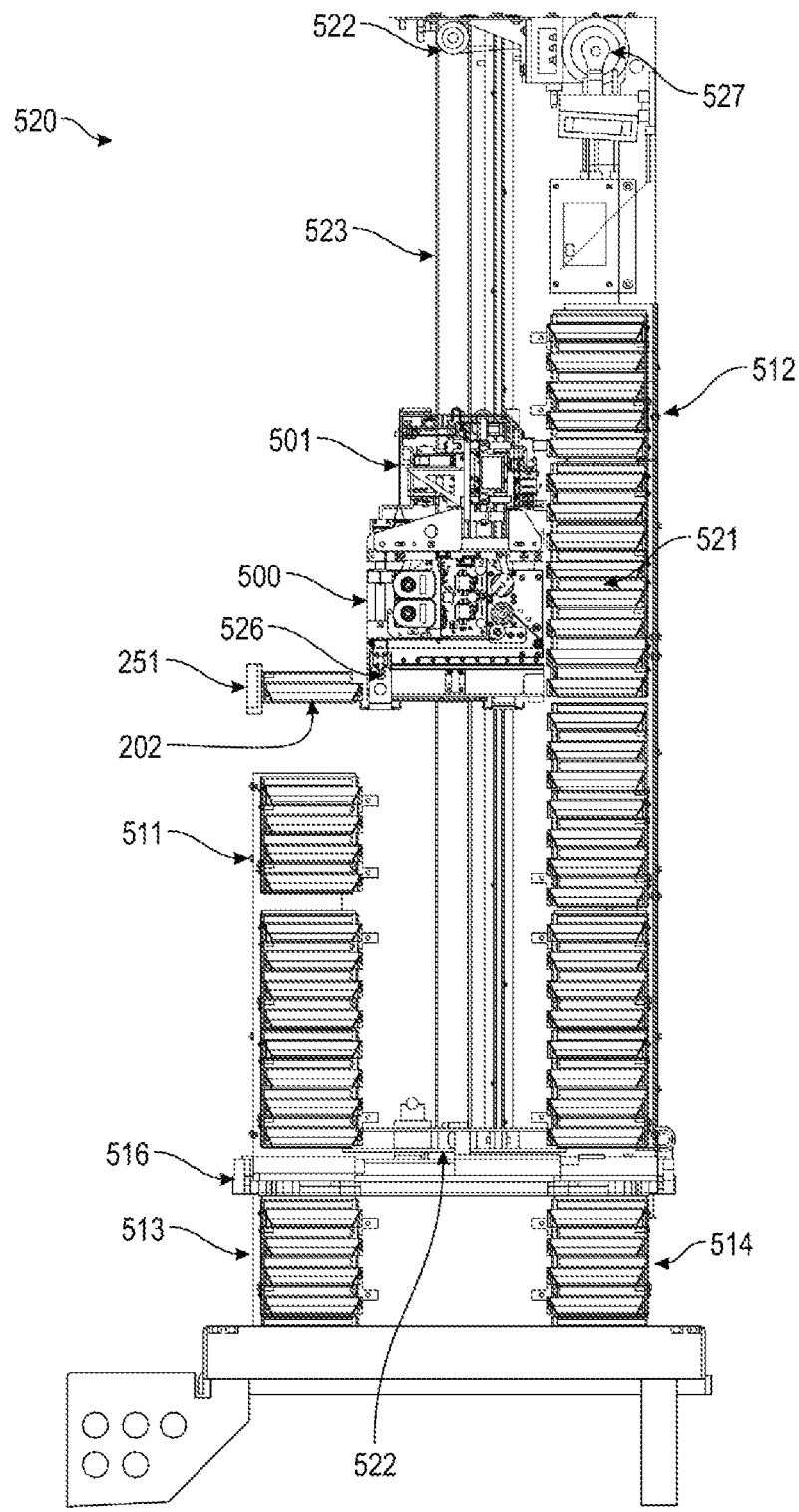
FIG. 5B is an internal schematic of a side view of the exemplary storage array with loading tray, gantry robot system, and an end effector robot positioned between the opposing walls of storage bays.

An exemplary automated smart storage unit storage array internal structure including gantry robot, end effector robot to pick up and deliver carriers, and doors separating two separate storage zones, are illustrated in schematic views of FIGS. 5A-5B. The carrier storage array consists of two opposing walls of storage bays formed by stacking and securely connecting four and eight row storage bay modules as exemplified in an internal frontal perspective 510 of the storage array front (511 and 513) and back walls (512 and 514), see FIG. 5A. Locking tabs at each column wall, alignment posts at the back of the storage bays, and screws connecting the storage bay modules to a solid steal frame form a stationary structure. The back-wall storage array 512 of the upper portion of the unit consists of a 60 bay module atop three 120 bay modules. The frontal storage array 512 of the upper portion of the unit consists of a 60 bay module atop a 120 bay module. The combined back and frontal upper storage array provide a total of 600 storage bays. The upper portion is separated from the lower portion by a dividing double door 515 and an insulation layer 516. The lower portion of the unit, below dividing door 515, contains two 60 bay modules in the opposing sides of the unit, 513 and 514, providing an additional 120 bays of storage space. In one embodiment of the smart storage unit the upper and lower portions of the unit, above and below the dividing doors, are a refrigerated compartment and a freezer compartment, respectively. Products in carriers are delivered to and from the storage bays by an end effector robot 500 aligned with storage bays by a gantry robot that includes an x-axis rail 518, positioning the end effector robot in the x direction, and main gantry shaft 517a and rail 517b for gantry robot movement in the z direction, from the bottom to the top of the upper storage array section of the unit. The end effector robot 500 is suspended below the x-axis rail 518 by the carriage 501, controlled by a circuit board 519 attached to and above the carriage. The end effector robot reach below the x-axis rail allows the positioning of the end effector robot slips in the lower portion of the unit, reaching section between the opposing walls sections, 513 and 514, of the storage array, while maintaining the x-axis rail above the dividing door 515 when opened.

A side view of the structural and robotic components of the unit, FIG. 5B 520, provide a view of the storage array framework and storage bays with a side cross sectional view of carriers 521 in storage bays and the pullies 522 and belts 523 of the Gantry robot for movement of the end effector robot 500 along the z-axis, reaching the most upper and lower floors of the storage array, and the carriage 501 that moves the effector robot 500 along the x-axis arm of the gantry robot. The end effector slips 526 are positioned between the back wall 512 of the storage bays and the docked loading tray 202 above the frontal array 511 of the storage bays. A side view of the internal partition 251 separating two sections of the unit, loading tray 202 docked inside the unit, with internal partition 251 shown in a closed position. The motor 527 drives the z-axis motion of the gantry robot. The pulley 522 at the very top of the structure is attached to an axle that is driven through a short belt between the axle and the motor; the axle in turn drives both vertical belts to move the x-arm up and down. The carriers 300 to be picked up, or delivered, by the end-effector robot enter, and exit, the storage array on a tray 202 that enters the storage array through the internal partition 251 above the top of the frontal storage array 511.

Figure 5C:
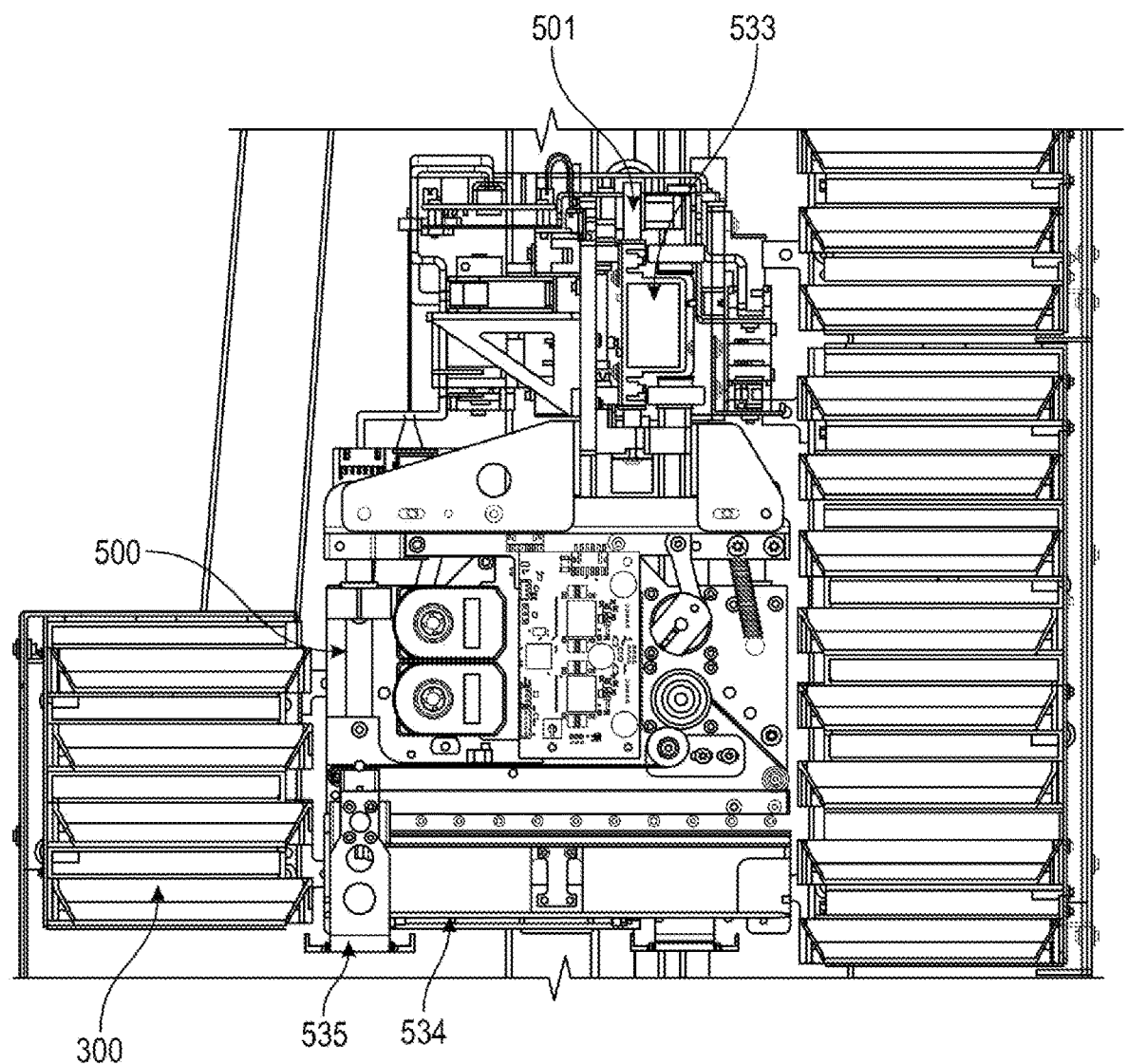
FIG. 5C illustrates an isolated enlarged side view of the end effector robot and carriage with the end effector slip positioned by a carrier in the frontal wall of storage bays.
Figure 5D:
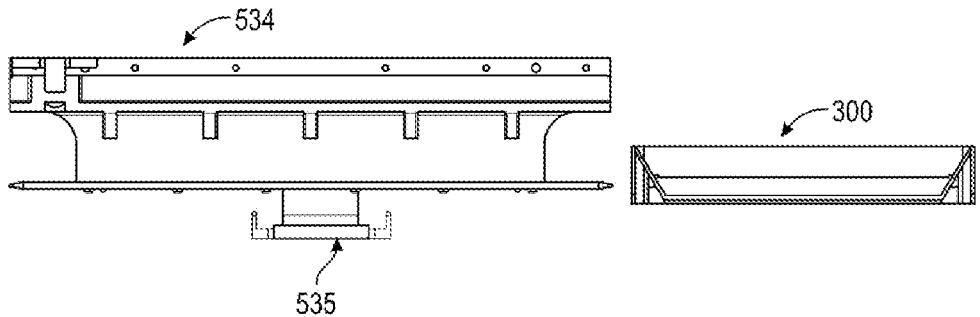
FIG. 5D illustrates an isolated view of the end effector slip and pawl positioned in front of carrier with the pawl centered below the end effector.
Figure 5E:
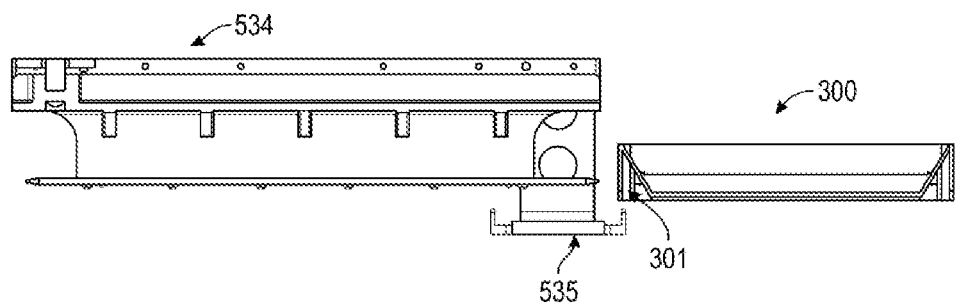
FIG. 5E illustrates the members of FIG. 5D with pawl positioned below the front end of the carrier.
Figure 5F:
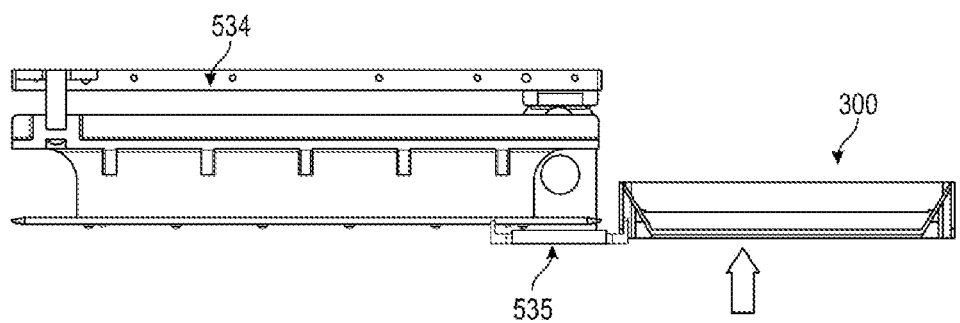
FIG. 5F illustrates the members of FIG. 5D with pawl raised and hooked in the latch of the carrier.
Figure 5G:
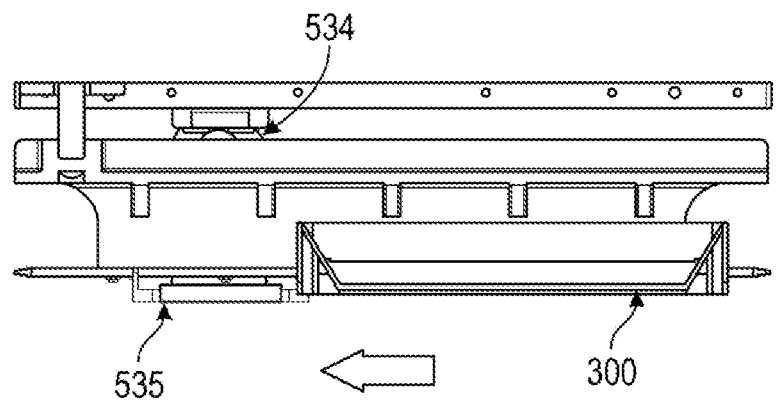
FIG. 5G illustrates the members of FIG. 5D with pawl raised and hooked in the latch of the carrier positioned within the end effector slip.

An expanded detailed view of the end effector-carriage, 500 and 501, robot positioned to pick up a carrier within the unit is show in FIG. 5C. An end effector carriage 501 which moves the end effector robot 500 along the x-axis rail 533 (cross sectional side view) and positions the end effector slip 534 and pawl 535 by a carrier 300 in a position where the pawl is ready to engage a carrier and pull the carrier within the end effector slip. The action of the pawl on carrier is exemplified in FIGS. 5D-5F, with an arrow marking the direction of movement of the pawl. The end effector slip 534 is positioned by a carrier 300 with a pawl 535 centered below the slip, a resting state of the pawl, then lowered, see FIG. 5D, in a ready position to slide toward a carrier positioning the pawl hook below the latch 301 within side wall of the carrier, see FIG. 5E. Once the pawl is aligned with the carrier latch, the pawl is raised to engage the carrier, see FIG. 5F, and then retracts to the opposite end of the slip and pulls the carrier within the end effector slip 534, see FIG. 5G. The carrier 300, as shown in the exemplary pawl action view FIGS. 5D-5G, is positioned to the right of the end effector robot slip. As the pawl mechanism can move along the entire length of the slip it can replicate the movements as shown in FIGS. 5D-5G on the opposite side of the slip and pick up carriers on the left side of the slip and move carriers in and out of the opposing wall storage bays.

Figure 6A:
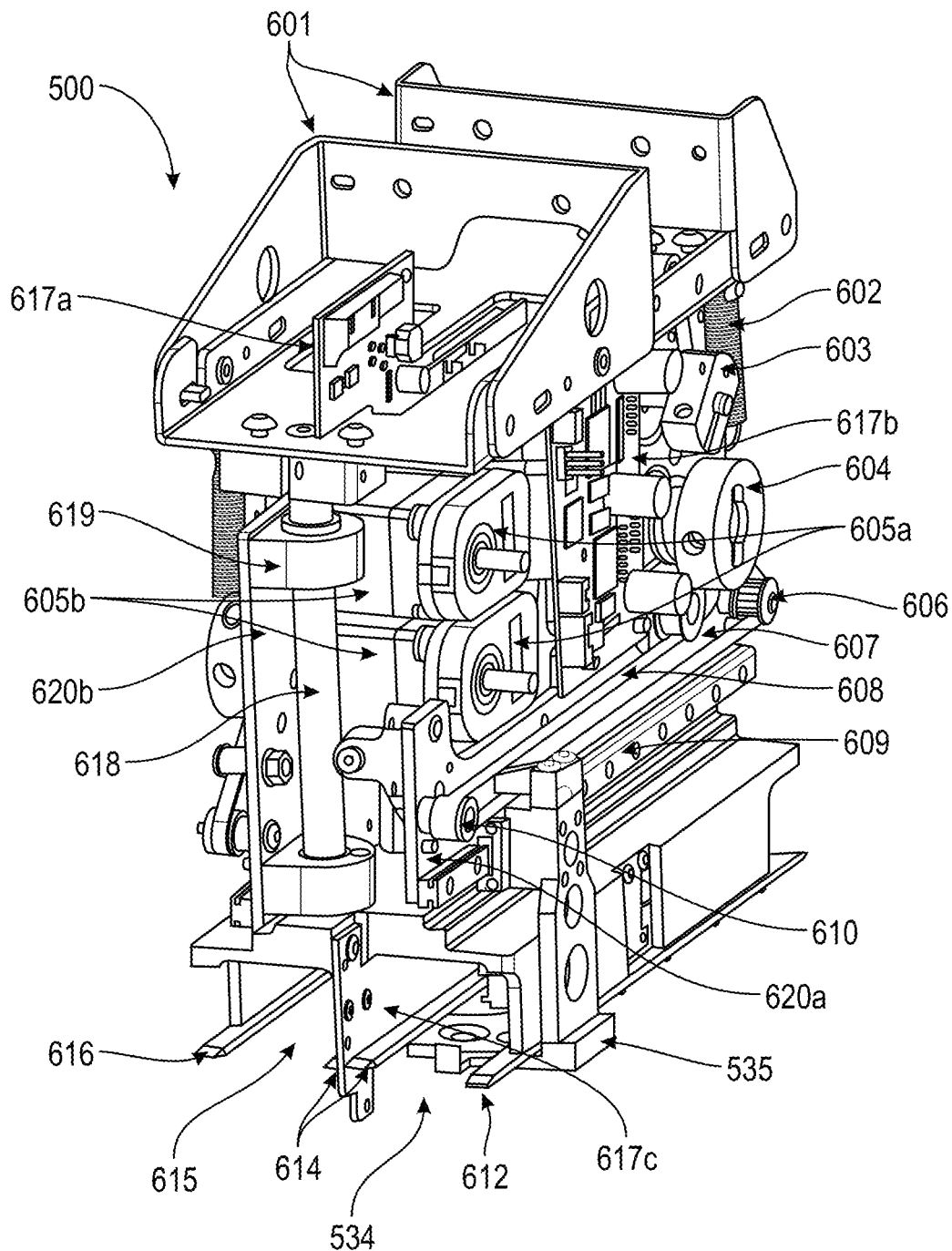
FIG. 6A is a perspective view of the end effector-robot

A detailed view of the isolated end effector robot is illustrated in a three-point perspective, FIG. 6A. The mounting brackets 601 are used to secure the end effector robot onto an x-arm carriage and the pawl mechanisms, 535 right side pawl mechanism, pull in and push out product carriers from the end effector slips, 534 and 615, transporting carriers throughout the unit. The end effector robot right side pawl mechanism 535 slides a carrier along the right-side 612 and the center 614 carrier rails into/out of a right carrier slip 534. A pawl mechanism on opposite side of robot, not shown, slides a carrier along the center carrier rail 614 and left side carrier rail 616 into/out of a left carrier slip 615. The end effector robot members that control the movement of the right side pawl include: pushrod mechanism 603; drive pulley (not shown) located beneath an inertia disk 604; an encoder 605 (e.g. Incremental, Capacitive Modular Encoder, NEMA11, AMT102-V 28 mm, 48~2048 PPR, by CUI Inc.), attached to a stepper motor that drives the drive pulley; back end pulley 606; tension pulley 607; belt 608; linear slide 609; front end pulley 610; and the circuits boards 617a-617c. The components of the right-side encoder and stepper motor (not visible) are located behind the circuit board 617b and are the mirror image of the left side encoder 605a and stepper motor 605b. Focusing on the right side of the end effector, mirrored on the left, include the driver pulley 604, driven by a stepper motor, which moves the belt 608 around the tension 607, back 606 and front 610 pulleys moving the linear slide 609, connected to the pawl mechanism 535, and consequently the pawl mechanism back and forth pulling and pushing carriers in and out of the end effector robot slip 534. In order for the drive system to achieve crisp, controlled servo-type feedback it is necessary to attach a weighted disk, inertia disk 604, to the motor shaft. This weighted disk helps dampen out short-term transients that occur for example when changing direction, due to slack/backlash in the downstream drive system. The item being driven, in this case the pawl in the Y axis/linear slide direction, is on a belt with pulleys introducing a mechanical separation from the motor/encoder assembly. Therefore, the encoder does not directly represent the true position of the pawl during such transient events. Once the motor shaft has a correct amount of added inertia the short-term transients are appropriately dampened out so that the servo control does not over or under react.

The pawl mechanism is raised and lowered to engage or release a carrier, connecting the pawl with a latch 301 on the carrier. The pawl mechanism's up and down movement involves the movement of the entire plate 620a or 620b on which the pawl mechanism, pulleys, motor/encoder assembly, and 617b dual-channel motor driver board are mounted. The movement is controlled by the pushrod mechanism 603 and guided by a bushing along the z axis shaft. The spring 602 provides buoyancy to the pawl assembly against gravity to help the Z-axis motion of the pawl. The bushing 619, connected to the left plate 620b, and shaft 618, serve as a guide for the left side plate and the up and down movement of the left pawl mechanism. The right-side bushing and shaft located on the back-right side of the end effector robot are not visible. The movement control members are mirrored on the opposite side, not shown, of the end effector controlling the movement of the left side pawl.

The circuit boards 617a-617c are integrated into the end effector robot assembly and coordinate the movement of the end effector robot members and the movement of the carriage along the x-axis. The circuit board are integrated into the assembly but may also be connected to the assembly for example as a separate stack of circuit boards as long as they do not impede the movement of the end effector robot. The "bridge board" 617a is an interconnect board for boards 617b and 617c. Boards 617b and 617c connect to 617a locally and then the X driver board that runs the X carriage back and forth along the gantry X arm connects to this bridge board to bring power and communications to the end effector. The 617b board is the dual-channel motor driver board, one used on each side of the effector assembly. This has some I/O for sensors but primarily contains the logic and drive circuitry for driving both Y and P axis on each given side of the effector. The board 617c is a sensor board with two purposes. Primarily to sense the presence of a carrier in the tunnel; there are 4 total sensors on each side such that it can be ascertained if the carrier is successfully pulled far enough into the tunnel from either side to allow the end effector robot to move safely. Secondarily, the 617c board contains a proximity sensor on each side to act as a home position for the Y-axis of motion of each pawl. It detects the edge of the pawl as it travels close to the end of travel.

The dual end effector robot, with two slips and two pawls, allows for the movement of one or two carriers, simultaneously or independently. The motor control circuits are designed to provide closed-loop servo control of the stepper motors which allows maximum torque to be applied with minimal power consumption and less waste heat generated. Accelerations are tuned such that empty carriers can be moved faster than full carriers to prevent products from sliding/ejecting out of the carrier. The sizing of all the motors is optimized for top speed vs. torque/acceleration.

The optimization allows for the loading of the full unit with 720 products in approximately 1 hour.

Figure 6B:
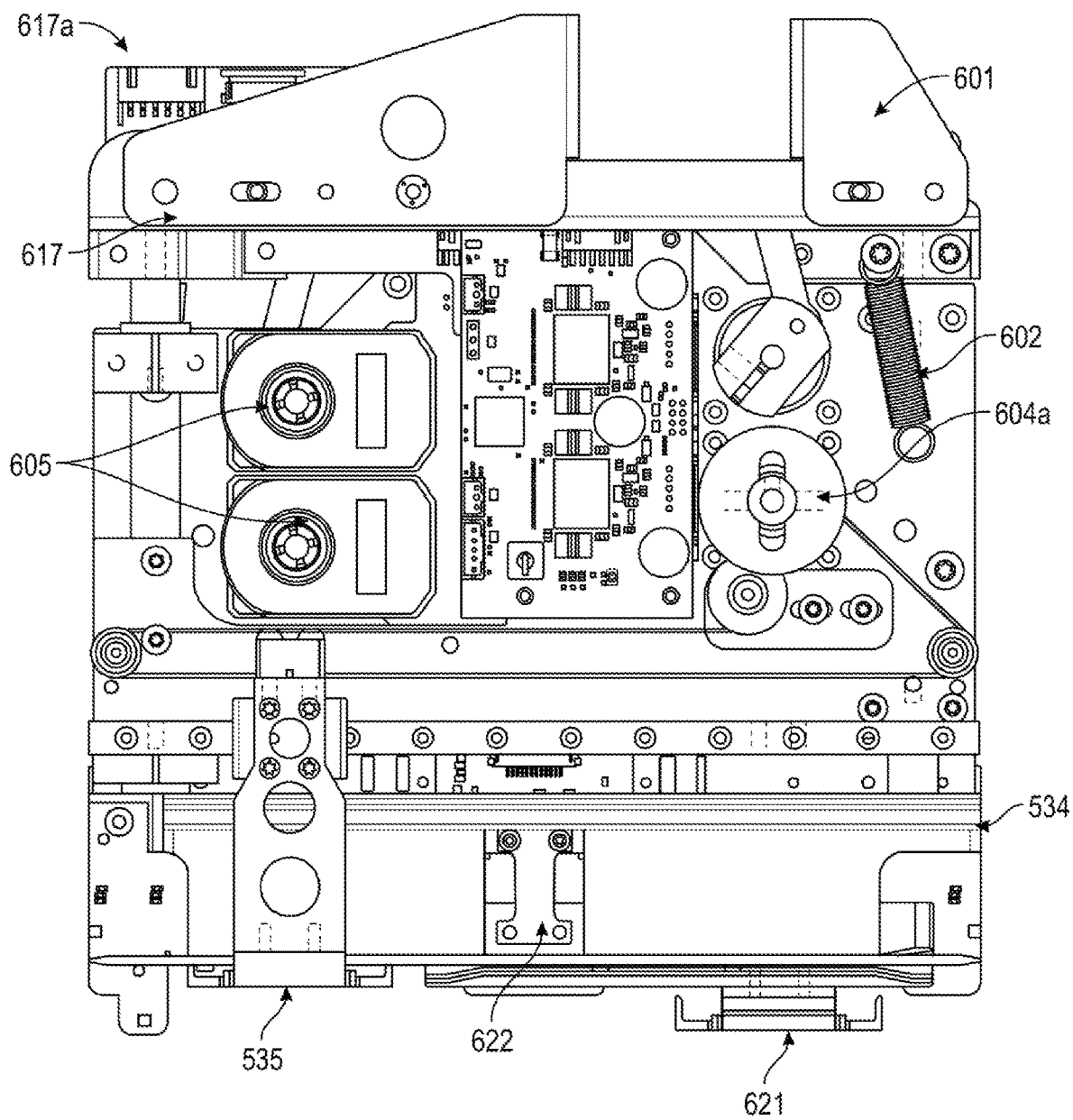
FIG. 6B is an illustrative side view of the end effector-robot
Figure 6C:
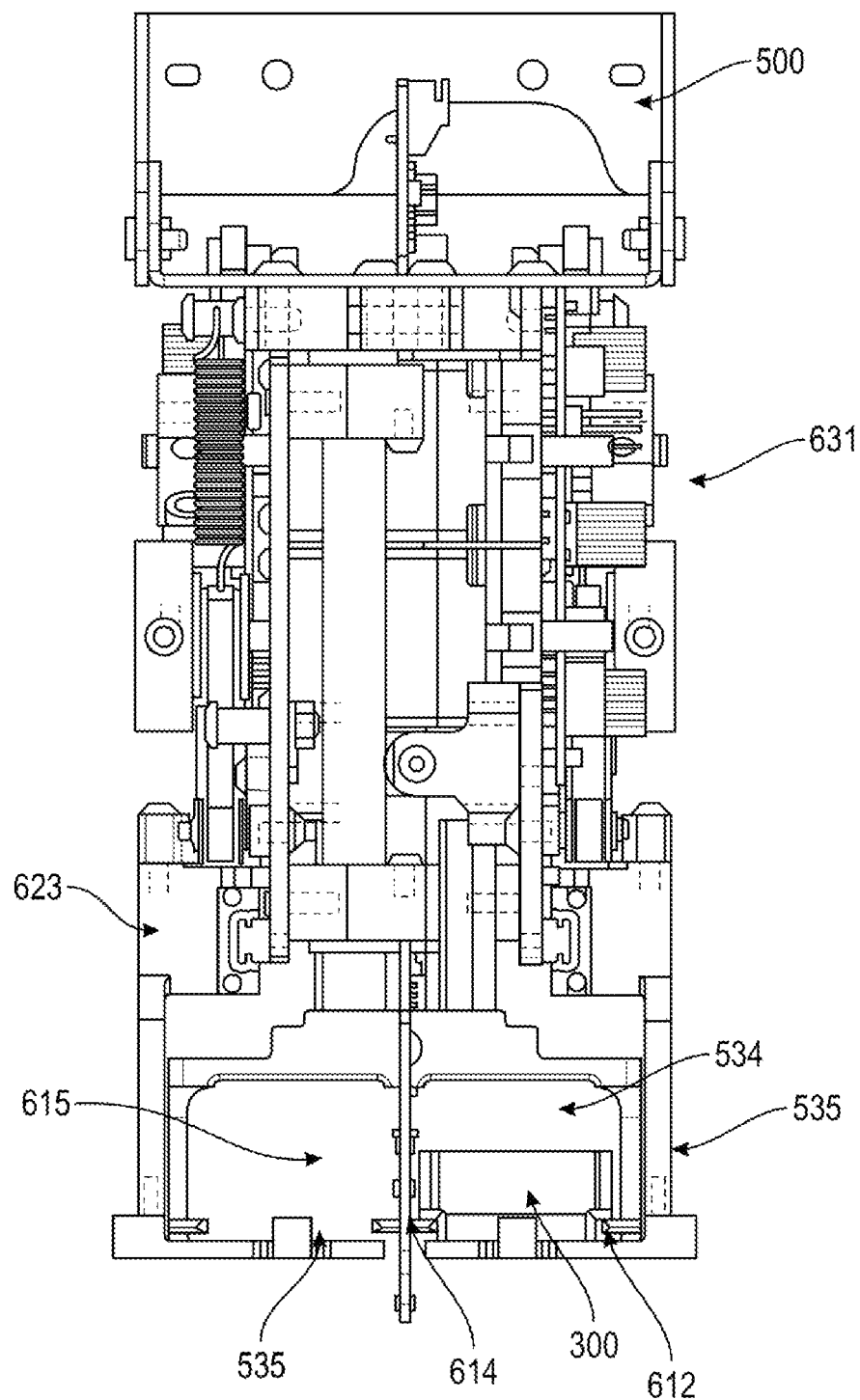
FIG. 6C is an illustrative front view of the end effector robot with carrier in end effector robot slip slip.

A right-side view of the end effector robot, FIG. 6B, provides a view of the right-side pawl mechanism 535 and the left-side pawl 621 on the left side of the end effector robot, as viewed beneath the carrier slip 534, a leaf spring 622, and some of the movement control members as identified in FIG. 6A. The leaf spring 622 includes a mounted small bumper (not shown) which makes a sliding contact with the side of the carrier as it is moved through the tunnel and holds the carrier still in the tunnel when "runaround" pawl moves are made repositioning the pawl by the latch on the opposite side of the carrier. The frontal view 631 of the end effector robot, FIG. 6C, provides a view of a carrier 300 positioned within the right-side slip 534 with a right pawl 535 latched onto the carrier suspended between the right 612 and center 614 carrier rails. The left side pawl 623 is shown in the raised position without a carrier present in the slip 615.

Figure 7:
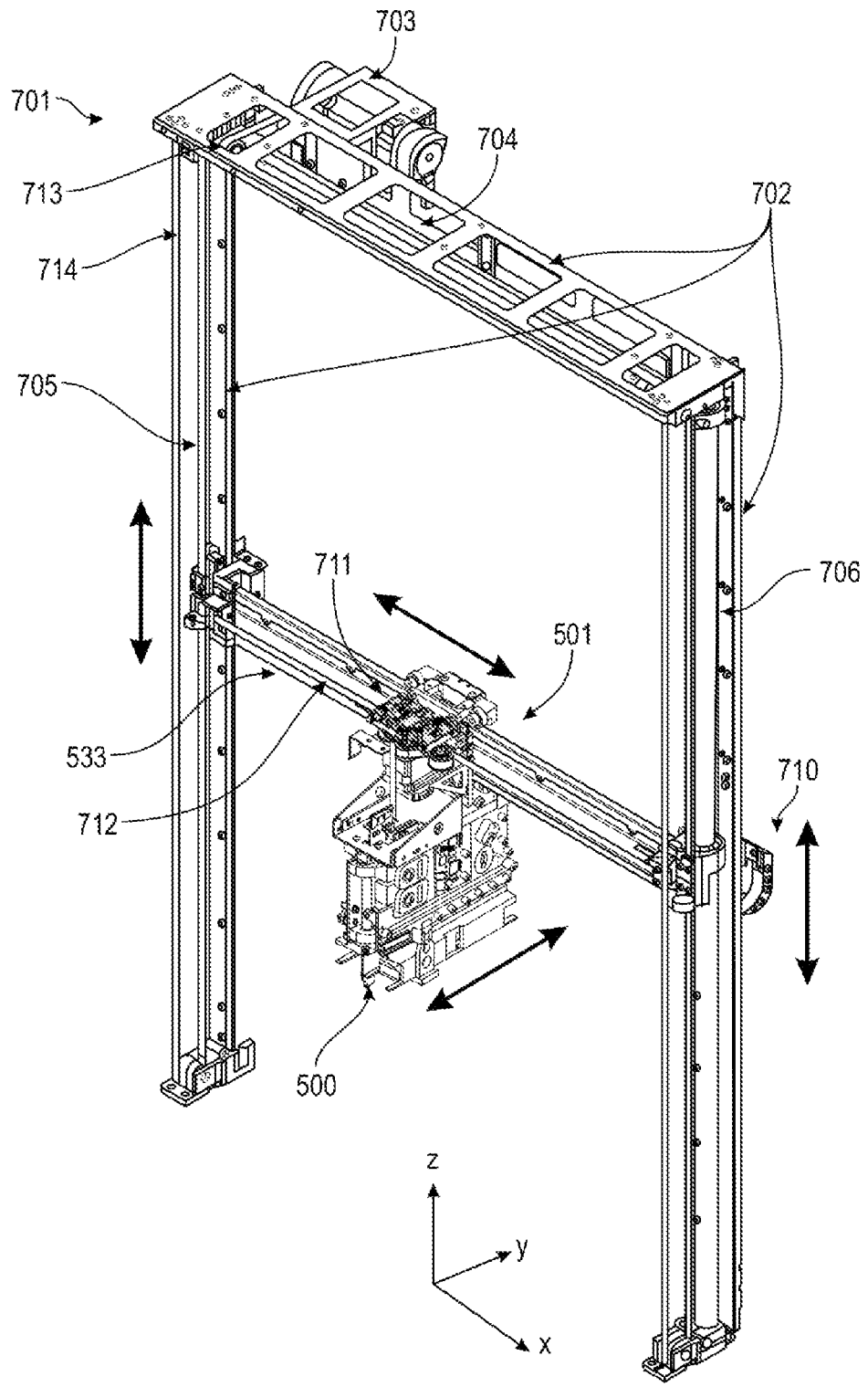
FIG. 7 illustrates the framework of the Gantry robot with end effector-robot on the x-axis arm for the positioning of the end effector within the storage array.

The positioning of the end effector robot in front of the storage bays, for delivery and pick-up of carries, is controlled by a Gantry robot system whose various members are illustrated in FIG. 7. As shown in a frontal perspective schematic, FIG. 7, the Gantry structure framework 702 provides support for Gantry robot members that control the positioning of the end effector robot 500 along the x-axis, to access specific columns of the storage array, and the z-axis, to access specific floors of the storage array. Gantry structure members include main gantry shaft 706 for z-axis movement; a torsion bar 704 that connects the two vertical pulleys together to the z axis motor, an anti-rotation column 705 and the x-axis rail 533. The movement of the end effector robot along the z axis is actuated by a driving motor 703 that drives the belt (made of for example fiber-reinforced neoprene) and pulleys which move the x-axis arm with the end effector robot 500 along the z axis to the various floors of the storage array. The energy chains, of the X axis (not shown) and of the Z axis 710, hold the cables and provide support against the mechanical cycling. The x-axis rail moves vertically along the parallel Gantry robot shaft and rail, 706 and 705, to align the end effector robot slips with any row within the storage array. A carriage 501 connects the end effector robot 500 to the x-axis rail 533 of the gantry robot and moves the end effector in a horizontal direction within the unit to align the end effector robot slips with any column within the storage array. The left end block holds the drive motor 703, which drives belt 713 that drive the torsion bar 704 which drives the vertical pulleys-belts 714 on two sides of the framework and positions the x-axis arm and end effector robot at the various levels of the storage array. The positioning of the end effector on both Z and X axis is accomplished by calibrating the robot system so that the proper relative position in encoder counts from "home" in each axis to each carrier storage position is known. Movement of the end effector robot along the z and x axis generally occurs simultaneously to accomplish a move in the most time-efficient manner.

The gantry robot x-axis rail 533 supports the carriage 501 used to move the end effector robot. The carriage 501 connected to the x-axis rail moves along a stationary belt 712 between two end-blocks. One end block has two fixed track rollers for movement along the x-axis, and one is spring loaded roller for movement of the x-axis rail along the z axis anti-rotation column 705, and belt clamps. The z-axis movement end-block has spherical plain bearing and belt clamps. The carriage 501 has the stationary belt 712 threaded through the rollers of the carriage to move the carriage along the x-axis, stabilized with an energy chain along the x-axis rail 533.

Figure 8:
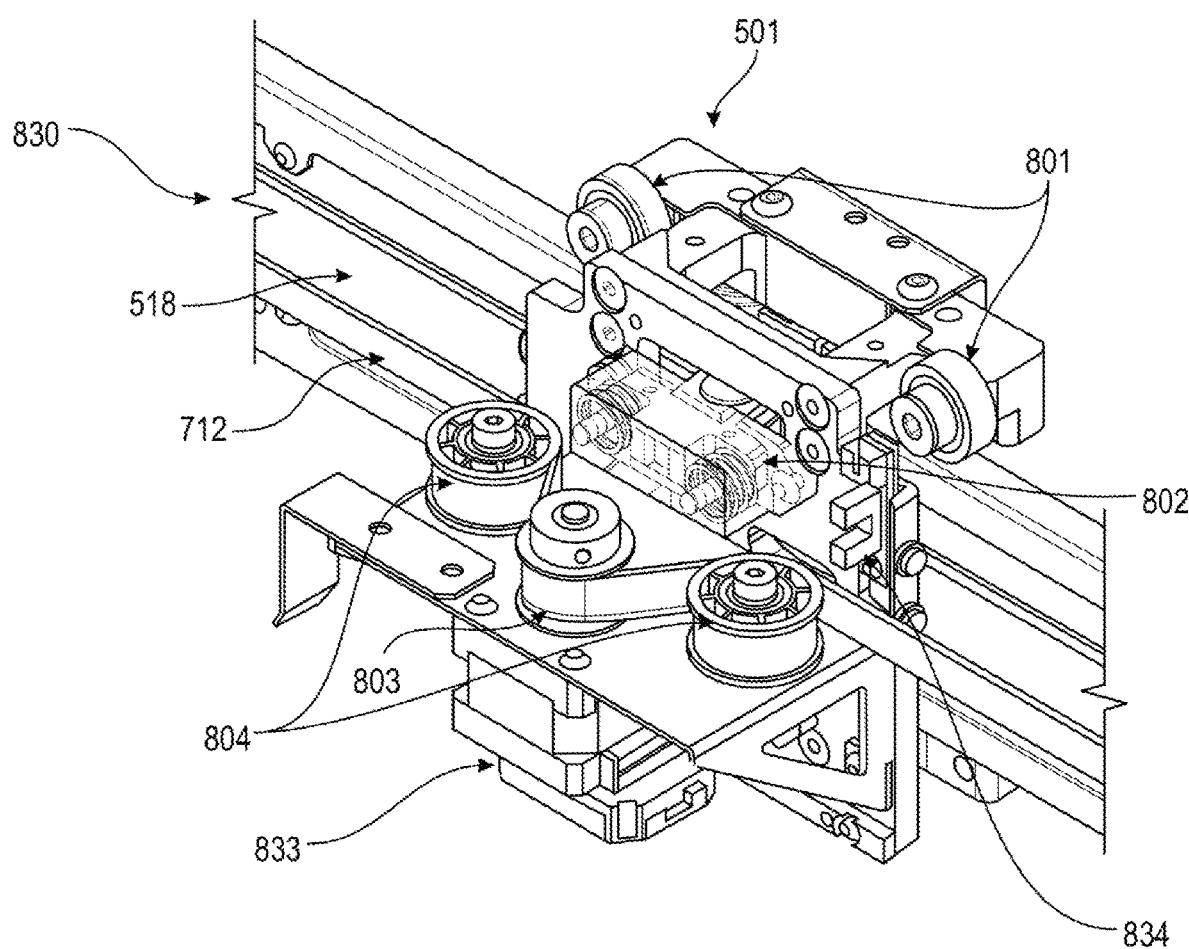
FIG. 8 illustrates a segment of the Gantry robot x-arm and carriage, a frontal 3-point perspective.

The movement of the carriage and the end effector robot along the x-axis rail is facilitated by the rollers and pulleys of the carriage 501, as exemplified in an isolated frontal three point perspective of the carriage, FIG. 8. The carriage fixed track rollers 801 and spring-loaded track roller 802 facilitate and guide the movement of the carriage with the attached end effector robot along the x-axis rail. The driving 803 and idler 804 pulleys move the belt 712 around the pulleys and thus move the carriage with attached end effector along the x-axis rail. The track rollers are lubricated by lubrication pads of the fixed rollers 801 and the spring-loaded roller 802. When carries are being moved to and from the end effector robot, forces, perpendicular to the x-axis arm and a significant distance from the X carriage, are applied at the pawl. This imparts a moment that the clamping of the carriage bearings riding on the track must resist with enough spring force so the end effector does not wobble during these actions.

The x-axis rail 518 and stationary belt 712 support and guide the carriage movement horizontally with driver pulley 803 driven by a stepper motor 833 with an encoder an x-homing sensor 834 positioning the carriage at a specific location on the x-axis rail, see FIG. 8. This type of kinematic linear slide mechanism allows precise positioning of the end effector robot. Spring forces are balanced to clamp hard enough to resist the forces applied to the gantry which represents a moment arm to the X carriage, but not so hard that there is too much friction in the system.

Figure 9:
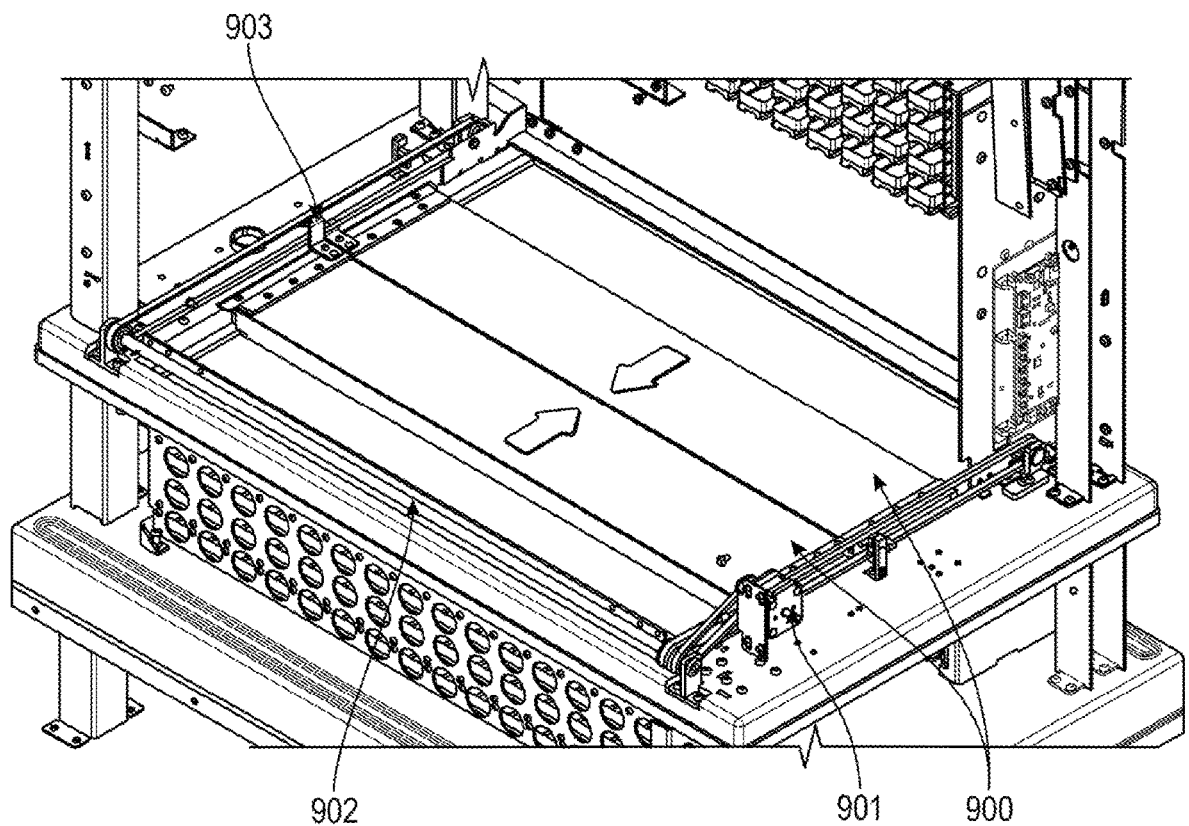
FIG. 9 illustrates an internal sectional view of the double dividing door and mechanism separating two storage area zones.

Insulated centrally dividing doors, constructed from vacuum-sealed insulation (VIP) panels, that separates the lower and upper portion of the unit, optionally the lower freezer compartment and the upper refrigerated compartment, are illustrated in FIG. 9. The insulated divider doors 900 are opened and closed by the rotation of a torsion bar 902 driven by a stepper motor 901 (e.g. stepper motor NEMA14 by SureStep Austin, TX USA). The belt clamps 903 open and close the two doors simultaneously. At the interface where the two doors meet there is a hollow-profile elastomeric seal that is compressed to provide an air-tight seal when doors are closed.

Figure 10:
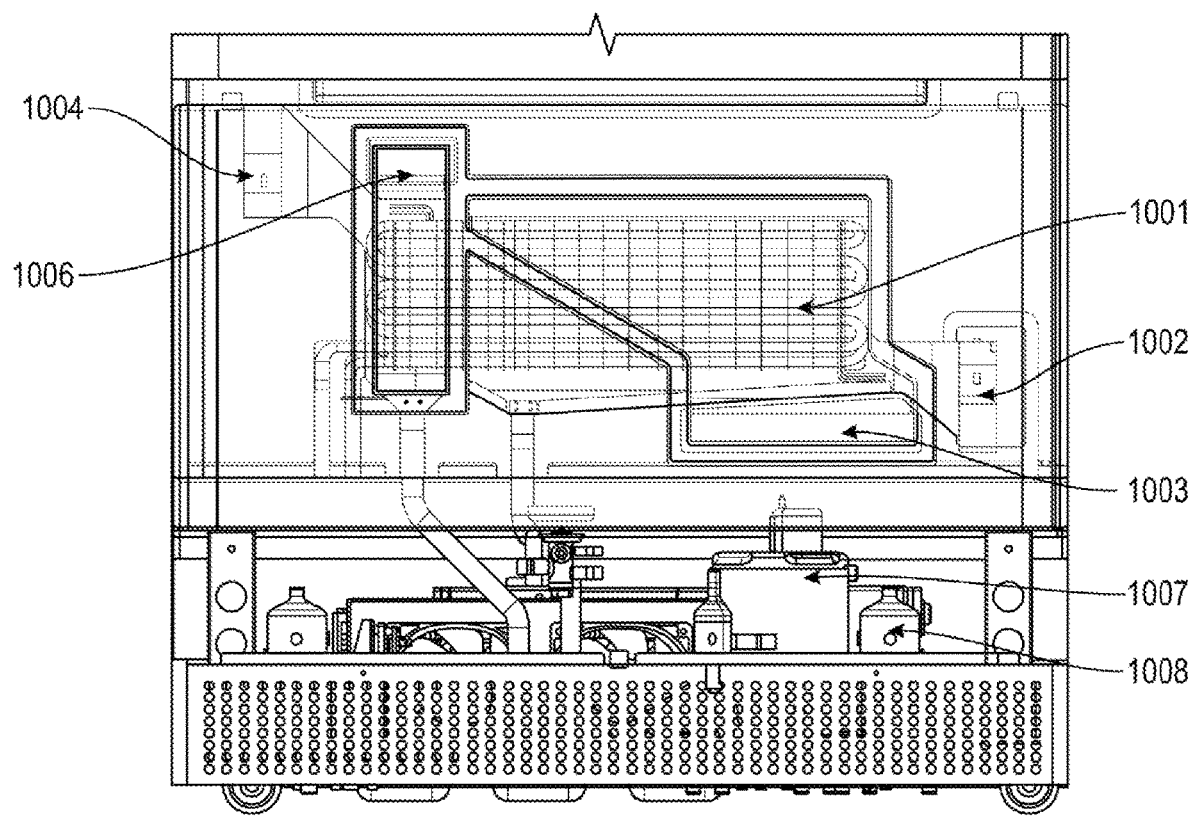
FIG. 10 is an internal perspective of refrigeration components, located in the bottom frontal portion of unit with outer shell and foam cover removed.

The automated storage unit, when implemented as a cold storage unit, includes refrigeration components, including the fans associated with an evaporator, that are operated to optimize temperature control, reducing temperature variations, of the storage unit various temperature zones. FIG. 10 provides an internal view, with outer shell and foam covering removed (see 116 of FIG. 1B), of the refrigeration components of the automated storage unit located in the lower portion of unit. Warmer intake air from the freezer intake vent 1003 and the refrigerator intake vent 1005 is directed by the molded foam covering over an evaporator 1001 and directed by a refrigerator fan 1004 and a freezer fan 1002 into the refrigerator and freezer compartments respectively. The temperature of the compartments is regulated by the on/off frequency of the fans and by fan speed. The compressor 1007 and accumulator 1008, or receiver, which stores liquid refrigerant within the system are located below the evaporator. The temperature of the one or more of the temperature zones of the unit may be displayed on the external portion of the automated cold storage unit meeting the regulatory requirements of the CDC and WHO, as defined above, for example when storing certain temperature sensitive pharmaceuticals.

Figure 11:
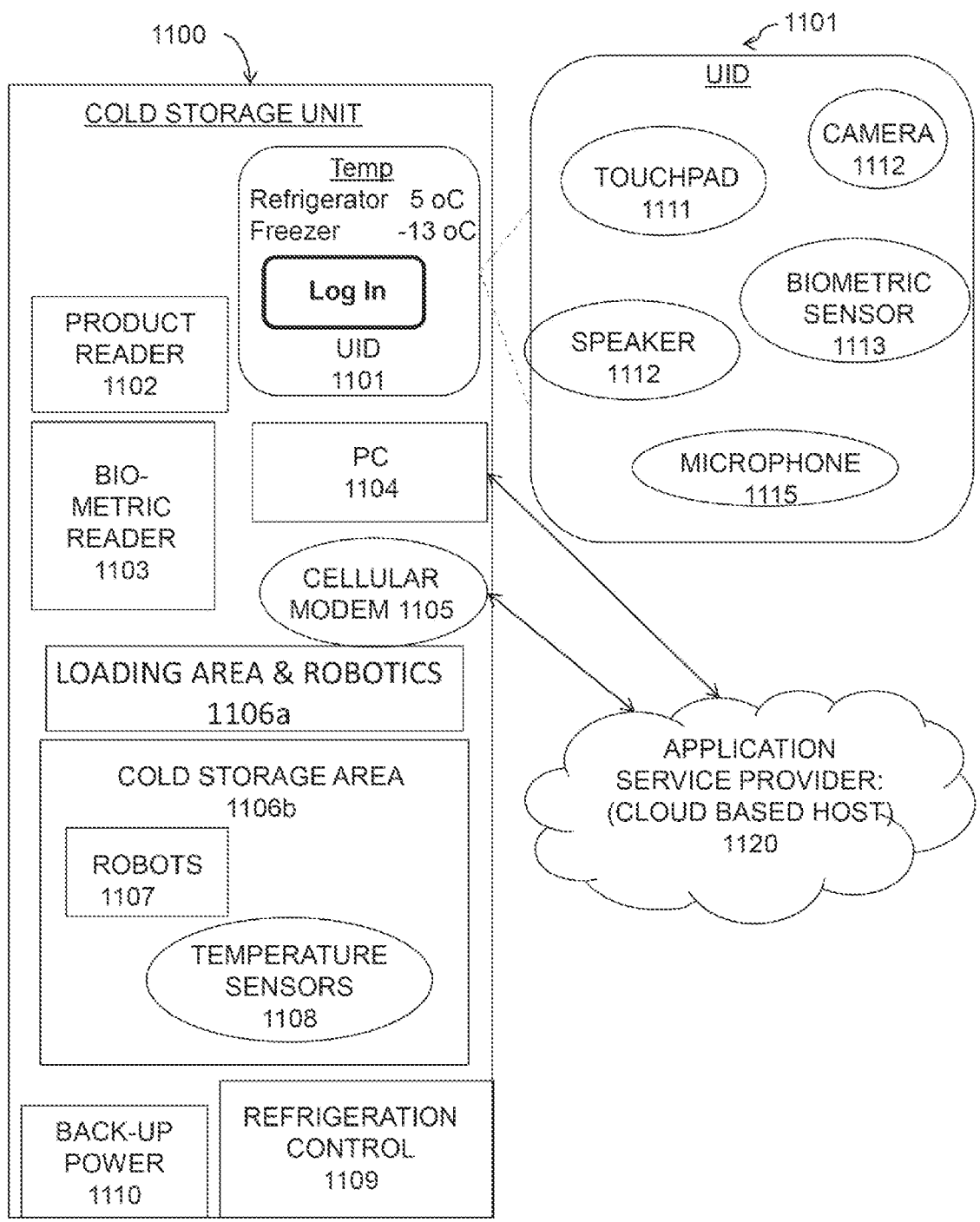
FIG. 11 contains a block diagram overview of cold storage system components.

An overview of the components of an exemplary cold storage unit and system for product management is provided in a block diagram of FIG. 11. The unit 1100 preferably includes a UID 1101, shown with an exemplary display of temperature and login icon, a product reader 1102, a biometric reader 1103 e.g. finger print reader, an industrial PC 1104, a cellular modem 1105, temperature sensors 1108, a backup power source 1110, refrigeration control member 1109, a loading area-robotics 1106a and a cold storage compartment 1106b with robots 1107 and temperature sensors 1108. The UID 1101 provides an exemplary resting state view of User Interface Device (UID) screen with the login icon and temperature of compartments prominently displayed.

An enlarged view of the UID 1101 provides a block diagram of the preferred components of the UID including a touch pad 1111, a camera 1112, a biometric sensor 1113, a speaker 1114, and a microphone 1115. The UID is connected to a local Internet router which provides access to a cloud based Application Service Provider (ASP) 1120.

Figure 12:
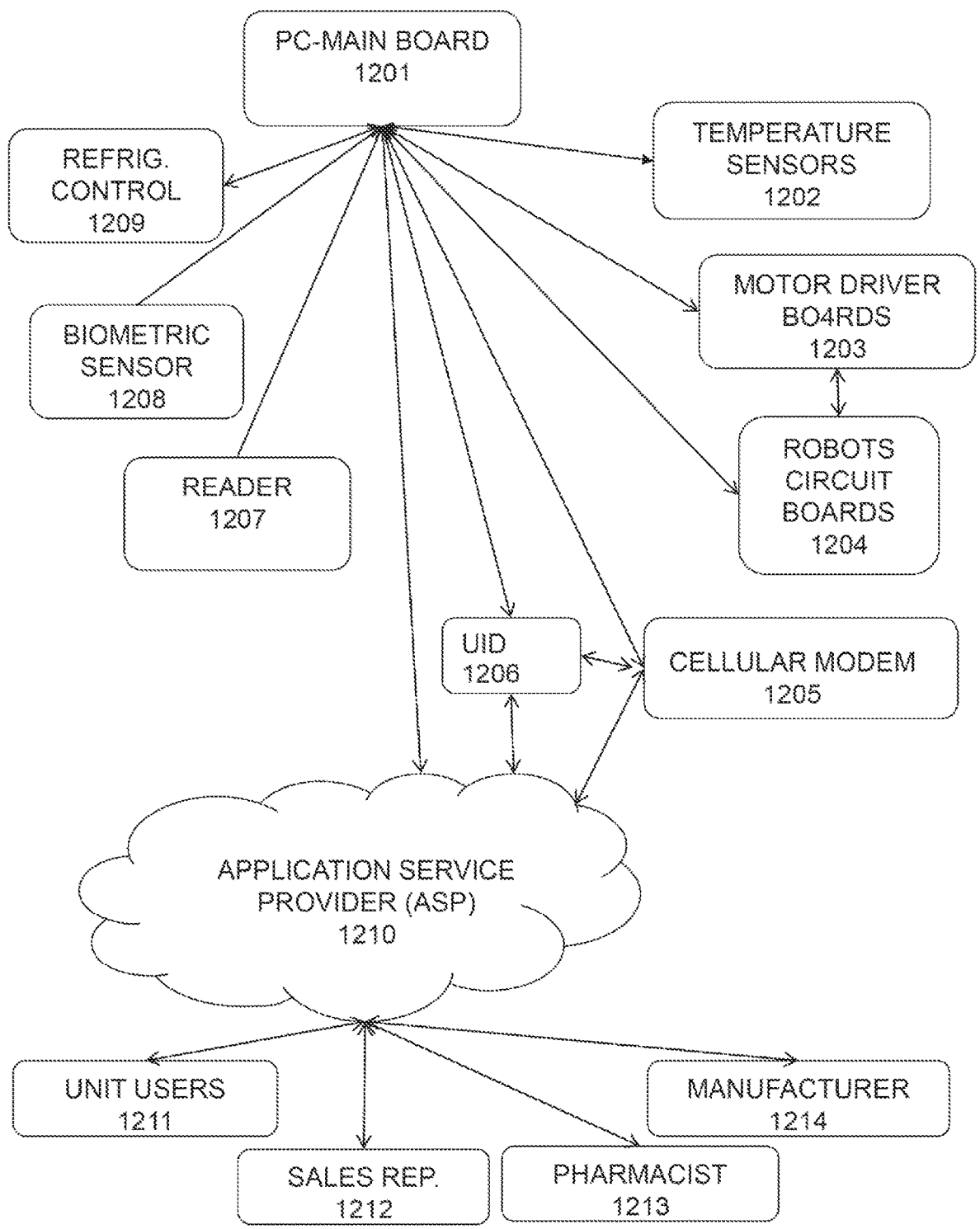
FIG. 12 contains a flow diagram illustrating communication between cold storage unit, UID and ASP.

FIG. 12 contains a block diagram overview of communication lines between components of an exemplary automated cold storage system. The Industrial PC main board 1201 communicates with all other circuit boards, cellular modem and internet connections including: UID 1206; temperature sensors 1202, motor driver board 1203; robot circuit boards 1204; cellular modem 1205; reader 1207; biometric sensor 1208; refrigeration control 1209; and the Application Service Provider (ASP) 1210. The ASP 1210 communicates, via a secure web site, with authorized users that include the unit user 1211 and other non-unit users for example, a sales representative 1212, a pharmacist 1213 and a manufacture 1214. If internet service is disrupted the UID and the Industrial PC can maintain communication with the ASP via a cellular modem 1205 embedded in the unit. The Industrial PC 1201, motor diver boards 1203, and robot circuit boards 1204 control the movement of the gantry, carriage and the end-effector robots.

Products are placed and removed into/from the automated storage unit by a user placing and removing products from carriers held in a loading tray that moves the products in and out of the storage area. Once the products(s) are in a carrier of a loading tray docked inside the storage area, the gantry, carriage, and end effector robots move a product to and from the storage bays. The load and dispense of product protocols, to and from the storage unit, are exemplified in the flow diagrams of FIGS. 13-21. Starting with the loading tray transport of product to and from the docking station within the storage area to the movement of the product and/or carrier within the storage array, the protocols are optimized for accurate placement and tracking of products and the speed of load/dispense action.

Figure 13:
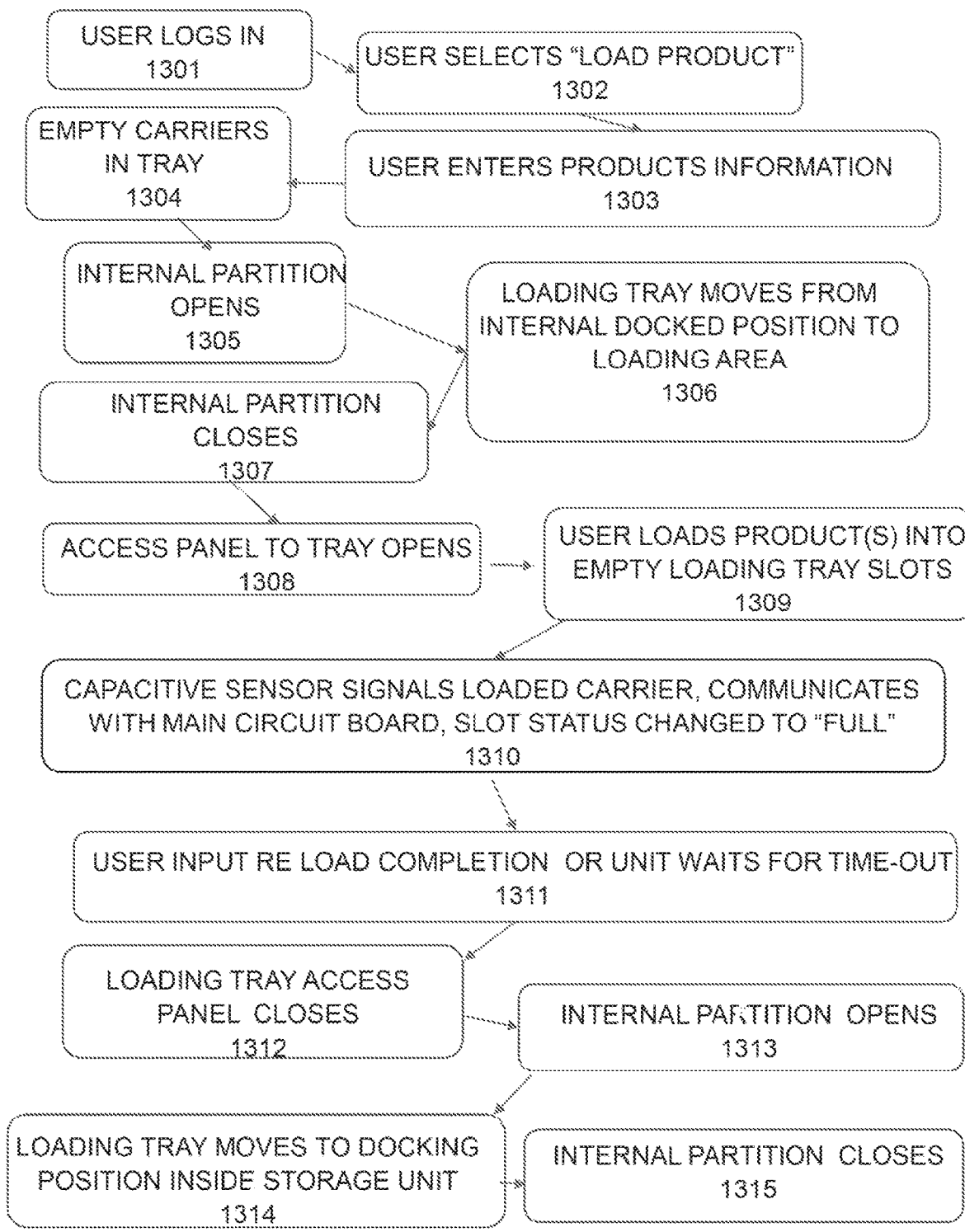
FIG. 13 contains a flow diagram overview of product intake steps with loading tray.

The protocol for the placement of product, to be stored in the automated storage unit, in the loading tray by a user is exemplified in FIG. 13. The figure contains a flow diagram overview of product intake steps, beginning with a user selecting a "load product(s)" routine and concluding with the (partially or fully) loaded loading tray returning to its docked position inside the product storage area of the unit. To begin the process, the user logs in, via the User Interface Device (UID), to access the unit (step 1301) and selects the "load product" option on the UID (step 1302). The user enters the product information and either scans in, with a reader, the product-identifying information of the unit(s) of the particular product to be loaded or, alternatively, enters the product-identifying information manually including the number of products of a particular type, e.g. products with same lot number, to be loaded (step 1303). In this exemplary routine, the gantry robots position the end effector robot to pick up empty carriers, one or two at a time, closest to the loading tray docking station, and then reposition the end effector robot to fill the loading tray slots with number of empty carriers equal to the number of products to be loaded (step 1304). The internal partition between climate-controlled storage array and loading area opens (step 1305), the loading tray with empty carriers moves from its internal docked position to the loading area (step 1306), and then the internal partition closes (step 1307). In the following step the access panel opens, making the loading tray available to the user (step 1308). The user places the desired number of units of product to be loaded into a corresponding number of carriers in docked loading tray slots (step 1309). The capacitive sensing board beneath the loading slots (or other product sensor) then communicates with a computer onboard the unit and the status of the particular slot is updated to "full" (or "occupied" or the like) when a unit of product is present (step 1310). The unit software updates the UID to reflect the current state of each slot, empty/full, and waits for the user to acknowledge completion of the load event or passing of preset time limit of "no action" or the like to proceed to the next step (step 1311). The access panel to the loading tray closes (step 1312), the internal partition to the storage area opens (step 1313), the tray moves back to its docking position inside the storage area (step 1314), and the internal partition to the storage area of the unit then closes. (step 1315).

In the representative unit embodiment described here, the loading tray is preferably docked inside the unit with 6 of its 10 slots filled with empty carriers ready for loading and 4 slots left empty (no carrier), ready for a "dispense" operation. Note that in such a configuration, step 1303 in the preceding paragraph may not be required if the number of units of product to be loaded is 6 or less. If for example 10 products are to be loaded into the storage array, all 10 slots of the loading tray are filled with empty carriers.

Figure 14:
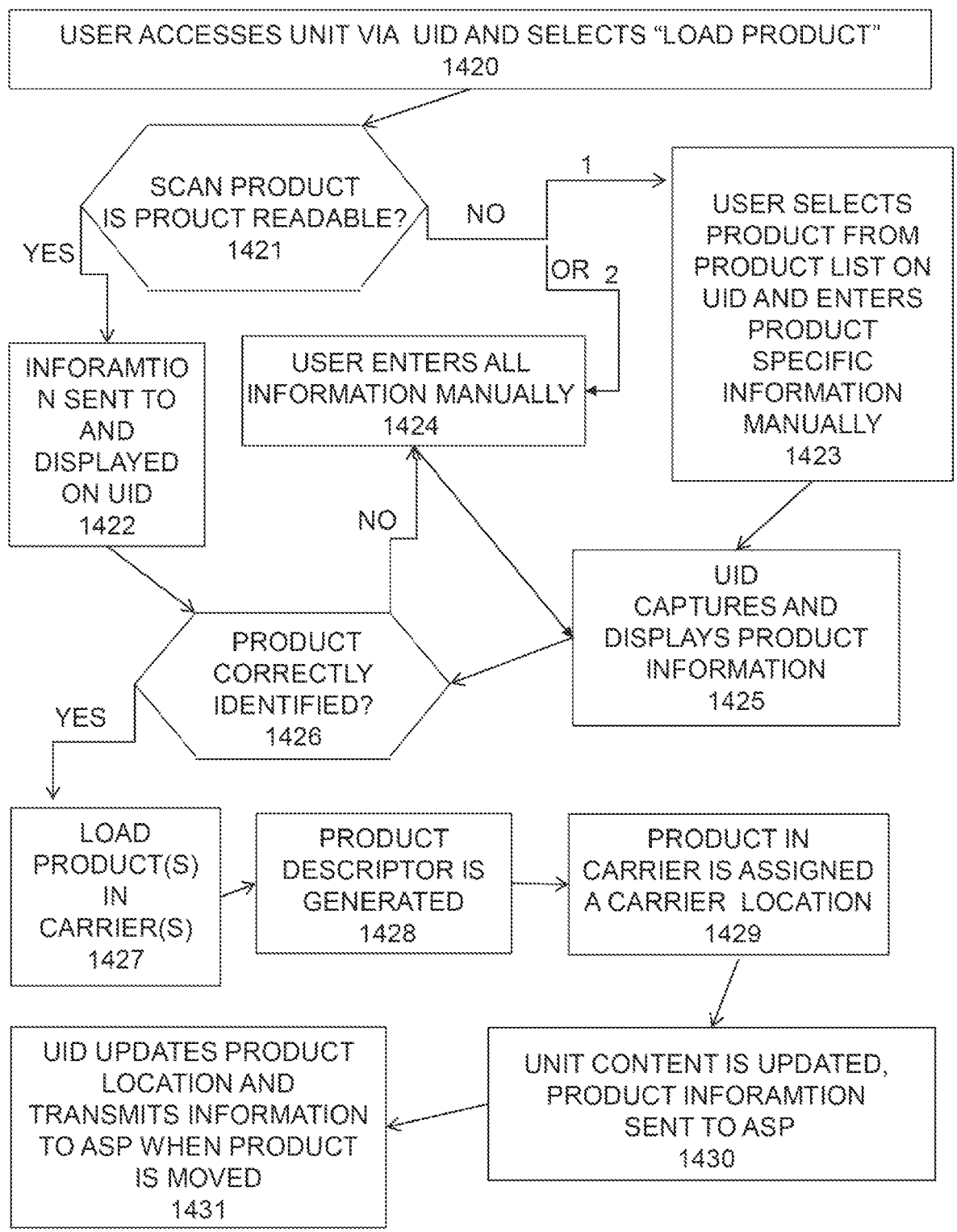
FIG. 14 contains a flow diagram overview product information capture by the automated storage unit.

An exemplary flow diagram for the capture of product information by the automated storage unit is provided in FIG. 14. An on-site user accesses the unit and selects a "load product(s)" routine (step 1420). The user scans the product using a reader, for example a barcode reader, and confirms if the product is scannable, i.e. if identification label/tag is embedded on the product (step 1421). The reader transmits the information to the UID (step 1422). If a label/tag is not available or legible the user selects the general product descriptor from a menu, e.g. drop down menu, or a product listing on the UID and enters product specific information manually (step 1423), or enters all information manually (step 1424). Product information is captured and displayed on the UID (1425). The user confirms correct identification of the product (step 1426). If product is not correctly identified or information is missing the user enters the correct information (returns to step 1424) and the UID confirms receipt of data (step 1425). Once the product is correctly identified the user is instructed to load product(s) into carriers in the loading tray (step 1427). The UID sends product information to the ASP and a full product descriptor is generated (step 1428). The product carriers are assigned storage bay locations (step 1429) and the UID content is updated and sent to the ASP (step 1430). The UID updates the location of the product from tray slot to storage bay and transmit location data to the ASP whenever the product is moved (step 1431).

Figure 15:
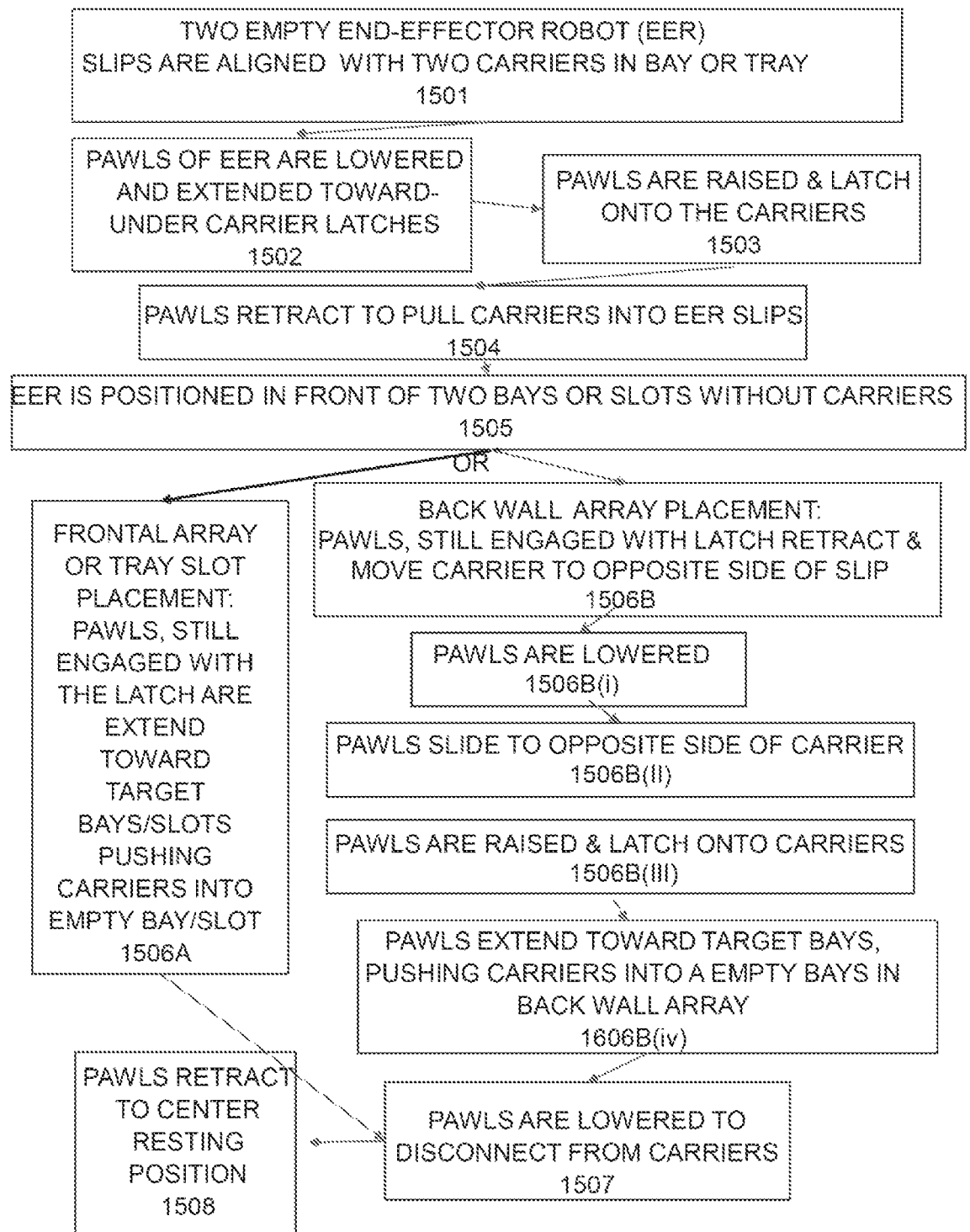
FIG. 15 contains a flow diagram overview of product intake by the gantry and end effector robots.

The placement/removal of product, within a carrier, to/from the loading tray docked inside the unit or a storage bay is carried out by the end effector robot whose movements are described in the flow diagram of FIG. 15. More specifically FIG. 15 contains a flow diagram overview of the carrier movement between end effector robot slips and the bays of the storage array or the slots of a loading tray using a dual end effector robot to move two carriers. The empty end-effector robot slips which pick up carriers, with or without product, are aligned, by the gantry robot along the z-axis to the correct floor of the array and the end effector robot carriage along the x-axis arm, with two carriers in the bays of the storage array or two loading tray slots (step 1501). The pawls on the end effector robot are lowered and extended toward the carriers placing the pawls under the respective carrier latch, the dual end effector robot pawls operating simultaneously (step 1502). The pawls are raised to latch onto the carriers (step 1503) and then retract to pull the carriers into the end effector robot slips (step 1504). The connection made between the end effector robot pawl mechanism and a carrier latch was previously described in FIGS. 5D-5G. The end effector robot is then positioned by the gantry robot in front of two storage bays, or the loading tray slots, without carriers (step 1505).

To place carriers in the frontal array or the loading tray slots, the pawls, still engaged with the latch on carrier, are extended toward target bays, or slots, pushing the carriers into an empty storage bays, or slots, in the frontal array or tray (step 1506*a*). To place a carrier in the back-wall array the pawls, still engaged with the latch on carrier, are retracted as far as possible to move the carrier closer to the opposite side of the end effector robot slip (step 1506*b*), the pawls are lowered (step 1506*bi*) and slide to opposite side of carrier (step 1506*b*(ii)). The pawls are raised to latch onto the opposite side of the carriers (step 1506*b*(iii)) and then extended toward target slips, pushing carriers into an empty storage bay in the back-wall array (step 1506*b*(iv)). Once product is inside the storage bay or tray slot, the pawls are lower to disconnect from the carriers (step 1507) and retract back to center resting position (step 1508). The dual end effector can operate simultaneously or independently picking up and delivering 1 or 2 carriers at a time.

Figure 16A:
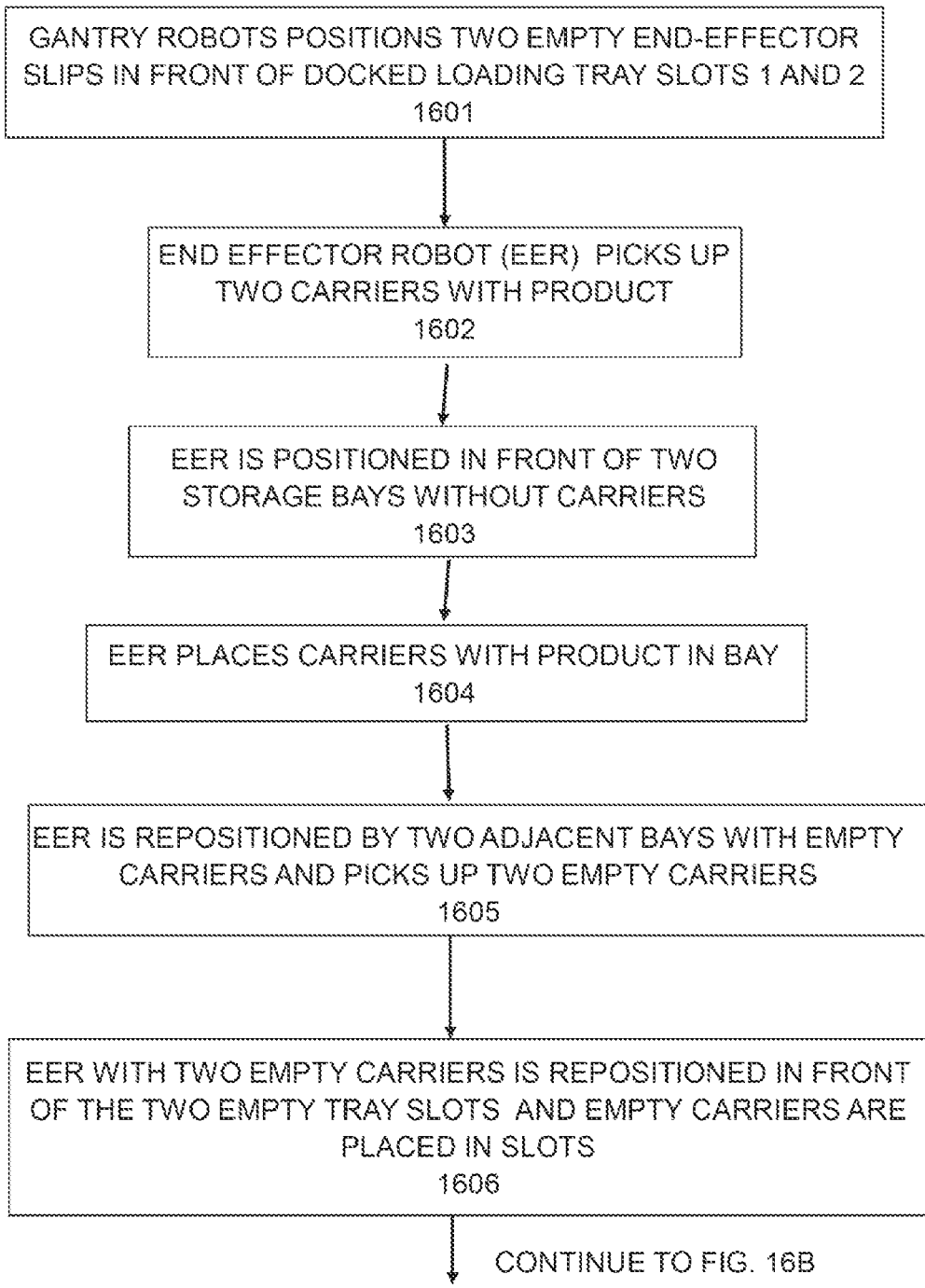
FIGS. 16A-16B contain an overview flow diagram for product placement from loading tray into the storage array by gantry and end-effector robots. The protocol is for the storage of exemplary 20 products in carriers in storage bays when adjacent empty bay positions are available.
Figure 16B:
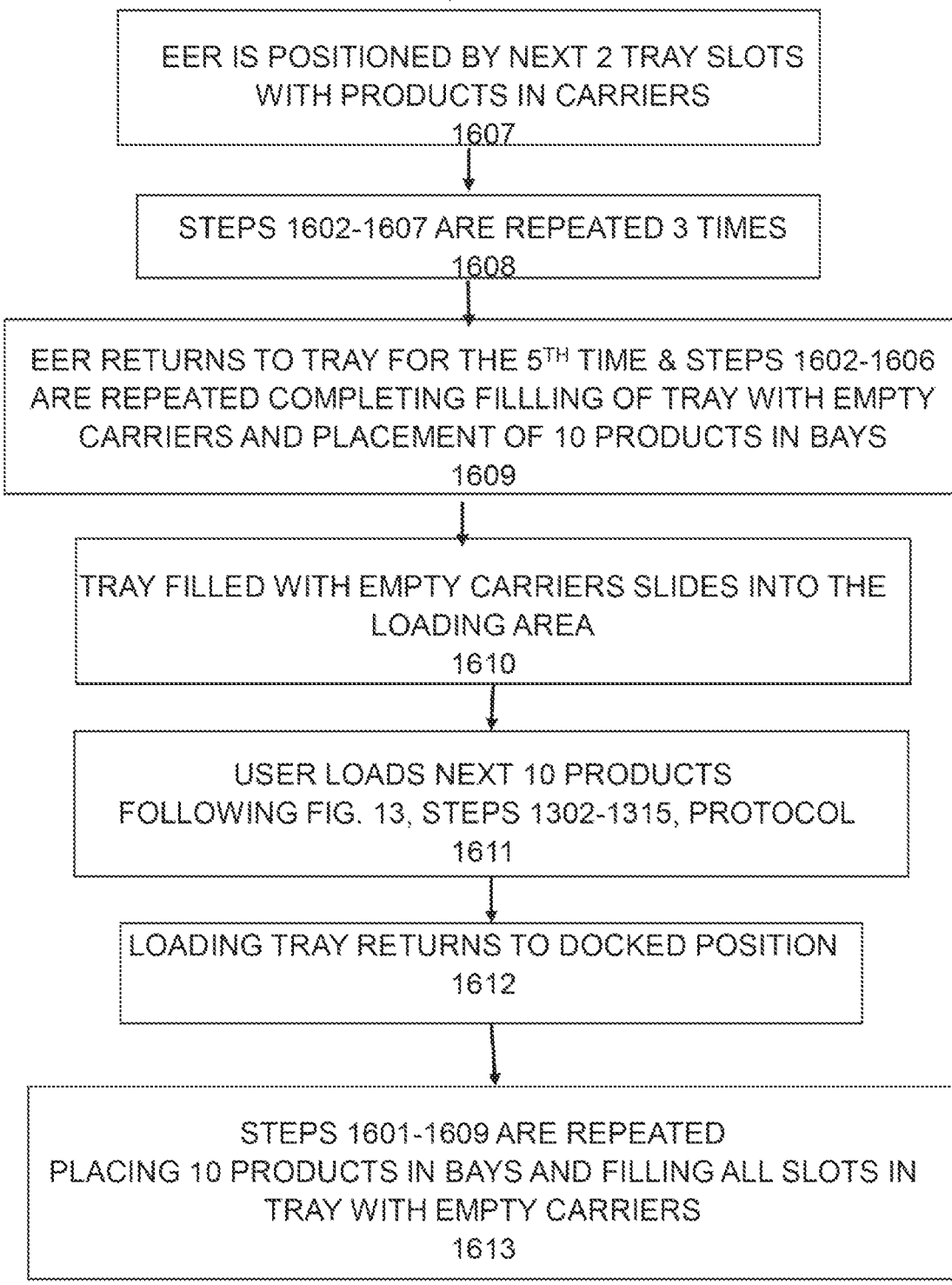

An exemplary product loading protocol of FIGS. 16A-16B incorporates the tray loading protocol of FIG. 15 filling the loading tray with products in carriers and the end effector movements of carriers as described in FIG. 16. FIGS. 16A-16B specifically provides a flow diagram of product placement from loading tray into the storage array by gantry and dual end-effector robots. The exemplary protocol is for the placement of twenty products, in carriers, into storage bays when the storage array is not filled to capacity with product and adjacent bay positions, without carriers or with empty carriers, are available.

The gantry robots position two empty end-effector slip in front of the first two slots, left side slots 1 and 2, of the loading tray docked inside the storage array and filled with carriers containing product (step 1601). The end effector robot picks up the two carriers with product (step 1602). The end effector robot is positioned by the gantry robot in front of two storage bays without carriers (step 1603) and places carriers with product in the corresponding storage bay (step 1604). The end effector robot is repositioned by the gantry robots by two adjacent storage bays with empty carriers, located closest to the just placed carriers with product, and picks up two empty carriers (step 1605). The end effector robot with two empty carriers is repositioned and aligned by the gantry robots in front of the two empty slips in the loading tray and the empty carriers are placed into the tray slots without carriers (step 1606). The process of transferring products in carries to storage bays then continues. The end effector robot is positioned by the gantry robot x-axis arm by the next two tray slots containing carriers with products and adjacent to the slots now filled with empty carriers (step 1607) and steps 1602-1607 are repeated 3 times (step 1608). The 5th time the end effector robot returns to the loading tray steps 1602-1606 are repeated and the filling of the loading tray with empty carriers and the placement of 10 products in storage bays is complete (step 1609). The tray filled with empty carriers slides into the loading area and is loaded, by the user, with the second group of 10 products following FIG. 13, steps 1302-1315, protocol (step 1610).

To begin the process of the placement of the next 10 products in storage bays steps 1602-1604, and 1607 are repeated 2 times placing 4 products in the storage bays and leaving 4 empty slots in tray positions 1-4 (step 1611). Then, steps 1602-1607 are repeated 2 times placing 4 additional products in the storage array and filling 4 slots in tray with empty carriers (step 1612). Steps 1602-1606 are repeated 1 time placing the last 2 products in the storage array and filling 2 slots in tray with empty carriers (step 1612). At the completion of step 1612 twenty (20) products were loaded into the storage array leaving a tray filled with 6 empty carriers and 4 empty slots, docked within the storage array and readied for the next load or dispense action.

A protocol for loading less than 10 products will be adjusted to accommodate the repositioning of the end effect robot slip by the closest tray slot-containing carrier with product if the products are not placed by the user in adjacent slots within the tray. The user is not required to place products in adjacent carriers as the presence of product in a carrier is detected by the capacitive sensing board, see FIG. 2E, and the end effector slip is aligned with product filled carriers, one or two slips at a time. The carriage stepper motor 833 (see FIG. 8) repositioning the end effector robot along the x-axis arm in front of a product occupied loading tray slots.

Figure 17A:
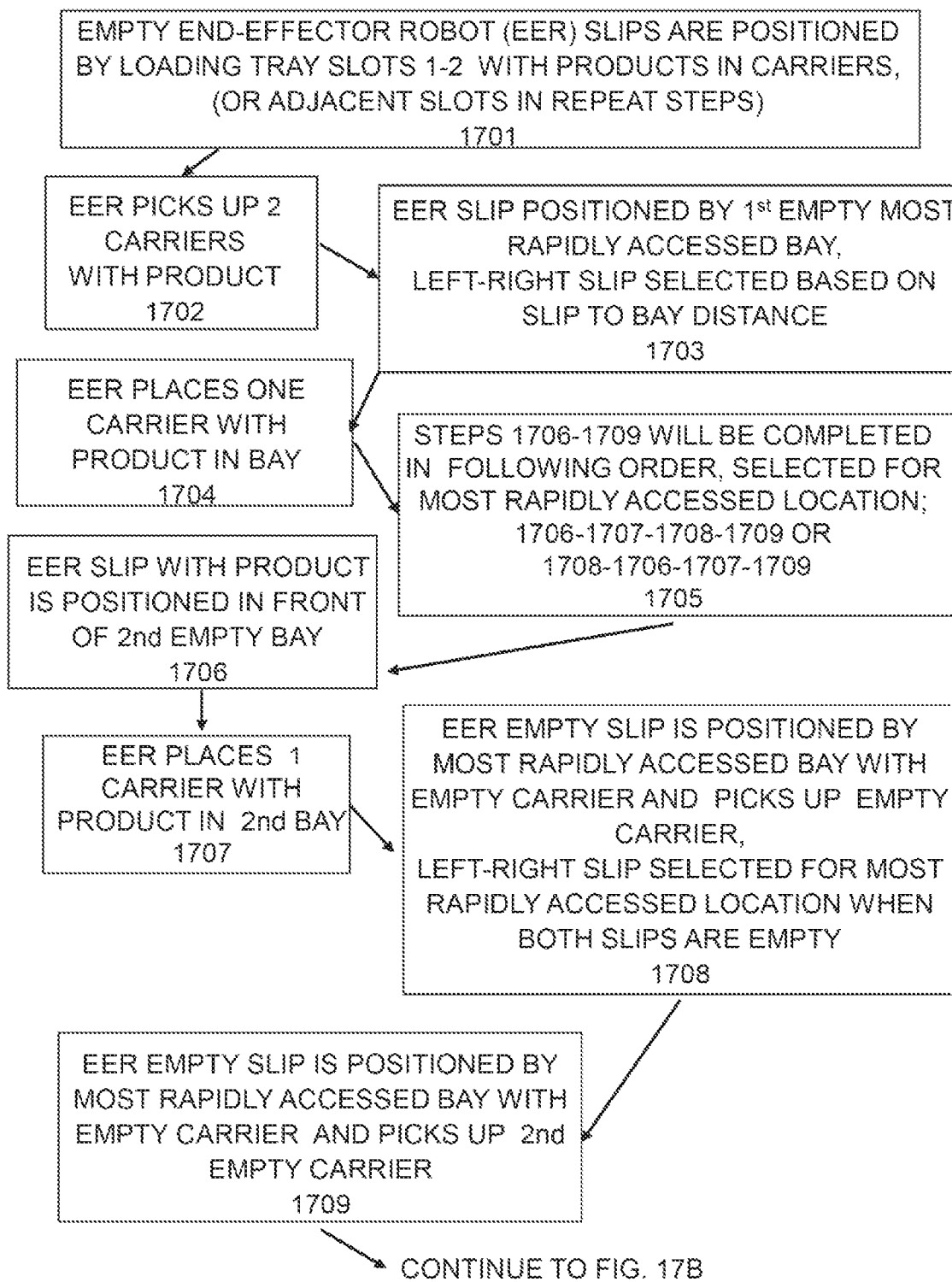

The exemplary protocol for the storage of twenty products in carriers in storage bays when the storage array is almost filled to capacity and adjacent bay positions are not available, is exemplified in FIGS. 17A-17B that contain a flow diagram overview of product placement from loading tray into the storage array by gantry and dual end-effector robots. The gantry robot positions two empty end-effector slip in front of slots 1 and 2, left side of loading tray, carriers with product located in the slots of the docked loading tray (step 1701) and the end effector robot picks up two carriers with product (step 1702). An end effector robot slip is then positioned by the gantry robot in front of the first, most rapidly accessed, storage bay without carrier, with left or right slip selected based on slip to bay distance (step 1703). The end effector robot places the one carrier with product in a storage bay (step 1704). The following steps 1706-1709 will be completed in the following order, the order selected based on most rapidly accessed location; steps 1706-1709 will be followed sequentially, to first place 2 products and then pick up 2 empty carriers, or step 1708 will be followed by steps 1706, 1707 and last step 1709, to place one product first and then $1^{st}$ pick up an empty carrier followed by $2^{nd}$ product placement and second empty carrier pick up (step 1705). The protocol for the storage of two products followed by pick up of empty carriers is as follows: the end effector robot slip with product is positioned by the gantry robot in front of a second, most rapidly accessed, storage bay without carrier (step 1706); the end effector robot places the one carrier with product in the second storage bay (step 1707);

the end effector robot empty slip is repositioned by the gantry robot by the most rapidly accessed storage bay with empty carrier and picks up the empty carrier, with left or right slip selected first for most rapidly accessed location by the slip without a carrier (step 1708); the end effector robot second empty slip is repositioned by the gantry robot by the most rapidly accessed storage bay with empty carrier and picks up the second empty carrier (step 1709). The protocol for first products storage followed by pick up of one empty carrier is as follows: the end effector robot empty slip is repositioned by the gantry robots by the most rapidly accessed storage bay with empty carrier and picks up the empty carrier, with left or right slip selected for most rapidly accessed location or the slip without a carrier (step 1708); then the end effector robot slip with product is positioned by the gantry robot in front of a second, most rapidly accessed, storage bay without carrier (step 1706); the end effector robot places the one carrier with product in the second storage bay (step 1707); the end effector robot empty slip is repositioned by the gantry robot by the most rapidly accessed storage bay with empty carrier and picks up the second empty carrier (step 1709). The end effector robot with two empty carriers is then ready to return to the loading tray and is repositioned and aligned by the gantry robot in front of the two empty slots in the loading tray and the empty carriers are placed into the tray slots without carriers (step 1710). The end effector robot is positioned by the gantry robot x-axis arm by the next two tray slots containing carriers with products and adjacent to the slots from which product was uploaded in the previous steps (step 1711). Steps 1702-1711 are repeated 3 times (step 1712). The 5th time the end effector robot returns to the loading tray steps 1702-1710 are repeated and the filling of the loading tray with empty carriers is complete (step 1713).

The tray filled with empty carriers is loaded, by the user, with the second group of 10 products following FIG. 13, steps 1302-1315, protocol (step 1714). Steps 1701-1704, 1706, 1707, and 1711 are repeated twice, second time picking up products form slots 3 and 4, loading 4 products in storage bays and leaving tray slots 1-4 without carriers (step 1715). Steps 1701-1711 are repeated twice, this time picking up products from slots 5-8, loading 4 products in storage bays and filling tray slots 5-8 with carriers (step 1716). Steps 1702-1710 are repeated once, completing the loading of the 20 products and filling tray slots 5-10 with empty carriers (step 1717).

Figure 18A:
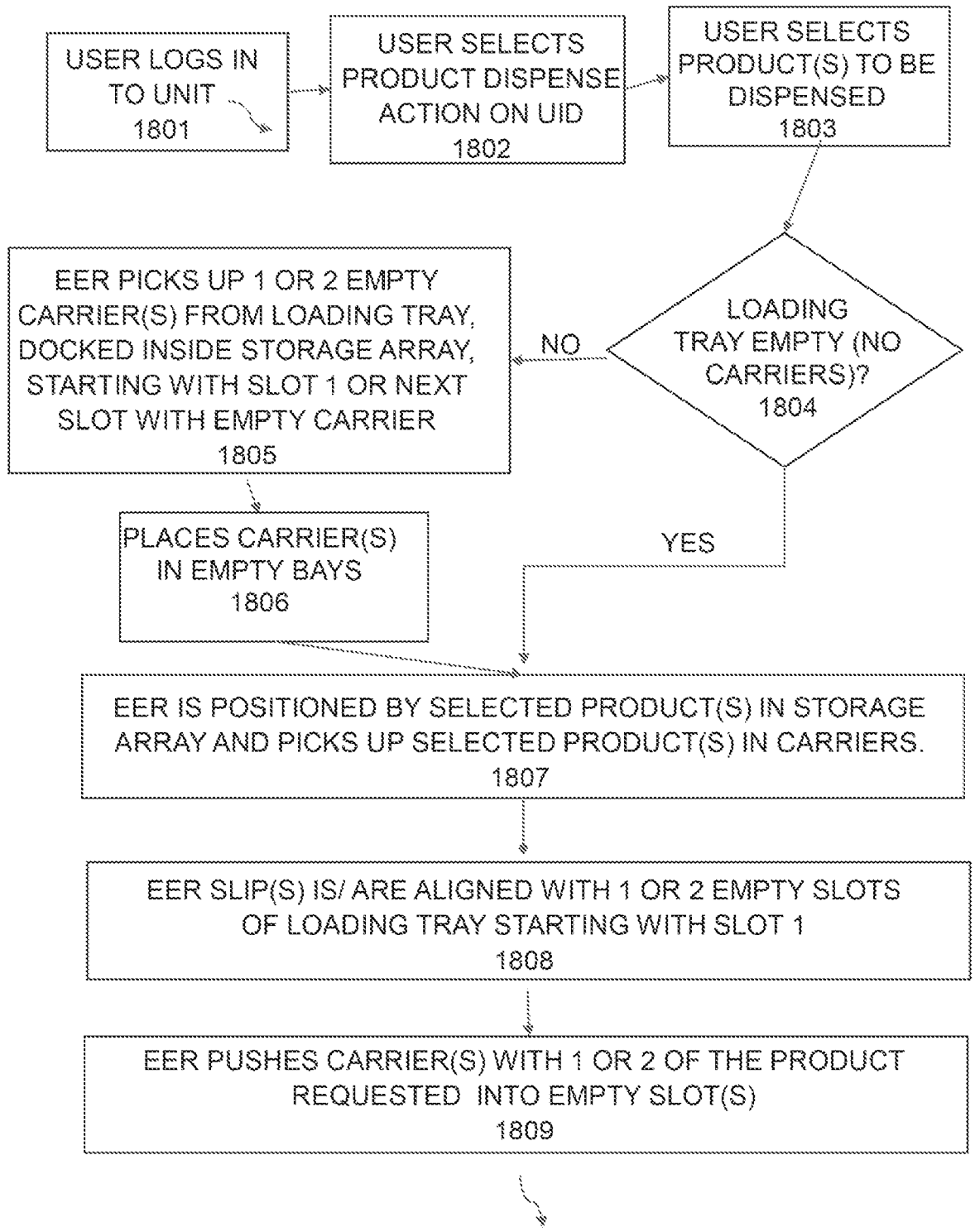
FIGS. 18A-18B contain a flow diagram overview of product dispense protocol.
Figure 18B:
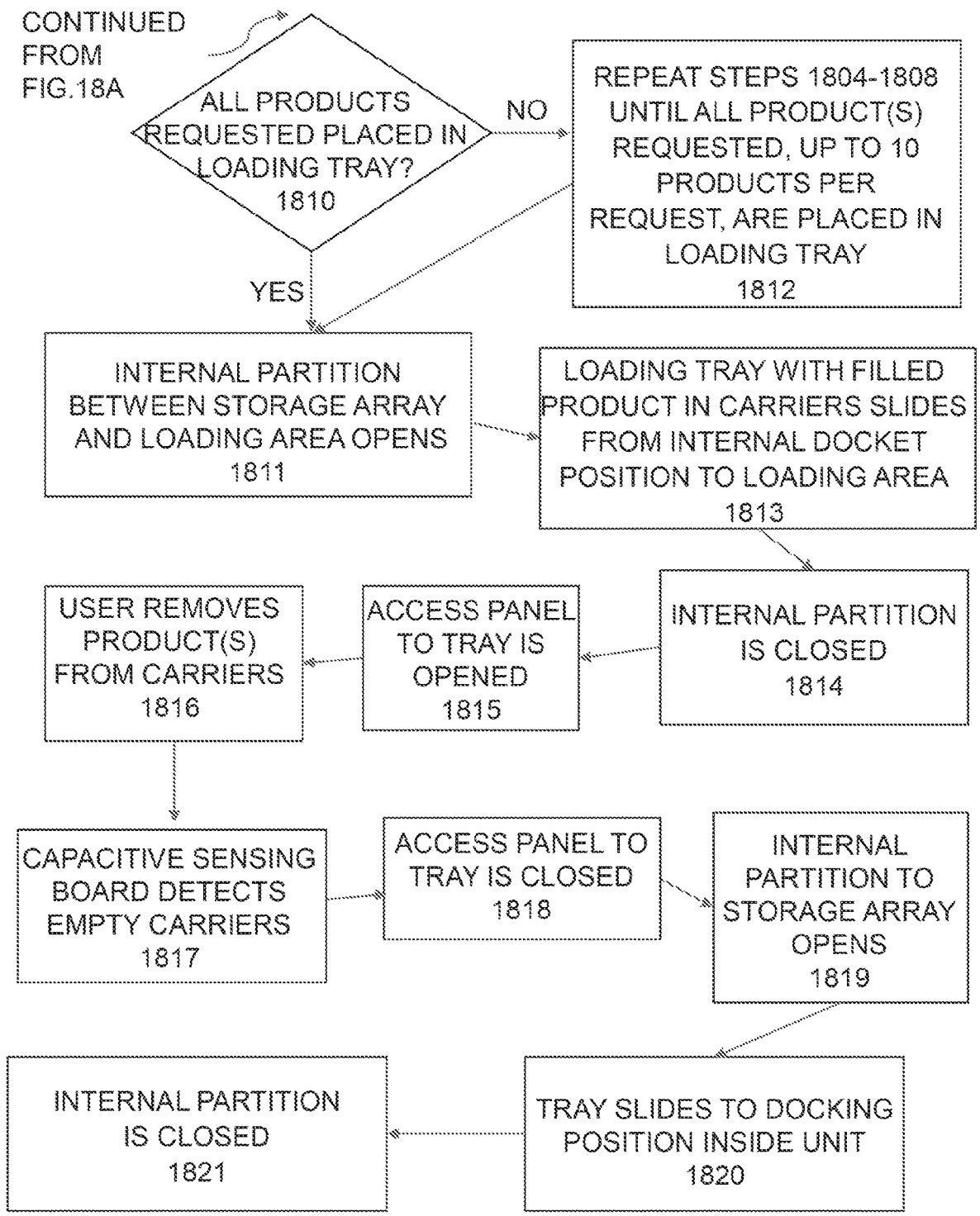

The protocol for the dispensing of products is exemplified in FIGS. 18A-18B. The user logs in to access the unit (step 1801), selects product dispense action on the UID (step 1802), and selects products to be dispensed (step 1803), FIG. 18A. The status of the loading tray, empty or filled with carriers, is determined (step 1804). If the tray is filled with empty carriers the End Effector Robot picks up the empty carriers (step 1805) and places them in empty bays (step 1806). When the loading tray is empty it is ready to receive products. The end effector robot is positioned by the selected product(s) in the storage array and picks up selected product(s), 1 to 2 products in carriers at a time based on the number requested (step 1807). The end effector robot must be repositioned for second product pick up if not located adjacent to 1st product requested. A product located in the first columns on the left must be picked up by the left dual end effector slip and the product located in the first columns on the right will be picked up by the right dual end effector slip. The end effector robot is then positioned by the loading tray docked inside the unit with end effector robot slips aligned with the one or two empty slots in the tray starting with tray slot 1 (step 1808). The 1 or 2 carriers with product are pushed by the end effector robot into the empty slots of the loading tray and the pawls lower and retract (step 1809). The following step sequence depends upon the number of products requested and if all products are in loading tray (step 1810). If 1 to 2 products are requested, step 1809 is followed by step 1811; if 3-4 products are requested, step 1809 is followed by step 1812.

When a one to two product request is received, the protocol proceeds to step 1811, FIG. 18B. With products placed in the loading tray, the internal partition between the climate-controlled storage array and loading area opens (step 1811). The loading tray with filled carriers then slides from the internal docking position to the loading area (step 1813). The internal partition then closes (step 1814). The access panel to the loading tray then opens (step 1815). The user then removes product(s) from carriers docked in slots in the loading tray (step 1816). The capacitive sensing board then detects that the carriers in the loading tray slots are empty (step 1817). The access panel to loading tray is closed (step 1818) and the internal partition to the storage array within the automated storage unit opens (step 1819). The loading tray then slides back to its docking position inside the unit (step 1820) and the internal partition to the storage array within the unit closes (step 1821). When more than two products are requested (step 1812), the end effector robot is positioned by the next two selected product(s) in the storage array and the end effector robot picks up selected product(s), 1 to 2 products in carriers at a time based on the number requested. The end effector robot is positioned by the loading tray docked inside the unit with end effector robot slips with product aligned with one or two empty slots in the tray and the 1 to 2 carriers with product are pushed by the end effector robot into the empty slots of the loading tray and the pawls lower and retract. The end effector robot picks up one to two empty carriers, up to two at a time, from the loading tray and puts them into empty storage bays. The end effector robot picks up the next two requested products in carriers, up to two at a time, from the storage bay(s), selected for most rapidly accessed location. The steps are repeated until all requested products, up to a maximum of 10 products (in this embodiment), are in the loading tray. Steps 1801-1821 are repeated if additional products, greater than 10, or a new dispense request is initiated (step 1828).

Figure 19:
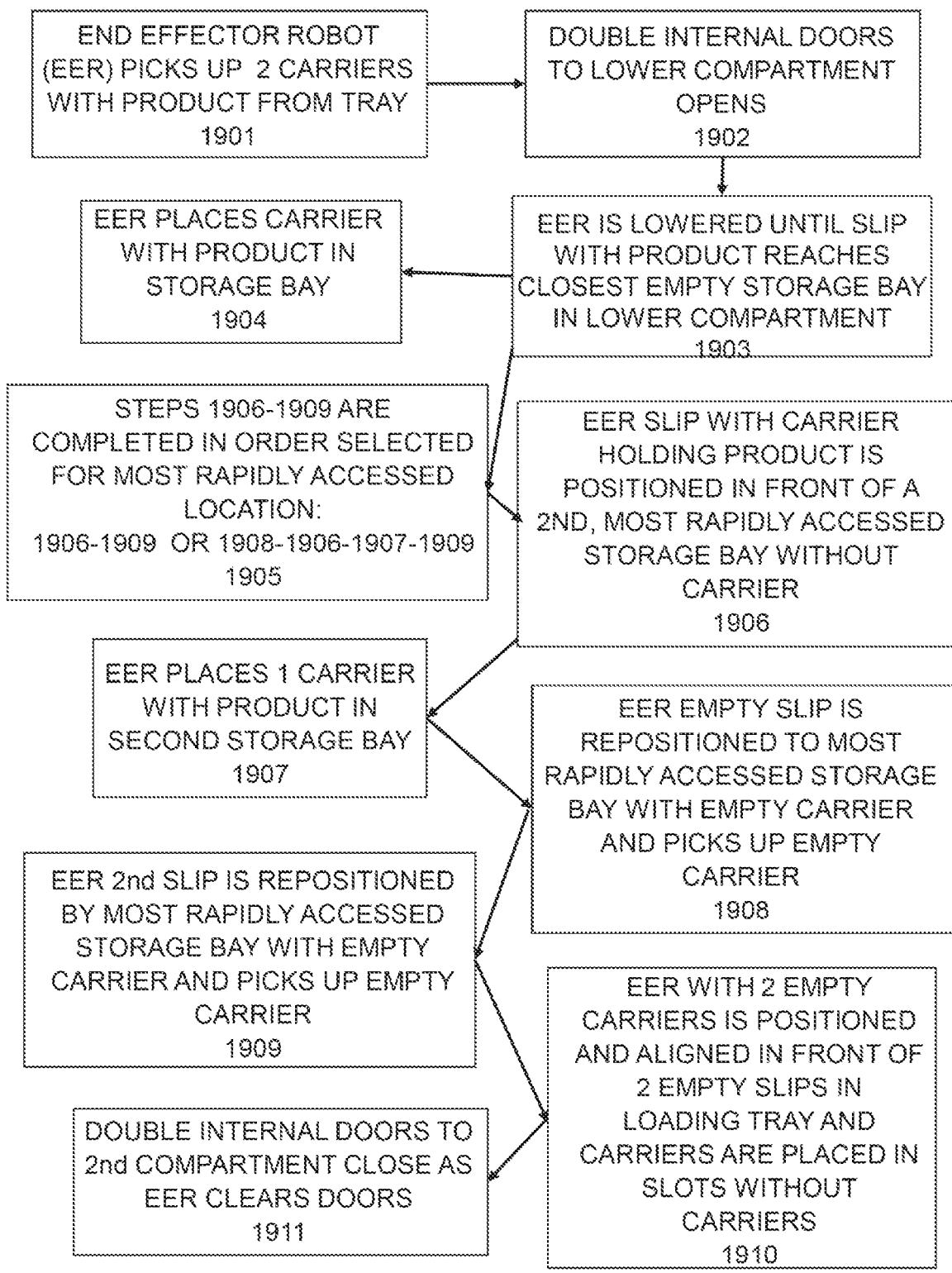
FIG. 19 contains a flow diagram overview of product load and dispense protocol between the docked loading tray and the lower compartment of the unit, the freezer section.

Product placement in the compartment in the lower portion of the unit, the freezer section, is exemplified in the flow diagram of FIG. 19 which provides an overview of product load protocol between the docked loading tray and the lower compartment of the unit. The end effector robot picks up two carriers with product from the tray (step 1901). The double internal doors to the lower compartment slide open (step 1902). The end effector robot is lowered by the gantry robot until the end effector slip with product reaches the closest storage bay within the lower compartment without a carrier (step 1903). Two storage bays remain empty in the lower compartment to facilitate one z axis movement combining product delivery and carrier removal to and from the lower compartment. The end effector robot places the carrier with product in the storage bay (step 1904). The following steps 1906-1909 will be completed in the following order, selected for most rapidly accessed location; 1906-1909 followed sequentially or step 1908 will be followed by steps 1906, 1907 and 1909 sequentially (step 1905). The end effector robot slip with carrier holding product is positioned by the gantry robot in front of a second most rapidly accessed, storage bay without carrier (step 1906). The end effector robot places the one carrier with product in the second storage bay (step 1907). The end effector robot empty slip is repositioned by the gantry robot by the most rapidly accessed storage bay with empty carrier and picks up the empty carrier (step 1908). The end effector robot second slip is repositioned by the gantry robot by the most rapidly accessed storage bay with empty carrier and picks up the empty carrier (step 1909). The gantry robot starts to lift the end effector robot back to the upper floors of the unit and the end effector robot with two empty carriers is repositioned and aligned by the gantry robot in front of the two empty slips in the loading tray and the carriers are placed into the tray slots without carriers (step 1910). The double internal doors to the second compartment close as the end effector robot clears the doors (step 1911).

Figure 20:
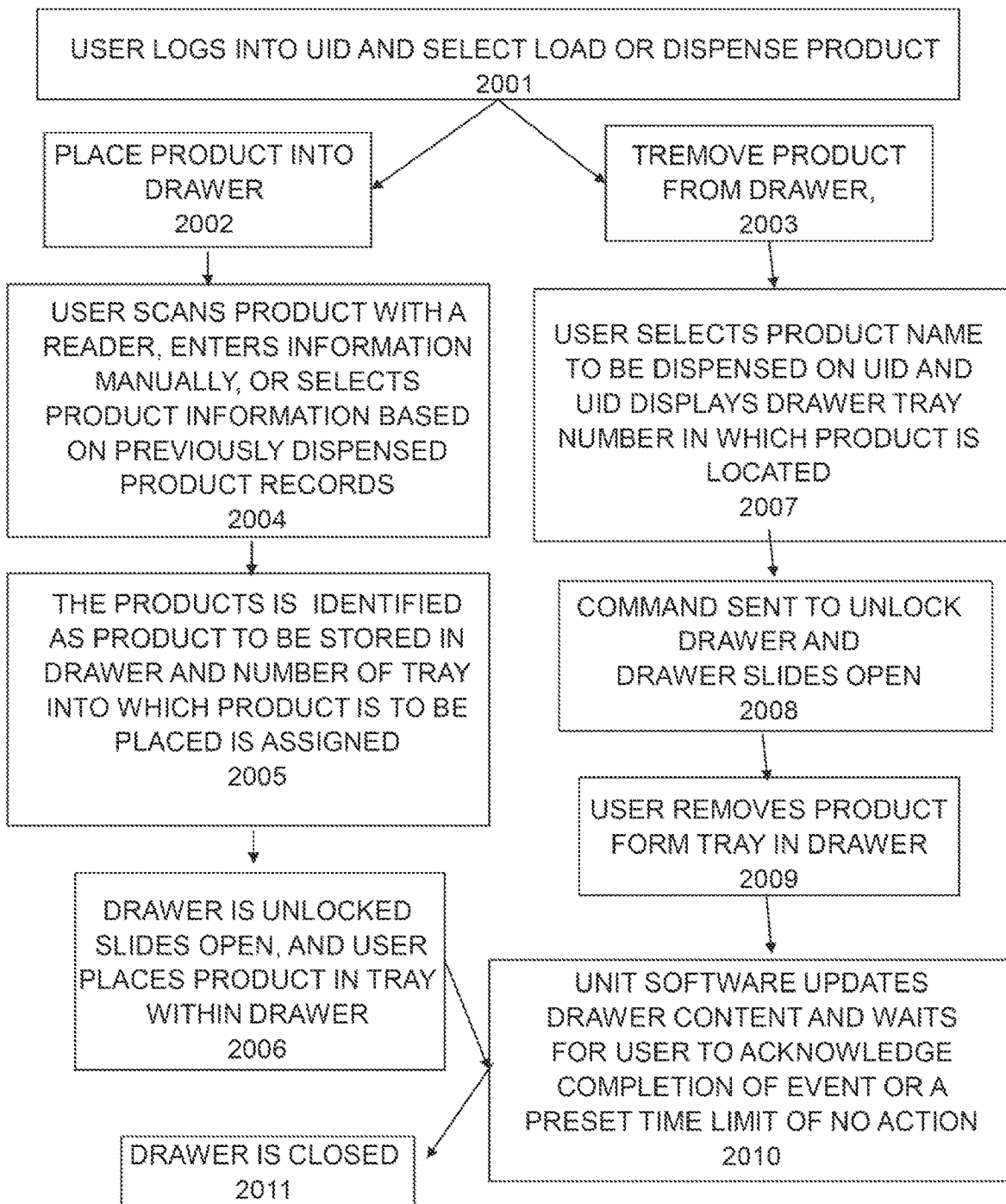
FIG. 20 contains a flow diagram for load or dispense of product from/to the drawer.

FIG. 20 is a flow diagram for the placement and removal of product from the drawer. A user logs into the UID and select load or dispense product into/form drawer option (step 2001). To place product into the drawer, steps 2004-2006 load product into the drawer, the are followed by step 2010 (step 2002). To remove product from the drawer, steps 2007-2011 are followed (step 2003). To user scans the product with a reader, enters information manually, or selects the product information based on previously dispensed product records (step 2004). The UID identifies the product as a product to be stored in the drawer and displays the number of the tray in the drawer into which the product is to be placed (step 2005). The drawer is unlocked, slides open, and the user places product in tray within the drawer (step 2006). The unit software updates the UID to reflect the drawer content and waits for user acknowledgement of completion of the load event or a preset time limit of no action to proceed to the next step (step 2010). The drawer is closed (step 2011). To dispense product from the drawer, the user selects the product name to be dispensed on the UID and the UID displays the drawer tray number in which the product is located (step 2007). The UID initiates the command to unlock the drawer and the drawer slides open (step 2008). The user removes product form tray in drawer (step 2009). The unit software updates the UID to reflect the drawer content and waits for user acknowledgement of completion of event or a preset time limit of no action to proceed to the next step (step 2010). The user is instructed to close drawer and user closes drawer (step 2011).

Figure 21:
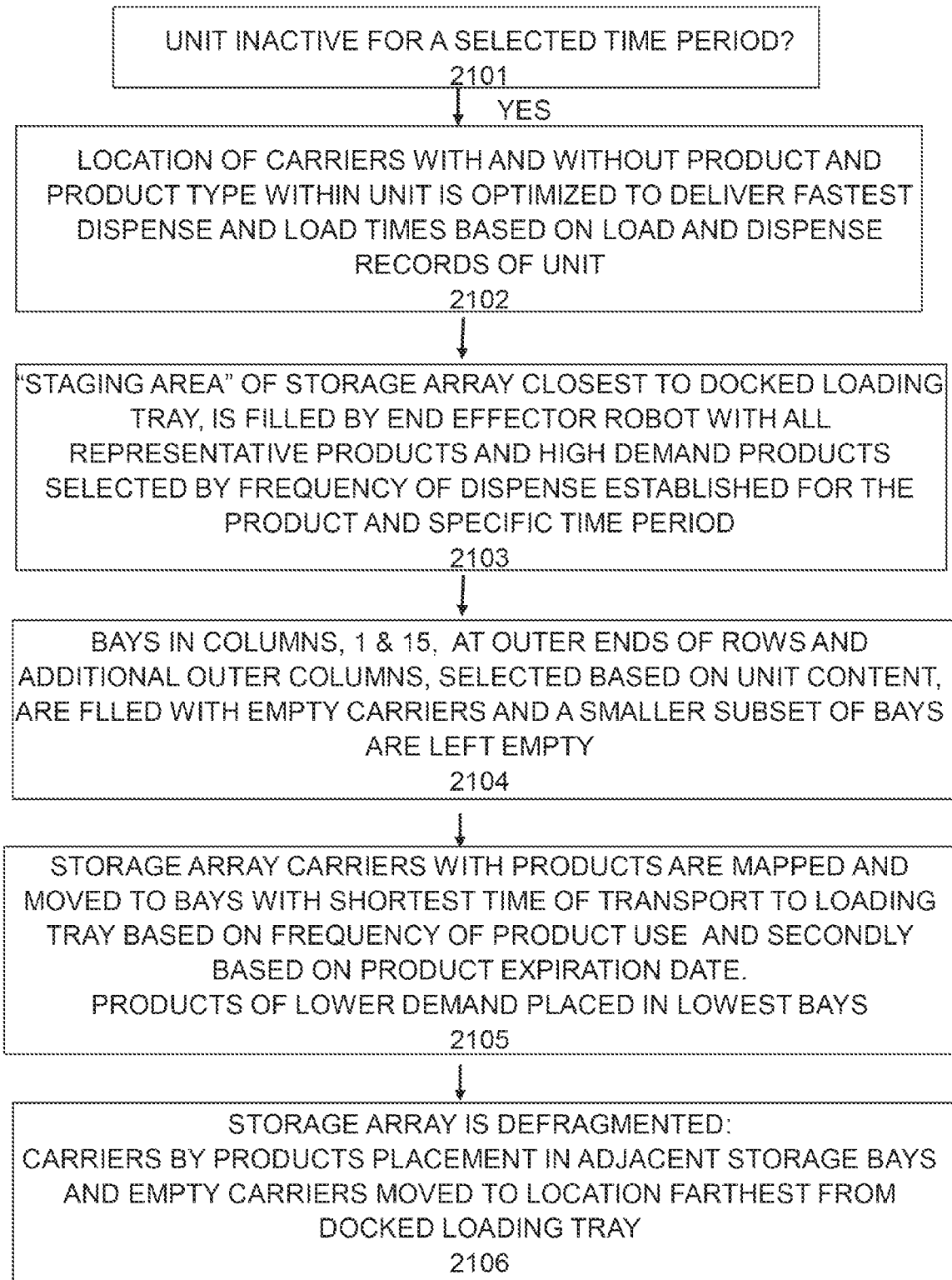
FIG. 21 contains a flow diagram for the defragmenting of the storage array.

The optimization of the load and dispense protocol with respect to time requires a periodic defragmenting of the storage bays with and without product and/or carrier as described in the flow diagram of FIG. 21. At a time of unit inactivity (step 2101), based on load and dispense records for the unit, the location of carriers with or without product and product type within the unit is optimized to deliver the fastest dispense and load times (step 2102). A section of the storage array closest to the docked loading tray, "staging area", is filled with high demand products selected by frequency of dispense established for the specific time period (step 2103). The columns at the far ends of the rows, columns 1 and 15 or additional outer columns depending on unit content, preferably are designated for carriers without product or some left as empty bays ready to receive carriers with product (step 2104). The storage array products in carriers are mapped to storage bays with shortest distance to docked loading tray (shortest time of transport) based on the frequency of product use (selected for the specific time of the year and based on dispense records for that unit) and secondly based on the product expiration date closest to current date. Products of lower demand are selected and placed in the lowest storage bays (step 2105). The end effector robot picks up and moves carriers with products to prioritized locations placing carriers with product in adjacent storage bays eliminating carriers without product between carriers with products and moving empty carriers to location farthest from the docked loading tray and preferably to locations as defined in step 2103 (step 2106).

In many of the above methods of movement of products within the automated storage unit the loading tray docked inside the unit is filled with empty camera ready to receive products. In yet another embodiment the loading tray remains simply without carriers, at times of inactively so that it will be ready to run the applicable protocol to retrieve and dispense products.

The smaller unit described above, may further be implemented by dedicating the unit to only one temperature zone, for example above 0° C. storage or below 0° C. storage, to meet the needs of a point of care facility. In yet another embodiment the unit may be smaller, designed to maintain a lower product inventory. Larger units in yet another implementation of the invention may be a preferred size for point of care facilities including for example a hospital, a clinic, a pharmacy or a research facility. The larger unit may also be dedicated to only one temperature zone, for example above 0° C. storage or below 0° C. storage, or a combination of multiple temperature zones.

The temperature within the unit is monitored continuously by the temperature sensors with reporting of the temperature, to the UID, ASP, and various recipients, optimizable to a customizable frequency that meets regulatory requirements and may vary throughout the day based on how frequently the unit is accessed. For example the temperature may be reported at least once every 5 or 10 minutes during regular office hours and at least every 30 minutes outside of regular business hours. The sensors are operational at all times, even at times of power failure, as the sensors are connected to a back-up power source, a battery, or optionally, if the sensors are wireless sensors, are powered by a battery.

The temperature within each temperature zone is pre-set to a temperature within the recommended storage temperature range for the products stored within and is maintained within several degrees of that point. In the event of a power failure the temperature sensors have a back-up power source, a battery, and will continue to record and store temperature data. Temperatures of the cold storage and or freezer are displayed on the UID on the external portion of the cold storage unit. The temperatures may also be displayed using a secondary device, for example a digital or LED display, embedded or mounted on the external portion of the unit. In the event of a power outage a backup battery source is available and may be used to maintain the unit for approximately 12 hours. In the event of temperature deviations outside of the recommended range a manual override may be used to unload product from the unit.

The unit is fully compliant with the World Health Organization (WHO) qualification requirements for cold storage of Time and Temperature Sensitive Pharmaceutical Products (TTSPP) (see, "WHO Expert Committee on Specifications for Pharmaceutical Preparations", WHO technical Report Series 961, 2011 available at www.who.int/) and Centers for Disease Control and Prevention (CDC) "Guidelines for Maintaining and Managing the Vaccine Cold Chain" (www.cdc.gov/mmwr/preview/mmwrhtml/mm5242a6.htm). The unit is designed for storage of TTSPP, is capable of maintaining the temperature range over the full range of annual ambient temperatures at a point of care facility, is equipped with alarms to indicate temperature excursions and/or refrigeration failure and is fitted with lockable doors and an access control system. The exterior of the unit and the and interior unit elements that come into contact with product are made of materials that are cleanable with sterilization solutions. The unit has a consistent temperature profile throughout the storage compartments when empty and in a normal filled capacity and is equipped with calibrated temperature sensors, accurate to ±0.5° C., capable of continuous recording. The sensors are located at points within the unit that most accurately represents the temperature profile of the TTSPP. The WHO and CDC specifications for a cold storage unit address the physical requirements, noted above, as well as protocols and methods that validate the potency of the administered TTSPP. The WHO CDC protocol specifications include keeping records of the temperature profile of each TTSPP stored, providing alerts when deviations occur and scheduling and completing regular maintenance of the unit. The smart cold storage system provided software follows, performs and/or schedules the specified protocols.

User Interface Device (UID)

A UID 102, preferably a computer with a touchpad incorporated into the display, is docked in a docking station embedded or connected to the front of the cold storage unit. See FIG. 1A. Communications between the UID and cold storage unit components is maintained preferably via a hard wire connection. The unit components include an Industrial PC, the gantry robots and motor driver boards, sensors, refrigeration components, and reader(s), The UID is the primary security interface providing a secure access to the unit and may use login code verification and/or a biometric image capture such as finger print identification, a retinal scan, a facial recognition, or a voice identification. A log in code may be a simple alphanumeric password that the user is either given or is provided an opportunity to enter a password that will be stored in the authentication server, located in the ASP database in conjunction with the user account name. The user may also be prompted to enter a security question in the event the user forgets the password and needs to be issued a new password. The security feature may be optionally disabled.

The UID communicates with a cloud-based ASP via an internet connection through a local internet router, a wired or wireless network adapter card, or via a cellular network using a cell modem, embedded in the unit. When the cell modem is activated it updates information to the ASP at customizable number of minute intervals that may vary for periods during business hours, a period of frequent use of the unit, and periods outside of business hours when the unit remains closed.

A docking station connected to or embedded on the external portion of the unit provides a port for the UID and in one exemplary embodiment functions as a link to the units components, wired internet connection, and a power source for the UID. Some of the components such as temperature sensors and readers may communicate with or deliver data to the UID wirelessly. An RFID reader, a biometric sensor, a barcode or magnetic strip reader are other exemplary devices that can communicate with the UID wirelessly or be integrated with the UID via the docking station.

The UID uses a touch screen to display, enter and access information on the unit and its content and to provide the unit user with access to the unit content. An exemplary UID display upon login in includes: current temperatures, current product content with name and quantity of pharmaceuticals, nearest expiration date, alerts, and order status. By selecting the name of a specific pharmaceutical product on the UID screen further information about the pharmaceutical product is displayed including location by temperature zone, temperature history, lot numbers with associated expiration dates of current inventory; and links to manufacturer and/or Centers for Disease Control and Prevention (CDC) information on the pharmaceutical. FIG. 12 provides an exemplary resting state view, prior to login in, of a User Interface Device (UID) 1200 with the login icon and temperature of compartments displayed.

Reader

A reader in one embodiment is a device used to identify and/or count products present in the unit or being added to or removed from the unit. The reader device is embedded in, attached to, and/or unattached, to the unit and is in communication with the UID via a wired or wireless connection. Suitable reader devices are known to those skilled in the art and may be selected from various technologies including a camera, a radio frequency identification (RFID), barcode scanner, and or magnetic strip reader. Preferably a barcode reader is selected as most products, including pharmaceutical products, packaged individually or in groups by lot number, are labeled with a barcode by the manufacturer.

An exemplary reader is a camera that captures the image of a product, including a barcode label, and via the Internet, wired or wireless, sends the image to the UID for analysis. The UID provided software analyzes the image obtaining product descriptor information that includes product name, dosage, lot number, and expiration date. The camera may be located on the UID and/or within or above the cold storage compartment. A camera reader is a technology readily available, simple to use, and only requires a printed image label and does not require special labeling of the product as would be required for example of an RFID reader.

In yet another embodiment of the invention a barcode reader is used to identify a product. The barcode reader in this case contains decoder circuitry analyzing the barcode's image sending the information directly to the UID wherein the UID stores and also send the product information to the ASP to be added to a product database. The on-site user may scan the product being added to the unit with a handheld or an embedded reader wherein the information is transmitting to the UID via a wireless or a wired connection.

The smart cold storage unit may also be implemented with RFID technology by placement of an RFID reader, a two way radio transmitter-receiver wired to a transmitter, in communications with the UID which transfers the signal to the ASP provided RFID software to generate a product descriptor. The product in this case must be labeled with an RFID tag.

A reader in yet another embodiment is a biometric or magnetic strip device used as a security measure to identify an authorized user of the unit.

In embodiments using biometric authentication, some biometric information, such as a fingerprint image, is obtained and stored in the authentication server for use as the authentication credential. Such biometric information may be, but are not limited to, finger print images, spoken phrases for use in voice recognition, and facial images for use in facial recognition. In embodiments using finger print biometric information, users will have a fingerprint scanned to generate a fingerprint template that is stored in the authentication server. For other forms of biometric authentication, users may record a voice sample or have their retina scanned, with the resulting recording (or voice print) or image stored in the authentication server. For embodiments using facial recognition as a form of authentication, a camera may be employed to take detailed photographs of a user's face.

Application Service Provider (ASP)

The ASP, a cloud-based hosted environment, provides server space to store and securely access data and information related to the unit, and software required to analyze and manage the data, information, and inventory.

The cold storage unit data captured by the ASP inventory management software includes product dispense and refill transactions, product reader scans, temperature sensor data, manually entered information via the UID, camera images, and bioscans. The ASP software analyses and stores the data. The ASP software captures product descriptor records for each product which includes product name, dosage, lot number, expiration date, quantity of the product in the unit, recommended temperature for storage, unit/compartment location including historical records of product location, and provides additional information regarding the product including special handling requirements and links to manufacturer and/or CDC information. The ASP provided software may supplement UID software in the analysis of reader scans. The ASP further generates records related to dispense rate of product, spoilage frequency, historical temperature records, and product order frequency including average number of days required to receive new product.

An ASP inventory management function includes the tracking of add/dispense transactions of product to and from the unit. An exemplary protocol for addition of product to the unit using a reader or entering product information manually is described above for FIG. 15B. The ASP provides access to product descriptors that includes product name, dosage, lot number, expiration date, recommended temperature of storage, any special handling requirements such as for example light sensitivity and further provide access to manufacturer and other information, such as recalls of ineffective product, about the product.

Dispensing of product in one embodiment may be captured by the unit when the on-site user selects the product to dispense on the unit content listing, displayed on the UID, and further selects the reason for dispensing, including, for example: dispense to patient; expired; spoiled in unit; transferre from unit; and discontinued. Optionally the user may also select, or enter manually, the name of the patient and/or doctor. The "dispense to patient" reason may be changed to post dispense spoilage if product is deemed to have spoiled prior to being administered to a patient.

An ASP may also facilitate linking the dispensing of product from the unit to patient data. A patient name may be selected on the UID and the ASP will send to the UID information as to which products are to be administered or provided to the patient. The ASP provided patient information may also generate the billing statement associated with the dispensing of product to the patient. s updated (step 1530).

Alerts

Alerting activities will emanate from the ASP hosted system and alerts will be delivered to pre-determined locations including the physical unit and/or specified phones, computers and email addresses. Alerts are generated by events associated with the physical unit including: temperature deviations from allowed temperature range, loss of power to the physical unit in the event of a power outage, lock malfunction, robotics or mechanical failure, and cooling system failure. Alerts are further generated by the inventory management software based on inventory deviations, including expiration of product, about to expire product, and low or depleted stock warnings. A customizable alert sent to the UID may include a visual and/or audio signal, unique to the type of an alert, and all information on the nature of the alert may be emailed or telephoned to a customized list of user contacts.

Figure 22:
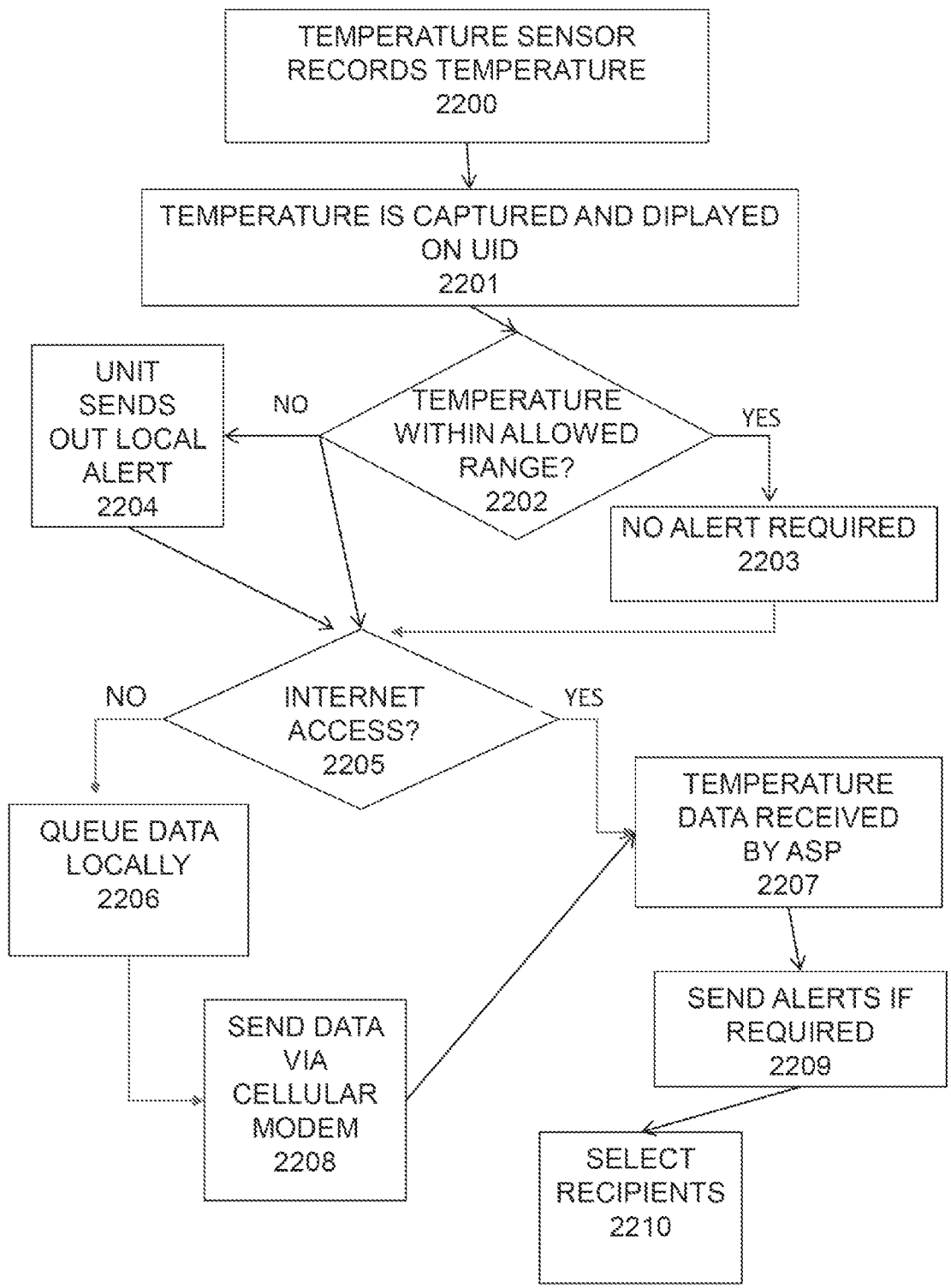
FIG. 22 is a flow diagram illustrating steps performed by the system in generating temperature deviation alert.

The ASP unit management software records and keeps historical data on the temperature associated with each compartment and the product contained within the compartment. FIG. 22 shows an exemplary flow diagram illustrating the steps taken to monitor temperature and send out alerts. The temperature is, recorded by the temperature sensors associated with each compartment and/or temperature zone (step 2200) and is sent to and displayed on the UID (step 2205). Upon confirming if internet access is available (step 2210), the UID transmits the temperature data, via the internet (step 2220) or a cell phone card (step 2223) if internet access is not available, to the ASP unit management software, and the temperature data is compared to the allowed storage temperature limits for that product (step 2225). If the temperature falls within these limits no action is taken (step 2230). If the temperature falls outside these limits an alert is generated (step 2235) and delivered to the UID and selected recipients emails and/or phone numbers (step 2240). The alert, which may include a visual and/or audio signal, received by the UID will display a temperature deviation warning with name and location of product and instruct the user to confirm the temperature deviation by comparing to temperature readout at the unit, and take action to transfer product to an alternate storage device if necessary. The alert is emailed or telephoned to the customized list of user contacts and includes all information on the nature of the deviation and instruct the recipient to follow user established protocol and take action to confirm product is properly stored.

The ASP database stores expiration date for each product within a unit and generates an alert when a product is within a select number of days from the expiration date or has expired. When a product expires it is critical to remove the product from the unit, not only to comply with TTSPP storage regulation, but to avoid the ultimate error of administering an ineffective product to a patient and endangering the patient's well being.

Figure 23:
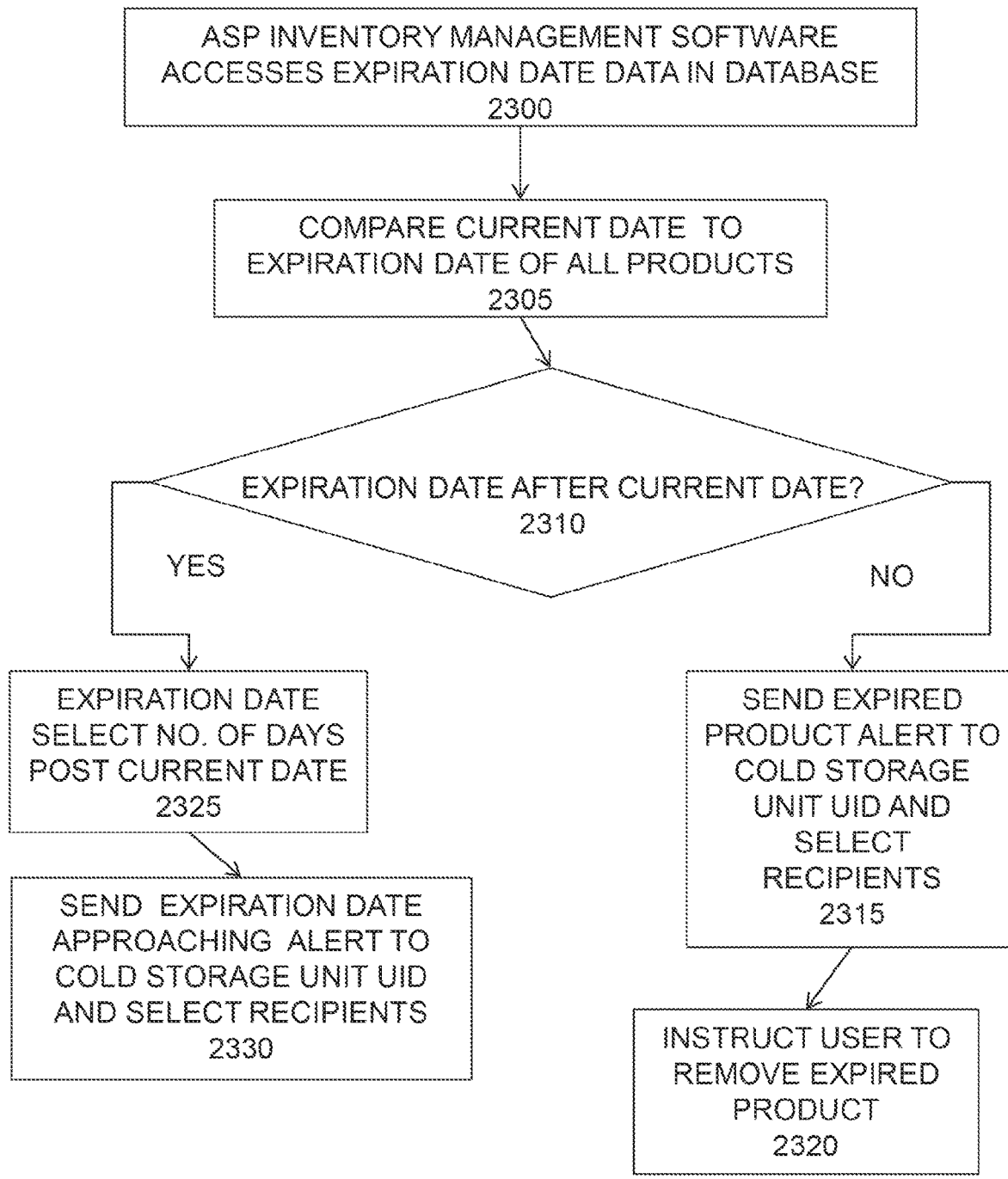
FIG. 23 is a flow diagram illustrating steps performed by the system in generating expiration of product alert.

FIG. 23 shows an exemplary flow diagram illustrating the steps taken to monitor the expiration dates of products and send out alerts. The ASP inventory management software accesses expiration date data in database (step 2300), comparing current date to expiration date (steps 2305 and 2310). If the expiration date is not after the current date, the product is expired and an expired product alert is sent to the UID and select recipients (step 2315), with optional audio and or visual alerts, instructing user to remove and dispose of expired product, providing product name, expiration date, lot number and unit/compartment location (step 2320). If a product expiration date is a select number of days post current date (step 2325) a different alert is sent to the UID and select users (step 2330), alerting the recipients that product is about to expire and to verify stock status and consider ordering more product. The select number of days post current date is customizable by the unit user and is based on the dispense rate of the product.

Figure 24:
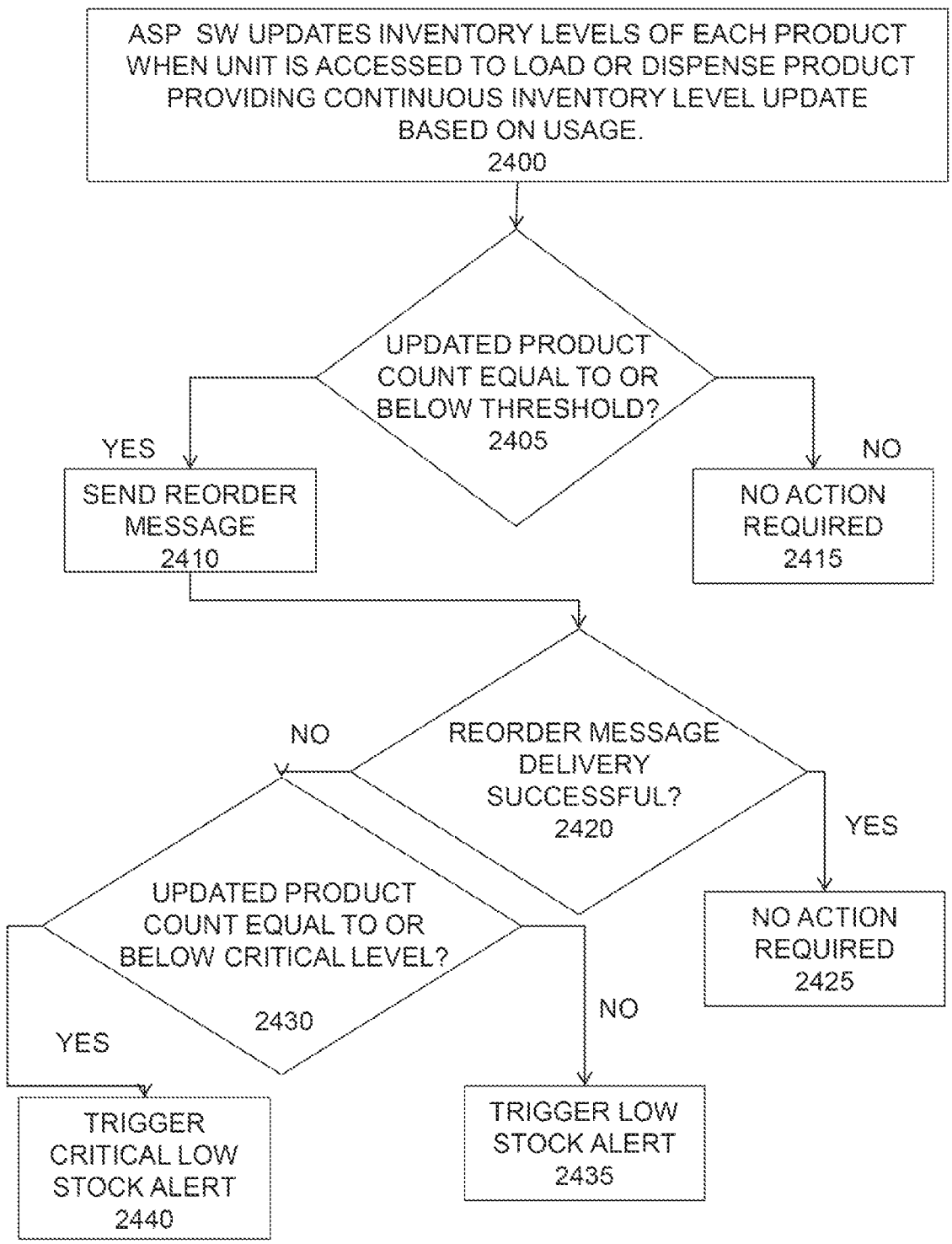
FIG. 24 is a flow diagram illustrating steps performed by the system in generating low stock of product alert.

The ASP inventory management software further sends out low stock alerts and reorder recommendations based on the captured data related to current inventory status of each unit, expiration dates of the products, and pre-determined re-order levels. FIG. 24 shown an exemplary flow diagram illustrating the steps taken to monitor product stock in the unit and send out alerts. The ASP inventory management software updates the inventory levels of each compartment every time a compartment is accessed and the unit is reclosed (step 2400). Inventory is decremented as product is dispensed and upon reaching or falling below a predetermined re-order level (step 2405), an order for additional product will be processed. If product count is greater than the re-order level count (step 2405) no action is required (step 2415). Should inventory levels fall to or below the predetermined re-order level a reorder message is sent (step 2410) to place or confirm if an order has been placed (step 2420). If the re-order message is not successful, an order was not placed, the system will determine if the product count is below a critical level (step 2430) and will generate a low stock alert if it is not below the critical level (step 2435) or a critical low stock alert (step 2440) if it is below the critical level. No action is required (step 2425) if an order is in place. A critical low may occur for a variety of reasons including: expected shipment has been delayed, sudden surge in usage in a single day that reduces inventory past the reorder point, and failure to process a re-order. The quantity of product that is re-ordered is calculated based on the difference between current inventory and the predetermined par level of inventory. The ASP inventory management software can be configured to reorder stock automatically.

Inventory Management

All inventory management functions are managed centrally by the ASP in a cloud based hosted environment. Communication with individual units occurs via the Internet and all authorized users have secure access to their designated units via the ASP website.

The ASP inventory management software captures transactions related to inventory of the cold storage unit and include stock and dispense transactions with reason for dispending of product. The dispense transactions may include for example: dispensed to patient, expired, spoiled in unit due to unit temperature deviations outside of recommended range, transferred from unit, and discontinued. Post a transaction the "dispensed to patient" transaction may be changed by the user to "post dispense spoilage" if product was not administered to patient and product has been deemed to have spoiled. The data is further used to establish historical records of product demand, to ascertain adequate stock is available as needed, avoid loss of product due to expiration/spoilage, and to optimize the frequency and timing for ordering product and the quantity of product to be ordered.

Figure 25:
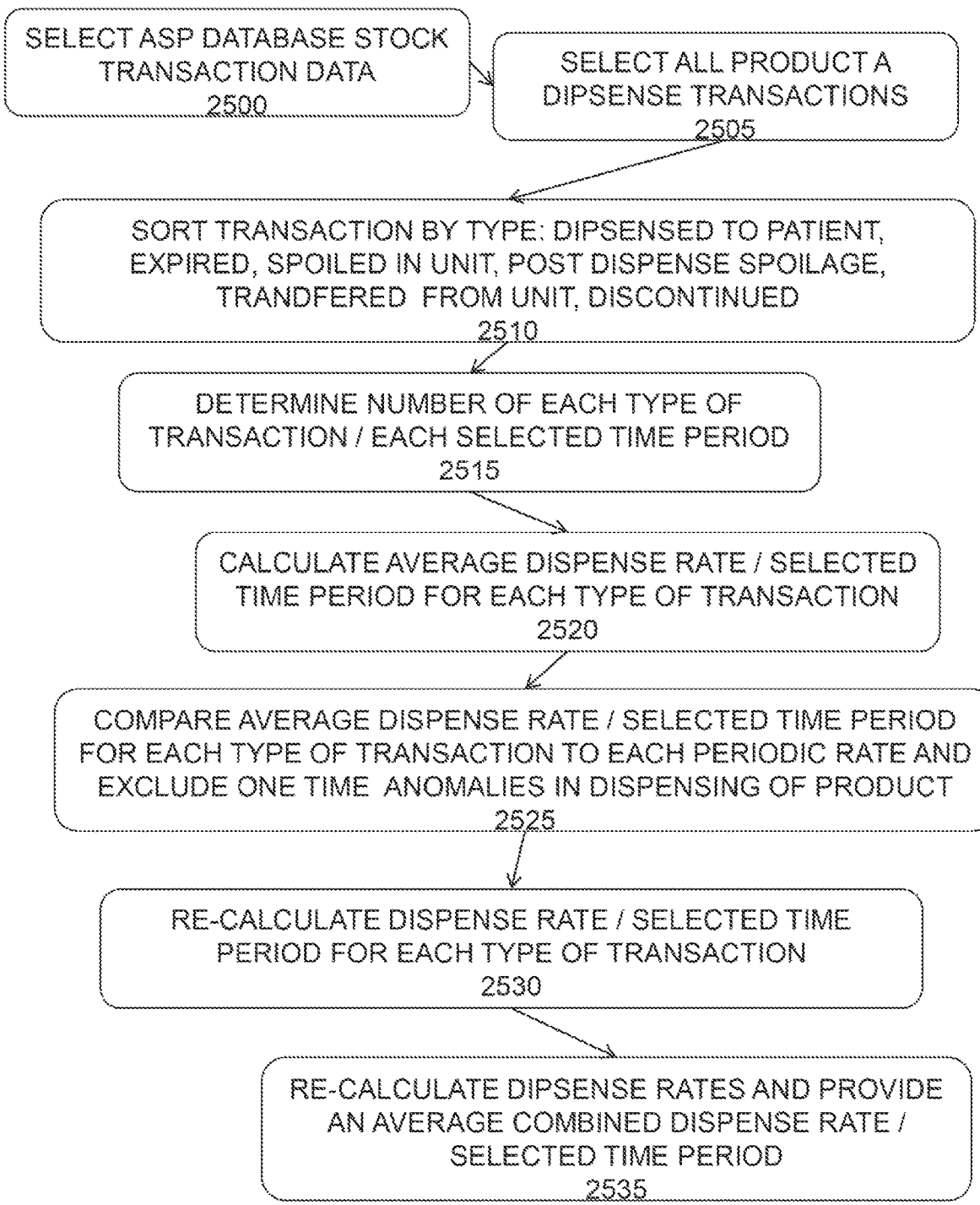
FIG. 25 is a flow diagram illustrating steps performed by the system in determining a product dispense rate.

A product dispense rate is determined by the ASP provided inventory management software to establish historical trends in use of product. Shown in FIG. 25 is an exemplary flow diagram for the process of determining dispense rates of product A. The ASP-stored transaction data (step 2500) is first selected for dispensing transaction data (step 2505) which is then sorted by type (step 2510). The dispense rate for each type of dispensing transaction per calendar week (step 2515) and the average weekly rate for each type of dispensing transaction (step 2520) are determined. A comparison is made between the average dispense rate/week for each type of transaction to each weekly rate and one time anomalies in dispensing of product are excluded (step 2525). A corrected average dispense rate/week for each type of transaction is determined (step 2530) and a combined average of dispense rate/week for all transactions is established (step 2535). The exemplary dispense rates above are determined as a weekly rate. Further implementations of the dispense rate may be based on rates calculated for various time segments including a single day, several days, a month or year.

To ensure that a unit does not run out of stock and the optimal quantity of stock is ordered, par levels, re-order levels and critical lows of stock are determined and low stock alert are generated. The determination of the physical maximum inventory level, par level, re-order level, and critical low inventory level may be made by an authorized administrator of the unit. Typically, these inventory points will be determined by an individual with access to information and reports on transaction statistics for the unit. As historical trends of product use are established for a specific unit the determination of the par levels may be adjusted to reflect the historical use of the product within a given time period and may also be adjusted for seasonal variations. The unit user may choose to adjust the rates based on their review of the historical transaction data or may request that the ASP provide estimated values as a service.

The quantity of product to be ordered is based on the predetermined par level which is a function of the number of products that can physically fit within the allotted compartments (physical maximum) in the unit, the shelf life of the product, a desired re-order frequency and the dispense rate of the product. For example a product with a shelf life of 90 days (i.e. expiration date is 90 days from the date of manufacture) and a dispense rate of 5 products per 10 days would allow the storage of a maximum of 45 products without having some of the product expire prior to use. Although the unit can physically accommodate 45 product units, the par level may be set significantly lower than 45 in order to have a desired shipment of product every two weeks. In this example, the par level may be set at 15, allowing room for variations in dispenses rate and product delivery. If the unit compartment can only accommodate 10 product units, the maximum par level in this exemplary case is set at 10.

The re-order level is used to trigger a product order. If the order is not placed for whatever reason, there is a chance that the product could completely stock out and reach an inventory count of zero generating a stock-out alert. For example if it takes two days to order and receive product and the current dispense rate for product is 5 per day, a re-order level of 10 would be the lowest product count to trigger re-order. If an order has not been placed and inventory is at or below the set re-order level of 10, a low stock alert will be issued. Further, if the inventory level has reached a predetermined critical low level, a low stock alert would be issued. In keeping with the example, if the critical low level is determined to be 4 (less than a day's supply of product) and that inventory level is reached prior to the new shipment arriving, a low stock alert is issued. Preferably the re-order level will be set at a higher count, for example, 20 in this exemplary case, to adjust for delays in placement of order and dispense rate variations.

The authorized user of a unit has access to reports (preferably HIPPA compliant), provided by the ASP inventory management software, that ascertain compliance with regulatory requirements, and allow the user to review and optimize protocols of handling and ordering of product. The reports may include: current inventory of product with expiration dates; quantity of product dispensed, by type of dispensing and/or total dispensed, for a selected time period such as day, week month year; dispense rate and type by date, percentages of product administered and percent product lost due to expiration, spoilage in unit, spoilage outside of unit; alert reports detailing any inventory and/or temperature alerts that have been generated over a given period of time.

An authorized user further has access to reports on regional inventory data available through the ASP database wherein the report may include: type and quantity of product administered by location such as a local region defined by community or city, a state, and/or country within a selected time period; and dispense rate and type by date, percentages of product administered and percent product lost due to expiration, spoilage in unit, spoilage outside of unit. Fluctuating supply demands for time and temperature sensitive pharmaceuticals (TTSPS) give rise to a need for timely communication between the unit user, a point of care provider, manufacturers, distributors, sales representatives and others managing the flow of the TTSPS. The ASP inventory management software provides such a communications network, via a web interface, delivering user profile customized access to reports related to TTSPS inventory transactions. A manufacture of product "A", for example, can have access to product "A" reports. Reports may include: quantity of product administered in by date and/or by location such as a local region defined by community or city, a state, and/or country within a selected time period; percentages of product administered and percent product lost due to expiration, spoilage in unit, spoilage outside of unit for a selected location; number of units within select location or region distributing product "A"; and low stock of product "A" alerts per unit and/or region.

A distributor and/or product representative can have access to reports on products that they distribute and/or represent. Reports may include: quantity of product dispensed to patient by date and/or by location such as a local region defined by community or city, a state, and/or country within a selected time period; percentages of product dispensed to patient and percent product lost due to spoilage or expiration.

Figure 26A:
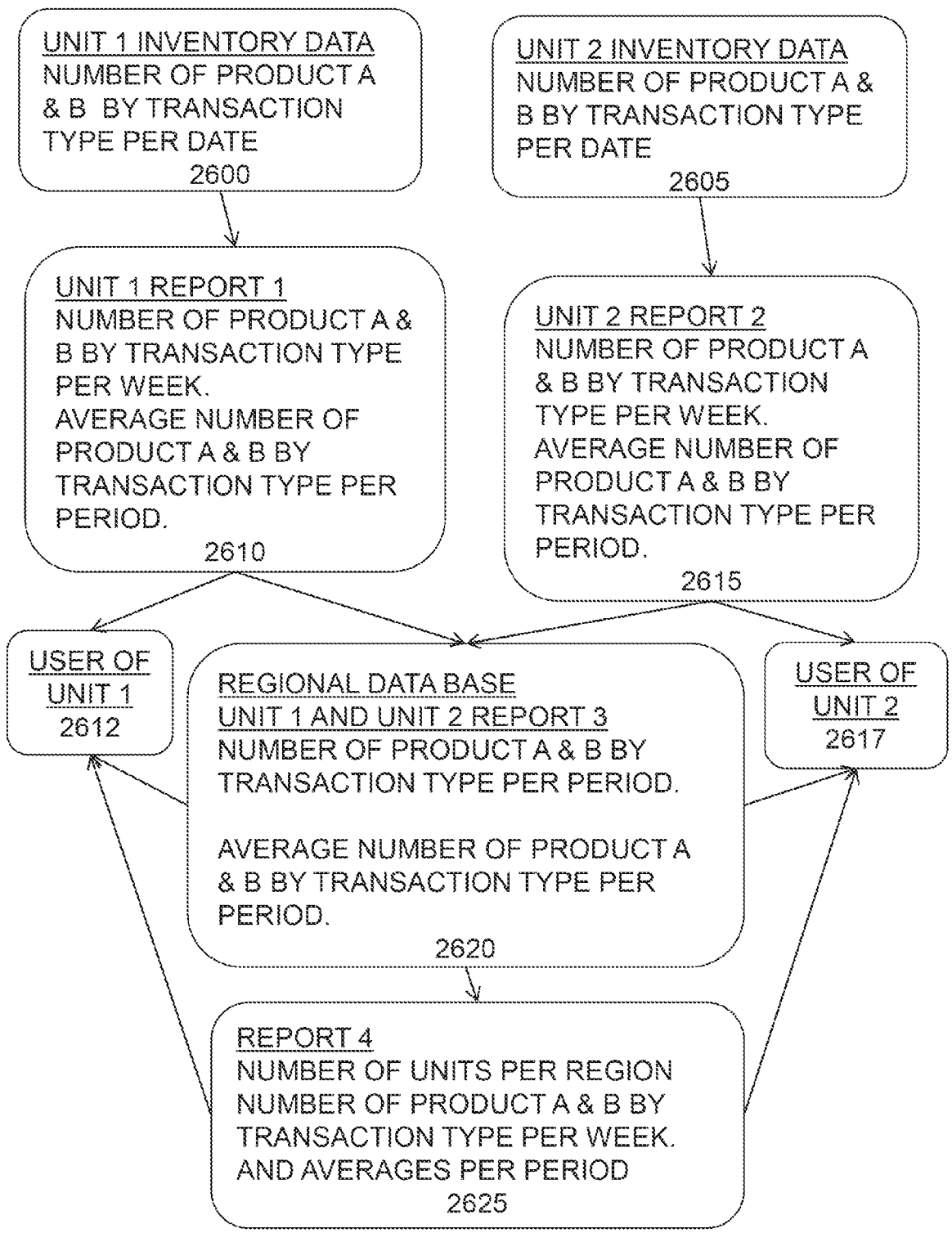
FIGS. 26A-26B is a flow diagram illustrating access to inventory reports based on user profile.
Figure 26B:
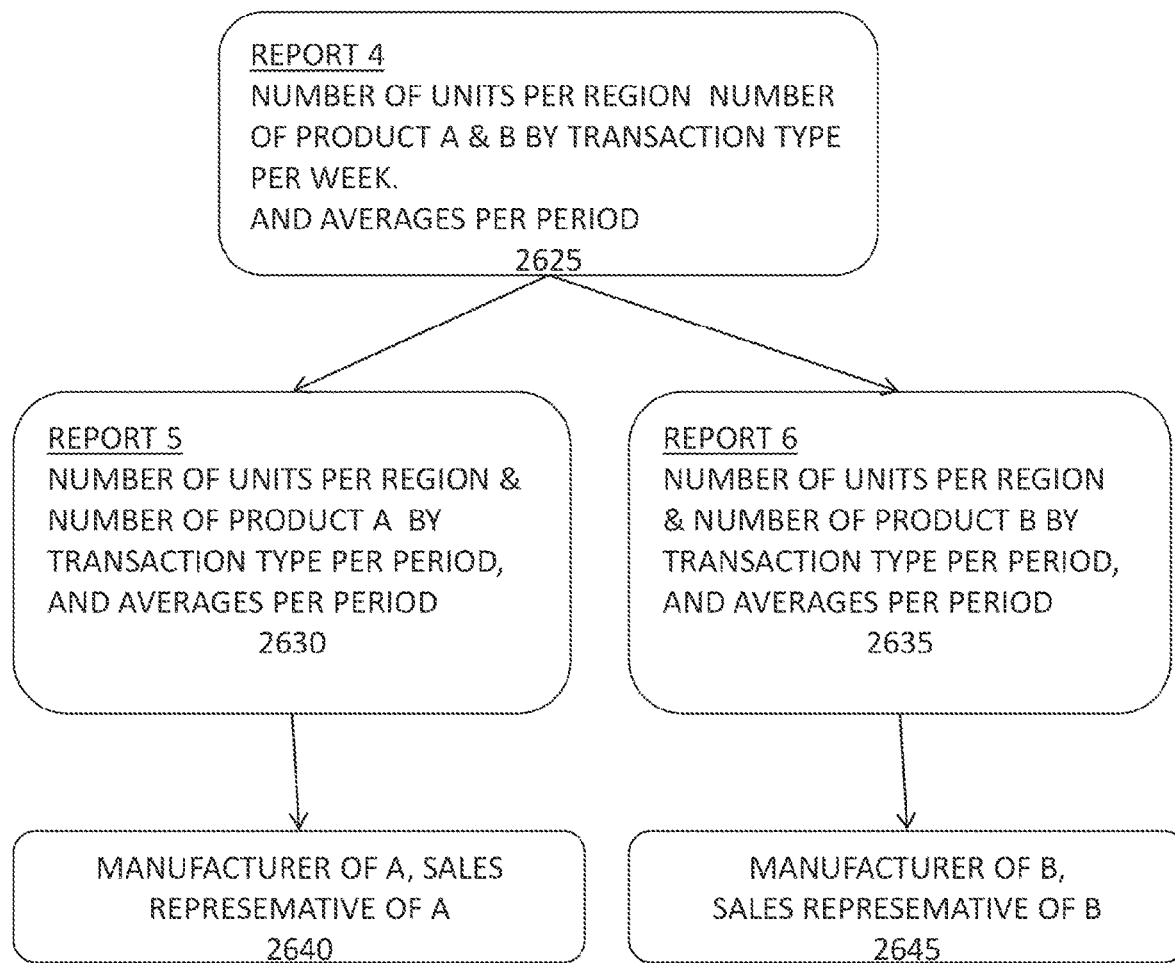

FIG. 26A and FIG. 26B illustrate by way of an example the generation of, and user access to, reports on products A and B based on a time period of one week. Unit 1 and Unit 2 transaction data (steps 2600 and 2605) is used to generate a report for each unit, Unit 1 Report 1 (2610) and Unit 2 Report 2 (2615) accessible to the unit's users, (2612) and (2617), and includes the number of products stocked or dispensed per week by transaction type. The reports and data are merged in a regional database (2620) and provide unit user, (2612) and (2617), with regional data report, Report 4 (2625). The regional data is broken down by product type, Report 5 for exemplary product A, (2630), and Report 6 for exemplary product B 6, (2635), for reporting to for example manufactures and sales representatives., of product A (2640), and of product B (2645).

Figure 27:
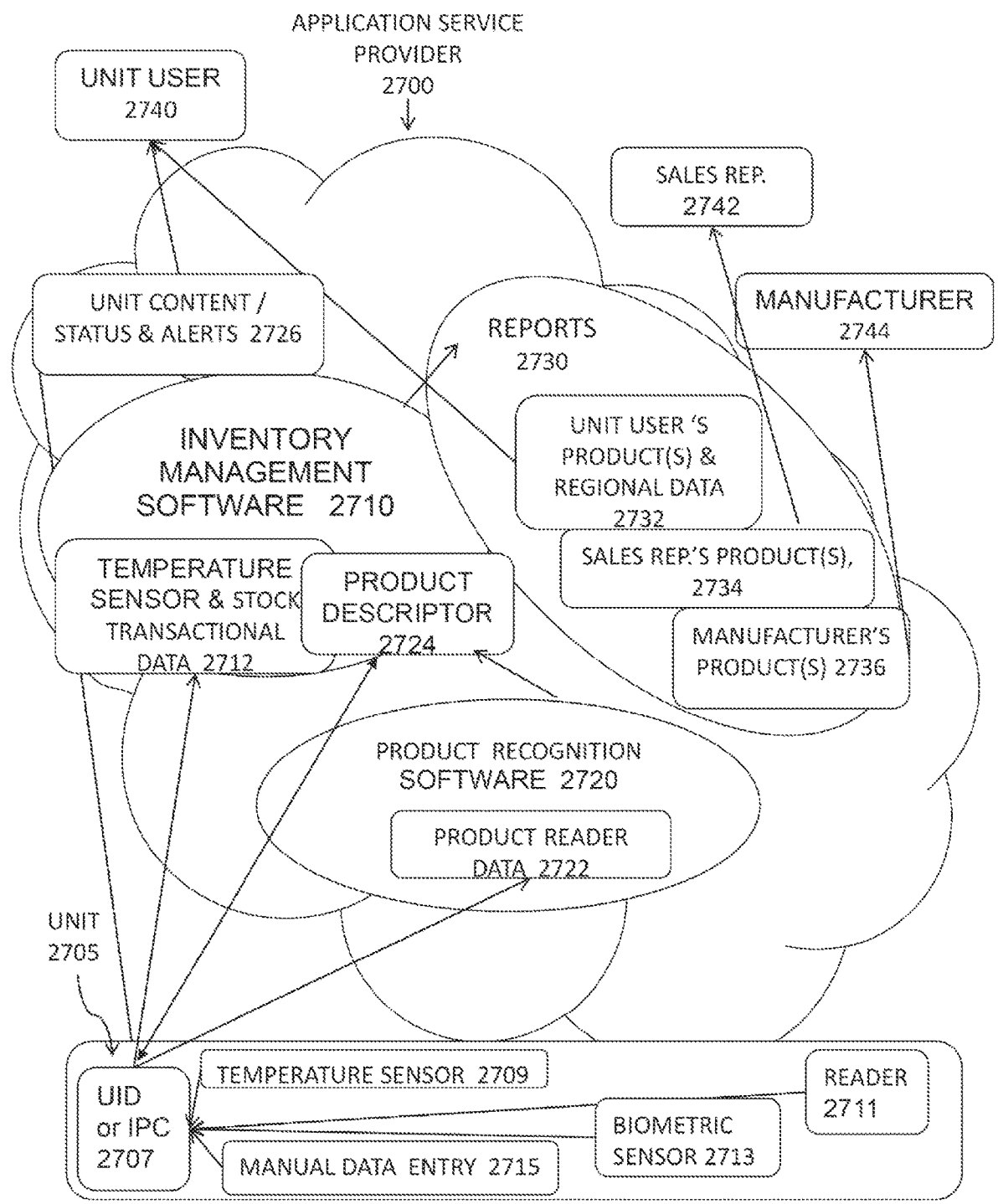
FIG. 27 is a block diagram illustrating the various functions provided by the Application Service Provider.

FIG. 27 illustrates by way of example some of the functions provided by the ASP. The ASP (2700) utilizes the Inventory Management Software (2710) and Product Recognition Software (2720) to capture and analyze data received from the Unit (2705) to generate Reports (2730) made available by report type (2732, 2734, and 2746) to the Unit User (2740), Sales Representative (2742), and Manufacturer (2744). The Unit (2705) UID (2707) captures data from a Temperature Sensor (2709), Readers 1 and 2 (2711), Biometric Sensor (2713) and manually entered data (2715). The Product Recognition Software (2720) captures and analyze the Product Reader Data (2722) and generates a Product Identifier or descriptor (2724) that is used in combination with the Temperature Sensor & Stock/Dispense Data (2712) by the Inventory Management Software (2710) to generate Unit Content/Status and Alerts (2726) also displayed on the UID (2707).

In further embodiments of the ASP provided inventory management software an automatic customizable product order/reorder protocol may be implemented in response to low stock alerts. Re-order messages will be directed to one or more parties depending on customized preferences. These messages for example could flow to a manufacturer, a distributor, a physician's re-ordering system or some combination of two or more. Re-order messages are available in a variety of message formats including, but not limited to, EDI and HL7.

The ASP hosted system will provide an interface to other computer systems that require information directly. A doctor's office may desire an interface to provide dispense data to confirm the product dispensed and/or re-ordering information to process through an existing re-order process. Interface messages are available in a variety of message formats including (but not limited to) EDI and HL7.

Since modifications will be apparent to those of skill in this art, it is intended that this invention be limited only by the scope of the appended claims.

All of the articles and methods disclosed and claimed herein can be made and executed without undue experimentation in light of the present disclosure. While the articles and methods of this invention have been described in terms of preferred embodiments, it will be apparent to those of skill in the art that variations may be applied to the articles and methods without departing from the spirit and scope of the invention. All such variations and equivalents apparent to those skilled in the art, whether now existing or later developed, are deemed to be within the spirit and scope of the invention as defined by the appended claims. It will also be appreciated that computer-based embodiments the instant invention can be implemented using any suitable hardware and software.

All patents, patent applications, and publications mentioned in the specification are indicative of the levels of those of ordinary skill in the art to which the invention pertains. All patents, patent applications, and publications are herein incorporated by reference in their entirety for all purposes and to the same extent as if each individual publication was specifically and individually indicated to be incorporated by reference in its entirety for any and all purposes.

The invention illustratively described herein suitably may be practiced in the absence of any element(s) not specifically disclosed herein. Thus, for example, in each instance herein any of the terms "comprising", "consisting essentially of", and "consisting of" may be replaced with either of the other two terms. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. An automated product storage unit, comprising:
   (i) a housing comprising at least one storage area framework and adjacent to the storage area framework at least one loading zone with at least one product access panel to facilitate loading and/or retrieving products stored therein;
   (ii) disposed in the at least one storage area framework, a plurality of independently addressable storage bays configured to store one product container and/or empty and/or loaded product carrier;

(iii) disposed in the housing, at least one accessible storage zone that bounds a first volume that encloses at least a portion of the plurality of independently addressable storage bays in the storage area framework(s), which storage zone optionally comprises at least one environmental parameter sensor, optionally a temperature sensor;

(iv) disposed in the a loading zone accessible to a user via a product access panel, a moveable loading tray that comprises a plurality of sensed loading slots each configured to receive a product container or empty or loaded product carrier, which product container or product carrier is capable of being moved between the loading zone and the accessible storage zone;

(v) disposed in the housing, a robot to transport product containers or empty or loaded product carriers between the loading tray and storage area framework(s), wherein the robot comprises an end effector configured to interact with one or more product containers and/or empty and/or loaded product carriers, which interaction, when with a plurality of product containers and/or empty and/or loaded product carriers, may be in parallel or serially;

(vi) at least one computer, which computer(s) is (are) configured to control operation of the storage unit, robot, end effector, and communications with a computer network operably associated with the storage unit; and (vii) optionally, an air management system operably connected to the storage zone(s).

2. An automated product storage unit according to claim 1 wherein the housing further comprises at least one drawer opening and, for each drawer opening, the automated product storage unit further comprises a drawer accessible to a user via the drawer opening when the drawer is open.

3. An automated product storage unit according to claim 1 further comprising a second accessible storage zone positioned adjacent to but separate from the first accessible storage zone, which second accessible storage zone bounds a second volume that encloses (i) a second plurality of independently addressable storage bays in the storage area framework(s) or (ii) a plurality of independently addressable storage bays in one or more additional storage area framework(s), which second accessible storage zone is accessed via a moveable gateway that, when open, allows the end effector to access the second cold storage zone's interior volume in order to access one or more of the independently addressable storage bays in the storage area framework(s) disposed therein.

4. An automated product storage unit according to claim 1 wherein a product loaded into the unit from the loading zone can be stored in an independently addressable storage bay proximate to the loading zone before being moved to an independently addressable storage bay further from the loading zone.

5. An automated product storage unit according to claim 1 wherein the independently addressable storage bays of the storage area framework(s) can be filled to capacity with product container(s) identified by bay location, wherein optionally a product stored in a first independently addressable storage bay can be relocated to a second independently addressable storage bay to optimize product loading and/or dispensing.

6. An automated product storage unit according to claim 1 that further comprises one or more of the following:

(a) a reader, optionally a barcode reader, to identify products loaded into or removed from the storage unit via the loading zone; and/or (b) a plurality of product carriers disposed in a plurality independently addressable storage bays, wherein optionally a storage bay includes one empty or loaded product carrier; and/or (c) each sensed loading slot of the moveable loading tray is associated with a sensor, optionally a capacitive sensor, configured to sense whether the slot contains a product container or product carrier, wherein optionally the moveable loading tray can move between a first position in the loading zone to a second position in the adjacent accessible storage zone, wherein when in the second position the end effector can operably interact with at least one of the loading tray's loading slots to move one or more product containers or product carriers between the loading tray and end effector; and/or (d) each storage area framework(s) is (are) a modular array, optionally comprising columns and rows, of independently addressable storage bays of the same or different sizes each operably accessible to the end effector, wherein each array optionally comprises a series of substantially parallel vertical members, and optionally substantially parallel horizontal members, spaced to produce the plurality of independently addressable storage bays of the same or different sizes, each of which is configured to accommodate a product container or empty or loaded product carrier, wherein storage bays of two or more different sizes are present in the storage area framework(s), a plurality of differently sized product carriers are used, with each of differently sized product carriers configured for storage in at least one storage bay in the storage area framework(s); and/or (e) each of the plurality of independently addressable storage bays defines a chamber, optionally a rectangular chamber, having an open end that is accessible to the end effector for insertion and removal of a product container or empty or loaded product carrier, wherein the vertical members contain flanges to engage and suspend product containers or empty or loaded product carriers, which flanges optionally include detents to engage a corresponding structure on a product carrier; and/or (f) the robot is a multi-axis robot configured to move the end effector vertically and horizontally in order to allow the end effector to place or remove one or more product containers or empty or loaded product carriers in or from the independently addressable storage bays in the storage area framework(s); and/or (g) each independently addressable storage bay is configured to receive a product carrier adapted to (A) hold a product container and (B) be engaged by the end effector for movement inside the storage unit; and/or (h) a primary power supply and, optionally, a backup power supply, optionally comprising one or more batteries; and/or (i) a security interface to control internal access to the storage unit, wherein such access control optionally comprises a login code verification and/or a biometric sensor scan; and/or (j) the product access panel comprises a door positioned above the loading zone, wherein the door optionally can open partially or completely to expose one or more of the sensed loading slots in the loading tray in the loading zone; and/or
- (k) product carriers to carry product containers stored in the cold storage unit, wherein each product carrier includes a latch configured to be releasably but connectedly engaged by an adaptor of the end effector; and/or
- (l) the temperature of each storage zone is monitored by one or more temperature sensors and temperature data from the temperature sensors is stored in a memory associated with at least one of the storage unit's one or more computers; and/or
- (m) the storage zone temperature(s) is (are) displayed on a display panel visible to a user of the storage unit; and/or
- (n) a touchscreen interface to provide user access to the storage unit and information regarding its operation and/or stored product inventory.

7. An automated product storage unit according to claim 1 that further comprises a plurality of product containers stored in a plurality of independently addressable storage bays, wherein at least some of the product containers are stored in product carriers.

8. An automated product storage unit according to claim 7 wherein the plurality of product containers comprises a plurality of (i) the same product type or (ii) different product types.

9. An automated product management system, the system comprising at least one automated product storage unit according to claim 1 in communication with a network-based, optionally a cloud-based, inventory management system, which inventory management system optionally provides at least one of the following services:
- (a) tracking of product inventory stored in the storage unit(s); and/or
- (b) tracking of product dispensing and stocking transactions in the storage unit; and/or
- (c) tracking expiration dates of individual product containers stored in the storage unit; and/or
- (d) re-ordering of products when inventory becomes depleted; and/or
- (e) expired product and/or about-to-expire messaging; and/or
- (f) product recall messaging; and/or
- (g) product billing messaging and/or generating a billing statement.

10. A system according to claim 9 that comprises a plurality of automated temperature sensitive product cold storage units each in communication with a cloud-based inventory management system.

11. A system according to claim 9 that further comprises network-based, optionally cloud-based, system administration, wherein system administration optionally comprises:
- (a) monitoring automated product storage unit location information; and/or
- (b) monitoring information related to the physical status of the automated product storage unit(s) administered by the system, which information includes unit function, power, and/or temperature sensor data; and/or
- (c) maintaining and monitoring communication to and from the system's storage unit(s); and/or
- (d) monitoring automated product storage unit access; and/or
- (e) facilitating automated product storage unit maintenance;
- (f) monitoring automated product storage unit contents; and/or
- (g) maintaining user access control to the contents of the automated product storage unit; and/or
- (h) capability to electronically communicate with one or more third parties, optionally vendors of products, regulatory authorities, and health insurance companies.

12. A method of managing a product inventory, comprising:
- (a) storing a product inventory in an automated product storage unit according to claim 1 that is in electronic communication with a network-based, optionally cloud-based, inventory management system; and
- (b) using the inventory management system to manage the product inventory.

13. The end effector of claim 1 comprising:
- a) at least one, and preferably two or more, arms to engage with a product and or product carrier; and
- b) at least one, and preferably two or more, slips to hold a product and/or product carrier; and wherein each arm is associated with one slip.

14. The arm of the end effector robot of claim 13 further comprising a pawl mechanism, movable along the entire length of the slip, to engage product carrier and pull in and push the product carrier to and from the end effector slips.

15. The pawl mechanism of claim 14 wherein, the pawl mechanism is lowered and raised to engage the pawl mechanism with a product carrier and pull/push the product carrier in and out of the end effector robot slip.

* * * * *